(12) United States Patent
Haines

(10) Patent No.: US 11,663,787 B2
(45) Date of Patent: May 30, 2023

(54) SYSTEM AND METHOD FOR IMPLEMENTING COMPUTER-SIMULATED REALITY INTERACTIONS BETWEEN USERS AND PUBLICATIONS

(71) Applicant: A BIG CHUNK OF MUD LLC, Hollywood, CA (US)

(72) Inventor: J. Michelle Haines, Hollywood, CA (US)

(73) Assignee: A BIG CHUNK OF MUD LLC, Los Angeles, CA (US)

( * ) Notice: Subject to any disclaimer, the term of this patent is extended or adjusted under 35 U.S.C. 154(b) by 0 days.

(21) Appl. No.: 17/321,359

(22) Filed: May 14, 2021

(65) Prior Publication Data
US 2021/0272374 A1 Sep. 2, 2021

Related U.S. Application Data

(63) Continuation of application No. 17/230,922, filed on Apr. 14, 2021, now Pat. No. 11,481,984, which is a (Continued)

(51) Int. Cl.
*G06F 16/48* (2019.01)
*G06V 20/20* (2022.01)
*G06T 19/00* (2011.01)

(52) U.S. Cl.
CPC ............ *G06T 19/006* (2013.01); *G06F 16/48* (2019.01); *G06V 20/20* (2022.01); *G06V 2201/02* (2022.01); *G06V 2201/131* (2022.01)

(58) Field of Classification Search
CPC ......... G06T 19/006; G06T 2207/10016; G06F 16/48; G06F 3/011; G06F 15/0291; (Continued)

(56) References Cited

U.S. PATENT DOCUMENTS

| 1,582,458 A | 4/1926 | Fortney |
| 2,197,152 A | 4/1940 | Mason |
| (Continued) | | |

FOREIGN PATENT DOCUMENTS

| CN | 2909320 Y | 6/2007 |
| CN | 102958399 A | 3/2013 |
| (Continued) | | |

OTHER PUBLICATIONS

The MagicBook: a transitional AR interface, Computers & Graphics, Billinghurst, 2001 pp. 745-753 (Year: 2001).*

(Continued)

*Primary Examiner* — Jitesh Patel
(74) *Attorney, Agent, or Firm* — DLA Piper LLP US

(57) ABSTRACT

Methods, systems, and media for enhancing one or more publications by receiving live video captured by a user, the live video comprising video of a publication, the publication comprising copyrighted content; identifying at least one first trigger in the live video, identifying one or more first three-dimensional, interactive media associated with the at least one first trigger and pertaining to the copyrighted content, and presenting to the user the first three-dimensional, interactive media; and identifying at least one second trigger in the first three-dimensional, interactive media, identifying one or more second three-dimensional, interactive media associated with the at least one second trigger and pertaining to the copyrighted content, and presenting to the user the second three-dimensional, interactive media to progressively deepen and enrich the engagement with the copyrighted content of the publication.

9 Claims, 40 Drawing Sheets

Related U.S. Application Data continuation of application No. 16/920,250, filed on Jul. 2, 2020, now Pat. No. 11,017,607, which is a continuation of application No. 15/445,806, filed on Feb. 28, 2017, now Pat. No. 10,748,339.

(60) Provisional application No. 62/345,320, filed on Jun. 3, 2016.

(58) Field of Classification Search
CPC ............... G06V 20/20; G06V 2201/02; G06V 2201/131; G06Q 50/10
See application file for complete search history.

(56) References Cited

U.S. PATENT DOCUMENTS

| | | | |
|---|---|---|---|
| D175,722 S | 10/1955 | Graham | |
| 2,918,997 A | 12/1959 | Kotkins | |
| D224,072 S | 6/1972 | Rosenblum | |
| D268,098 S | 3/1983 | Brown | |
| D271,161 S | 11/1983 | Compton | |
| D294,124 S | 2/1988 | Angerman | |
| 5,248,037 A | 9/1993 | Kornberg et al. | |
| D354,520 S | 1/1995 | Pong | |
| D369,829 S | 5/1996 | Tomita et al. | |
| D385,781 S | 11/1997 | Levine et al. | |
| D472,420 S | 4/2003 | Marsilio et al. | |
| D495,746 S | 9/2004 | Chen | |
| 6,917,370 B2 | 7/2005 | Benton | |
| D566,395 S | 4/2008 | Langer et al. | |
| 7,900,757 B2 | 3/2011 | Sisitsky | |
| D642,743 S | 8/2011 | Shteysel | |
| D654,113 S | 2/2012 | Clegg et al. | |
| D668,119 S | 10/2012 | Everson | |
| D668,540 S | 10/2012 | Lutzig | |
| D688,420 S | 8/2013 | Lai | |
| D691,653 S | 10/2013 | Benadon et al. | |
| D692,949 S | 11/2013 | Shamoon | |
| D701,865 S | 4/2014 | Sølling | |
| 8,957,835 B2 | 2/2015 | Hoellwarth | |
| 9,256,284 B2 | 2/2016 | Hanaya et al. | |
| 9,415,621 B2 | 8/2016 | Fahrer | |
| D769,727 S | 10/2016 | Lohuis et al. | |
| D780,844 S | 3/2017 | Frommelt | |
| D803,315 S | 11/2017 | Hsieh | |
| D820,080 S | 6/2018 | Kase et al. | |
| D850,006 S | 5/2019 | Staab | |
| D882,392 S | 4/2020 | Haines | |
| 10,748,339 B2 | 8/2020 | Haines | |
| 2002/0188676 A1 | 12/2002 | Iai et al. | |
| 2002/0188678 A1 | 12/2002 | Edecker et al. | |
| 2003/0059758 A1 | 3/2003 | Cohen et al. | |
| 2004/0193441 A1 | 9/2004 | Altieri | |
| 2005/0242771 A1 | 11/2005 | Blum et al. | |
| 2006/0113203 A1 | 6/2006 | Daley | |
| 2008/0172680 A1 | 7/2008 | Gyorfi et al. | |
| 2009/0009938 A1 | 1/2009 | Daley | |
| 2009/0026749 A1 | 1/2009 | Burrows | |
| 2010/0079356 A1 | 4/2010 | Hoellwarth | |
| 2010/0146389 A1 | 6/2010 | Yoo et al. | |
| 2010/0220434 A1 | 9/2010 | Daley, III | |
| 2010/0232770 A1 | 9/2010 | Prestenback et al. | |
| 2011/0107239 A1 | 5/2011 | Adoni et al. | |
| 2011/0181497 A1 | 7/2011 | Raviv | |
| 2011/0315589 A1 | 12/2011 | Thomas | |
| 2012/0036027 A1 | 2/2012 | Florschuetz et al. | |
| 2012/0122570 A1 | 5/2012 | Baronoff | |
| 2012/0264510 A1 | 10/2012 | Wigdor et al. | |
| 2012/0329558 A1 | 12/2012 | Haigh-Hutchinson | |
| 2013/0117377 A1 | 5/2013 | Miller | |
| 2013/0124326 A1 | 5/2013 | Huang et al. | |
| 2013/0147836 A1* | 6/2013 | Small | G02B 27/0093 345/633 |
| 2013/0196772 A1 | 8/2013 | Latta et al. | |
| 2013/0201185 A1 | 8/2013 | Kochi | |
| 2013/0222367 A1 | 8/2013 | Mariappan | |
| 2013/0238413 A1 | 9/2013 | Carlson et al. | |
| 2013/0248412 A1 | 9/2013 | Olsson et al. | |
| 2013/0249944 A1 | 9/2013 | Raghoebardayal | |
| 2013/0307856 A1* | 11/2013 | Keane | G06F 3/011 345/473 |
| 2013/0321390 A1* | 12/2013 | Latta | G06T 19/006 704/E21.001 |
| 2013/0339228 A1 | 12/2013 | Shuster et al. | |
| 2014/0002359 A1 | 1/2014 | Weising et al. | |
| 2014/0002491 A1 | 1/2014 | Lamb et al. | |
| 2014/0002495 A1 | 1/2014 | Lamb et al. | |
| 2014/0002497 A1 | 1/2014 | Lucas-Woodley et al. | |
| 2014/0078174 A1 | 3/2014 | Williams et al. | |
| 2014/0166658 A1 | 6/2014 | Hamra | |
| 2014/0175140 A1 | 6/2014 | Folise | |
| 2014/0191929 A1 | 7/2014 | Kim et al. | |
| 2014/0208272 A1 | 7/2014 | Vats et al. | |
| 2014/0210710 A1 | 7/2014 | Shin et al. | |
| 2014/0267637 A1 | 9/2014 | Hoberman et al. | |
| 2014/0361976 A1 | 12/2014 | Osman et al. | |
| 2014/0367004 A1 | 12/2014 | Miki | |
| 2015/0209664 A1 | 7/2015 | Haseltine | |
| 2015/0253574 A1 | 9/2015 | Thurber | |
| 2015/0254903 A1 | 9/2015 | Sumner et al. | |
| 2015/0268717 A1 | 9/2015 | Schlumberger et al. | |
| 2016/0062125 A1 | 3/2016 | Baek et al. | |
| 2016/0163105 A1 | 6/2016 | Hong et al. | |
| 2016/0203645 A1 | 7/2016 | Knepp et al. | |
| 2016/0217699 A1 | 7/2016 | Thankavel | |
| 2016/0240007 A1 | 8/2016 | Weerasinghe et al. | |
| 2016/0253745 A1 | 9/2016 | Lee | |
| 2016/0267720 A1 | 9/2016 | Mandella et al. | |
| 2016/0378296 A1 | 12/2016 | Mishra et al. | |
| 2017/0061702 A1* | 3/2017 | Christen | G02B 27/017 |
| 2017/0109940 A1 | 4/2017 | Guo et al. | |
| 2017/0115488 A1 | 4/2017 | Ambrus et al. | |
| 2017/0293351 A1 | 10/2017 | Li | |
| 2017/0352187 A1 | 12/2017 | Haines | |
| 2018/0158133 A1 | 6/2018 | Davis et al. | |
| 2018/0336735 A1 | 11/2018 | Haines | |
| 2020/0334914 A1 | 10/2020 | Haines | |
| 2020/0397109 A1 | 12/2020 | Haines | |
| 2021/0122211 A1 | 7/2021 | Haines | |
| 2021/0264676 A1 | 8/2021 | Haines | |

FOREIGN PATENT DOCUMENTS

| | | |
|---|---|---|
| CN | 204617351 U | 9/2015 |
| JP | S50152746 A | 12/1975 |
| JP | S5891927 U | 6/1983 |
| JP | S63197524 U | 12/1988 |
| JP | H04207868 A | 7/1992 |
| JP | 3086669 U | 6/2002 |
| JP | 3093914 U | 5/2003 |
| JP | 2008068060 A | 3/2008 |
| JP | 3164825 U | 12/2010 |
| JP | 2011077960 A | 4/2011 |
| JP | 2014127987 A | 7/2014 |
| KR | 20140119291 A | 10/2014 |
| WO | WO2017210522 A1 | 12/2017 |

OTHER PUBLICATIONS

U.S Copyright Office—Help: Daily Newspapers, U.S Copyright Office, Feb. 28, 2013, 4 pages.
Billinghurst et al., "The MagicBook: a transitional AR interface", Computers & Graphics, 745-753 (Year: 2001), 10 pages.

* cited by examiner

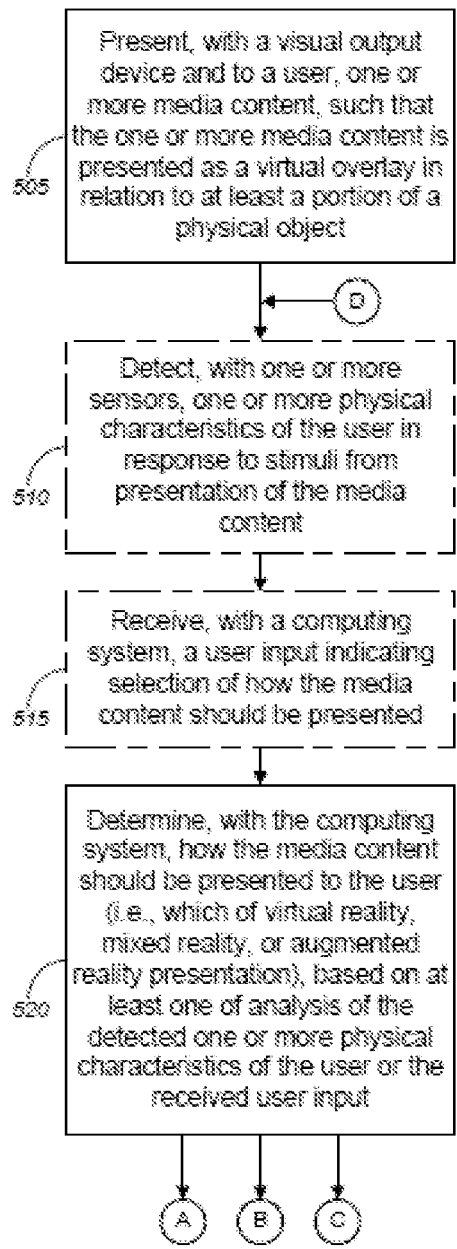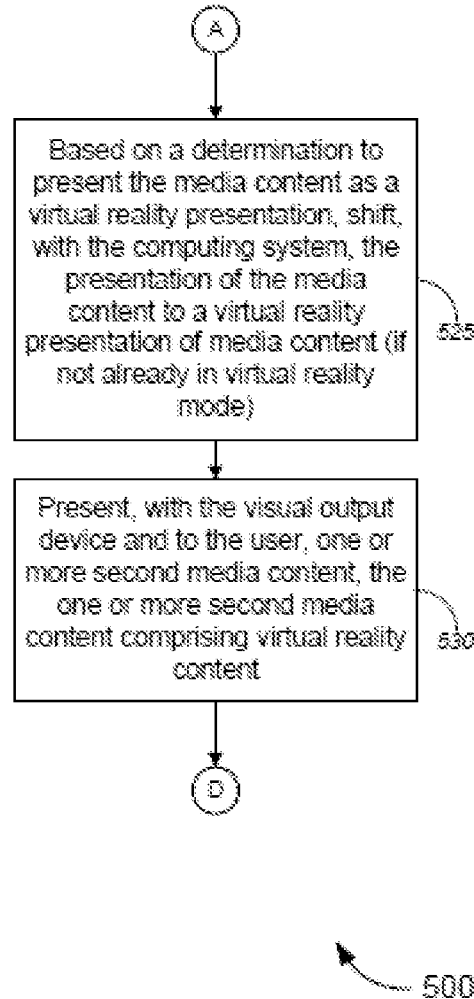
Fig. 5A
Fig. 5B

SYSTEM AND METHOD FOR IMPLEMENTING COMPUTER-SIMULATED REALITY INTERACTIONS BETWEEN USERS AND PUBLICATIONS

PRIORITY CLAIM

This application is a continuation of U.S. Utility application Ser. No. 17/230,922 filed on Apr. 14, 2021 which is a continuation of U.S. Utility application Ser. No. 16/920,250 filed on Jul. 20, 2020 which is a continuation of U.S. Utility application Ser. No. 15/445,806 filed on Feb. 28, 2017 which claims the benefit of U.S. Provisional Application Ser. No. 62/345,320 filed Jun. 3, 2016, the entire contents of these applications is hereby incorporated by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Augmented reality ("AR") technology provides a live direct or indirect view of a physical, real-world environment whose elements are augmented (or supplemented) by computer-generated sensory input such as graphics, video, sound, or GPS data.

Virtual reality ("VR") technology, on the other hand, utilizes software to generate realistic images, sounds and other sensations that replicate a real environment (or create an imaginary setting), and simulate a user's physical presence in this environment, by enabling the user to interact with this space and any objects depicted therein using specialized display screens or projectors and other devices.

SUMMARY OF THE INVENTION

Traditional physical publications do not enable the user or reader to experience character or story interaction (other than imagination of the user or reader). Traditional physical publications also do not enable the user or reader to experience character or story interaction from a first person point of view (e.g., from the perspective of a protagonist or an antagonistic), except in the imagination of the user or reader. Thus, traditional physical publications do not enhance the user's or reader's sense of cognitive and effective or affected empathy for the characters or the story in the publication.

Although AR technology has been used in the context of book reading experience, such conventional AR books do not utilize AR as a bridge into VR book interaction experiences, nor do these conventional AR books dynamically shift between AR and VR to provide the user or reader with more immersive book interaction experiences. Hence, there is a need for more robust and scalable solutions for implementing computer-simulated reality interactions, and, in particular embodiments, to methods, systems, and computer software for implementing computer-simulated reality interactions between users and physical publications to progressively deepen and enrich the engagement with the copyrighted content of the publication.

The technologies described herein including "Quantum Storey" books, are significant improvements over the e-book which is an evolution of the printed book. Quantum Storey books allow the user to virtually step inside a virtual simulation of the book, swapping their perception, subjectively, and sociality, overlaying a perceived experience taken from the written text and 2D imagery from the book and applying it into an 360° 2D and 3D animated virtual world. This allows the user to experience new perspectives through total immersion and enables the ability to realize first person, an experience both good and bad to aid the building of empathy. In addition, the technologies described herein enable the user to step into the shoes of the other characters in the experience to recognize how it feels to be in the situation from other perspectives. These direct and visceral experiences and the process of acquiring and storing these unique and applicative learnings enable a much deeper perception, sensation, notion, and intuition of the situation resulting in a stronger emotional and empathetic response to the other person's situation.

For instance, a child reading a traditional book about a young person who is being bullied or on the receiving end of the bullying behavior, can only read about how that person might feel through the words and try to understand it visually through a motionless illustration. The technologies described herein allow the child to still read the written words, but then also watch the experience through a short movie clip or animation as an outsider looking in. Same as in a pop-up context, or AR context, but the child can interact with the main character by tapping on an inanimate object or screen to get some interaction from the character, but the end result on the viewer is the same way you would try to understand the situation by hearing a friend tell the story about the situation they just went through without you actually being placed in that position yourself so you could begin to know how it feels firsthand, as it would relate to you.

Accordingly, in one aspect, disclosed herein are computer-implemented methods of enhancing a publication comprising: receiving live video, captured by a user, comprising video of a publication, the publication comprising copyrighted content; identifying at least one first trigger in the live video; identifying one or more first three-dimensional, interactive media associated with the at least one first trigger and pertaining to the copyrighted content; presenting, via a first visual output device and to the user, the first three-dimensional, interactive media; identifying at least one second trigger in the first three-dimensional, interactive media; identifying one or more second three-dimensional, interactive media associated with the at least one second trigger and pertaining to the copyrighted content; and presenting, via the first or a second visual output device and to the user, the second three-dimensional, interactive media; whereby the user's engagement with the copyrighted content of the publication is progressively deepened and enriched. In some embodiments, the publication is a printed publication. In other embodiments, the publication is an e-book. In various embodiments, the publication comprises one or more selected from the group consisting of: a fiction novel, a non-fiction novel, a children's book, a newspaper, a magazine, a comic book, a comic strip, a graphic novel, an encyclopedia, a dictionary, a map, a calendar, a greeting card, a bookmark, an event ticket stub, and a poster. In some embodiments, the at least one first trigger comprises text, an image, a QR code, or a barcode associated with the publication. In other embodiments, the at least one first trigger comprises a three-dimensional object associated with the publication. In some embodiments, the first three-dimensional, interactive media comprises a 360-degree video. In other embodiments, the first three-dimensional, interactive media comprises an augmented reality display. In yet other embodiments, the first three-dimensional, interactive media comprises a multimedia game. In some embodiments, the first visual output device is a mobile device comprising a camera and a display screen. In some embodiments, the at least one second trigger comprises an interaction of the user with the first three-dimensional, interactive media. In further embodiments, the at least one second trigger comprises a duration of interaction. In some embodiments, the second three-dimensional, interactive media comprises virtual reality environment, a 360-degree video, or a multimedia game. In particular embodiments, the second three-dimensional, interactive media comprises a virtual reality environment. In further embodiments, the second visual output device is a virtual reality headset. In some embodiments, the method further comprises determining a field of view of the user, the field of view including at least a portion of the publication; modifying an orientation of the one or more three-dimensional, interactive media content to align with the field of view of the user; and presenting, with a visual output device and to the user, the one or more three-dimensional, interactive media content, the orientation of which has been modified to align with the field of view of the user, such that the one or more three-dimensional, interactive media content is presented as a virtual overlay in relation to the at least a portion of the publication. In some embodiments, the live video comprises a plurality of triggers. In further embodiments, the identifying one or more first three-dimensional, interactive media associated with the plurality of first triggers comprises identifying one or more media associated with a pre-determined combination of triggers. In some embodiments, the first three-dimensional, interactive media comprises a plurality of triggers. In further embodiments, the identifying one or more second three-dimensional, interactive media associated with the plurality of second triggers comprises identifying one or more media associated with a pre-determined combination of triggers. The first three-dimensional, interactive media and the second three-dimensional, interactive media, in some embodiments, pertain to the copyrighted content by way of comprising text, one or more graphics, one or more characters, story line, theme, one or more interactions, music, one or more sound effects, spoken word audio relevant to the copyrighted content, or a combination thereof.

In another aspect, disclosed herein are computer-implemented systems comprising: a digital processing device comprising: at least one processor, a memory, a display, a camera, an operating system configured to perform executable instructions, and a computer program including instructions executable by the digital processing device to create an application for enhancing a publication comprising: a first software module receiving live video captured by a user via the camera, the live video comprising video of a publication, the publication comprising copyrighted content; a second software module identifying at least one first trigger in the live video, identifying one or more first three-dimensional, interactive media associated with the at least one first trigger and pertaining to the copyrighted content, and presenting, via the display and to the user, the first three-dimensional, interactive media; and a third software module identifying at least one second trigger in the first three-dimensional, interactive media, identifying one or more second three-dimensional, interactive media associated with the at least one second trigger and pertaining to the copyrighted content, and presenting, via the display and to the user, the second three-dimensional, interactive media; whereby the user's engagement with the copyrighted content of the publication is progressively deepened and enriched. In some embodiments, the publication is a printed publication. In other embodiments, the publication is an e-book. In various embodiments, the publication comprises one or more selected from the group consisting of: a fiction novel, a non-fiction novel, a children's book, a newspaper, a magazine, a comic book, a comic strip, a graphic novel, an encyclopedia, a dictionary, a map, a calendar, a greeting card, a bookmark, an event ticket stub, and a poster. In some embodiments, the at least one first trigger comprises text, an image, a QR code, or a barcode associated with the publication. In other embodiments, the at least one first trigger comprises a three-dimensional object associated with the publication. In some embodiments, the first three-dimensional, interactive media comprises a 360-degree video. In other embodiments, the first three-dimensional, interactive media comprises an augmented reality display. In yet other embodiments, the first three-dimensional, interactive media comprises a multimedia game. In some embodiments, the at least one second trigger comprises an interaction of the user with the first three-dimensional, interactive media. In further embodiments, the at least one second trigger comprises a duration of interaction. In some embodiments, the second three-dimensional, interactive media comprises virtual reality environment, a 360-degree video, or a multimedia game. In particular embodiments, the second three-dimensional, interactive media comprises a virtual reality environment. In some embodiments, the application further comprises: a fourth software module determining a field of view of the user, the field of view including at least a portion of the publication, modifying an orientation of the one or more three-dimensional, interactive media content to align with the field of view of the user, and presenting, via the display and to the user, the one or more three-dimensional, interactive media content, the orientation of which has been modified to align with the field of view of the user, such that the one or more three-dimensional, interactive media content is presented as a virtual overlay in relation to the at least a portion of the publication. In some embodiments, the live video comprises a plurality of triggers. In further embodiments, the software module identifying one or more first three-dimensional, interactive media associated with the plurality of first triggers identifies one or more media associated with a pre-determined combination of triggers. In some embodiments, the first three-dimensional, interactive media comprises a plurality of triggers. In further embodiments, the software module identifying one or more second three-dimensional, interactive media associated with the plurality of second triggers identifies one or more media associated with a pre-determined combination of triggers. The first three-dimensional, interactive media and the second three-dimensional, interactive media, in some embodiments, pertain to the copyrighted content by way of comprising text, one or more graphics, one or more characters, story line, theme, one or more interactions, music, one or more sound effects, spoken word audio relevant to the copyrighted content, or a combination thereof.

In another aspect, disclosed herein are non-transitory computer-readable storage media encoded with a computer program including instructions executable by a processor to create an application for enhancing a publication comprising: a first software module receiving live video captured by a user via the camera of a mobile device, the live video comprising video of a publication, the publication comprising copyrighted content; a second software module identifying at least one first trigger in the live video, identifying one or more first three-dimensional, interactive media associated with the at least one first trigger and pertaining to the copyrighted content, and presenting, via the display of the mobile device and to the user, the first three-dimensional, interactive media; and a third software module identifying at least one second trigger in the first three-dimensional, interactive media, identifying one or more second three-dimensional, interactive media associated with the at least one second trigger and pertaining to the copyrighted content, and presenting, via the display of the mobile device and to the user, the second three-dimensional, interactive media; whereby the user's engagement with the copyrighted content of the publication is progressively deepened and enriched. In some embodiments, the publication is a printed publication. In other embodiments, the publication is an e-book. In various embodiments, the publication comprises one or more selected from the group consisting of: a fiction novel, a non-fiction novel, a children's book, a newspaper, a magazine, a comic book, a comic strip, a graphic novel, an encyclopedia, a dictionary, a map, a calendar, a greeting card, a bookmark, an event ticket stub, and a poster. In some embodiments, the at least one first trigger comprises text, an image, a QR code, or a barcode associated with the publication. In other embodiments, the at least one first trigger comprises a three-dimensional object associated with the publication. In some embodiments, the first three-dimensional, interactive media comprises a 360-degree video. In other embodiments, the first three-dimensional, interactive media comprises an augmented reality display. In yet other embodiments, the first three-dimensional, interactive media comprises a multimedia game. In some embodiments, the at least one second trigger comprises an interaction of the user with the first three-dimensional, interactive media. In further embodiments, the at least one second trigger comprises a duration of interaction. In some embodiments, the second three-dimensional, interactive media comprises virtual reality environment, a 360-degree video, or a multimedia game. In particular embodiments, the second three-dimensional, interactive media comprises a virtual reality environment. In some embodiments, the application further comprises: a fourth software module determining a field of view of the user, the field of view including at least a portion of the publication, modifying an orientation of the one or more three-dimensional, interactive media content to align with the field of view of the user, and presenting, via the display and to the user, the one or more three-dimensional, interactive media content, the orientation of which has been modified to align with the field of view of the user, such that the one or more three-dimensional, interactive media content is presented as a virtual overlay in relation to the at least a portion of the publication. In some embodiments, the live video comprises a plurality of triggers. In further embodiments, the software module identifying one or more first three-dimensional, interactive media associated with the plurality of first triggers identifies one or more media associated with a pre-determined combination of triggers. In some embodiments, the first three-dimensional, interactive media comprises a plurality of triggers. In further embodiments, the software module identifying one or more second three-dimensional, interactive media associated with the plurality of second triggers identifies one or more media associated with a pre-determined combination of triggers. The first three-dimensional, interactive media and the second three-dimensional, interactive media, in some embodiments, pertain to the copyrighted content by way of comprising text, one or more graphics, one or more characters, story line, theme, one or more interactions, music, one or more sound effects, spoken word audio relevant to the copyrighted content, or a combination thereof.

In another aspect, disclosed herein are methods of enhancing a publication, comprising: receiving, by a computing device of a user, live video comprising video of a publication; identifying at least one trigger in the live video; identifying one or more media content associated with the at least one trigger; determining, by the computing device, a field of view of a user, the field of view including at least a portion of the publication; modifying an orientation of the one or more media content to align with the field of view of the user; and presenting, with a visual output device and to the user, the one or more media content whose orientation has been modified to align with the field of view of the user, such that the one or more media content is presented as a virtual overlay in relation to the at least a portion of the publication. In some embodiments, the publication is a printed publication. In other embodiments, the publication is an e-book. In various embodiments, the publication comprises one of: a fiction novel, a non-fiction novel, a children's book, a newspaper, a magazine, a comic book, a comic strip, a graphic novel, an encyclopedia, a dictionary, a map, a calendar, a greeting card, a bookmark, an event ticket stub, and a poster. In some embodiments, the at least one trigger each comprises one of: a QR code provided on the at least a portion of the publication, a barcode provided on the at least a portion of the publication, a graphical code provided on a sticker affixed to the at least a portion of the publication, a graphic on the at least a portion of the publication, a keyword or key code on the at least a portion of the publication, a cover image of the publication, a title on a cover of the publication, author name on the cover of the publication, a stuffed character associated with the publication that is positioned in proximity to the publication, a 3D-printed character associated with the publication that is positioned in proximity to the publication, and a 3D-printed object associated with the publication that is positioned in proximity to the publication. In some embodiments, the live video comprises at least 2 triggers, at least 3 triggers, at least 4 triggers, at least 5 triggers, at least 6 triggers, at least 7 triggers, at least 8 triggers, at least 9 triggers, or at least 10 triggers. In further embodiments, the identifying one or more media content associated with the at least one trigger comprises identifying one or more media content associated with a pre-determined combination of triggers. In still further embodiments, the combination of triggers comprises the identity of each trigger and the sequence of the identification. In some embodiments, the one or more media content comprises at least one of: a 3D still graphic, a 3D animated graphic, and a 3D interactive animated graphic. In further embodiments, each of the 3D still graphic, the 3D animated graphic, or the 3D interactive animated graphic comprises at least one of: a graphic representation of one or more characters associated with the publication, a non-fictional geographical location associated with the publication, a fictional geographical location associated with the publication, a room associated with the publication, a building associated with the publication, a scene described in the publication, and one or more items described in the publication. In still further embodiments, each of the 3D still graphic, the 3D animated graphic, or the 3D interactive animated graphic is presented from the point of view of a character associated with the publication. In some embodiments, presenting the one or more media content comprises presenting, with the visual output device and to the user, the one or more media content whose orientation has been modified to align with the field of view of the user, such that the one or more media content is at least one of presented as a virtual overlay above a cover of the publication, presented as a virtual overlay on a cover of the publication, presented as a virtual overlay beside the publication, presented as a virtual overlay above a page of the publication, presented as a virtual overlay on a page of the publication, presented as a virtual overlay in front of a surface of the publication, presented as a virtual overlay in front of a binding of the publication, presented as a virtual overlay above a 2D graphic on a portion of the publication, or presented as a virtual overlay on a 2D graphic on a portion of the publication. In some embodiments, the visual output device comprises one of: a VR headset, an AR headset, a set of AR glasses, a tablet computer, a set of bionic contact lenses, a smart phone adapted as part of a VR headset, and a smart phone adapted as part of an AR system. In some embodiments, the visual output device is communicatively coupled with the computing device of the user. In some embodiments, the visual output device comprises a second camera that captures one or more images of eyes of the user as the first camera captures the one or more images of the at least a portion of the publication, wherein determining, with the computer system, a field of view of a user comprises determining, with the computer system, a field of view of a user based on an analysis of the captured one or more images of the eyes of the user. In some embodiments, the identifying at least one trigger in the live video is performed at the computing device of the user or at a server communicatively coupled to the computing device of the user. In some embodiments, the identifying one or more media content associated with the at least one trigger is performed at the computing device of the user or at a server communicatively coupled to the computing device of the user. In some embodiments, the modifying an orientation of the one or more media content to align with the field of view of the user is performed at the computing device of the user or at a server communicatively coupled to the computing device of the user. In some embodiments, the computing device comprises a mobile phone or a tablet computer.

In another aspect, disclosed herein are computer-implemented systems comprising a computing device comprising at least one processor, an operating system configured to perform executable instructions, a memory, a camera, and a computer program including instructions executable by the at least one processor to create an application comprising: a software module receiving from the camera live video comprising video of a publication; a software module identifying at least one trigger in the live video; a software module identifying one or more media content associated with the at least one trigger; a software module determining a field of view of a user, the field of view including at least a portion of the publication; a software module modifying an orientation of the one or more media content to align with the field of view of the user; and a software module presenting, via a visual output device and to the user, the one or more media content whose orientation has been modified to align with the field of view of the user, such that the one or more media content is presented as a virtual overlay in relation to the at least a portion of the publication. In some embodiments, the publication is a printed publication. In other embodiments, the publication is an e-book. In various embodiments, the publication comprises one of: a fiction novel, a non-fiction novel, a children's book, a newspaper, a magazine, a comic book, a comic strip, a graphic novel, an encyclopedia, a dictionary, a map, a calendar, a greeting card, a bookmark, an event ticket stub, and a poster. In some embodiments, the at least one trigger each comprises one of: a QR code provided on the at least a portion of the publication, a barcode provided on the at least a portion of the publication, a graphical code provided on a sticker affixed to the at least a portion of the publication, a graphic on the at least a portion of the publication, a keyword or key code on the at least a portion of the publication, a cover image of the publication, a title on a cover of the publication, author name on the cover of the publication, a stuffed character associated with the publication that is positioned in proximity to the publication, a 3D-printed character associated with the publication that is positioned in proximity to the publication, and a 3D-printed object associated with the publication that is positioned in proximity to the publication. In some embodiments, the live video comprises at least 2 triggers, at least 3 triggers, at least 4 triggers, at least 5 triggers, at least 6 triggers, at least 7 triggers, at least 8 triggers, at least 9 triggers, or at least 10 triggers. In further embodiments, the software module identifying one or more media content associated with the at least one trigger identifies one or more media content associated with a predetermined combination of triggers. In still further embodiments, the combination of triggers comprises the identity of each trigger and the sequence of the identification. In some embodiments, the one or more media content comprises at least one of: 3D still graphic, a 3D animated graphic, and a 3D interactive animated graphic. In further embodiments, each of the 3D still graphic, the 3D animated graphic, or the 3D interactive animated graphic comprises at least one of: a graphic representation of one or more characters associated with the publication, a non-fictional geographical location associated with the publication, a fictional geographical location associated with the publication, a room associated with the publication, a building associated with the publication, a scene described in the publication, and one or more items described in the publication. In still further embodiments, each of the 3D still graphic, the 3D animated graphic, or the 3D interactive animated graphic is presented from the point of view of a character associated with the publication. In some embodiments, presenting the one or more media content comprises presenting, with the visual output device and to the user, the one or more media content whose orientation has been modified to align with the field of view of the user, such that the one or more media content is at least one of presented as a virtual overlay above a cover of the publication, presented as a virtual overlay on a cover of the publication, presented as a virtual overlay beside the publication, presented as a virtual overlay above a page of the publication, presented as a virtual overlay on a page of the publication, presented as a virtual overlay in front of a surface of the publication, presented as a virtual overlay in front of a binding of the publication, presented as a virtual overlay above a 2D graphic on a portion of the publication, or presented as a virtual overlay on a 2D graphic on a portion of the publication. In some embodiments, the visual output device comprises one of: a VR headset, an AR headset, a set of AR glasses, a tablet computer, a set of bionic contact lenses, a smart phone adapted as part of a VR headset, and a smart phone adapted as part of an AR system. In some embodiments, the visual output device is communicatively coupled with the computing device of the user. In some embodiments, the visual output device comprises a second camera that captures one or more images of eyes of the user as the first camera captures the one or more images of the at least a portion of the publication, wherein determining, with the computer system, a field of view of a user comprises determining, with the computer system, a field of view of a user based on an analysis of the captured one or more images of the eyes of the user. In some embodiments, the computing device comprises a mobile phone or a tablet computer.

In another aspect, disclosed herein are non-transitory computer-readable storage media encoded with a computer program including instructions executable by a processor to create an application comprising: a software module receiving, via a camera associated with a computing device of a user, live video comprising video of a publication; a software module identifying at least one trigger in the live video; a software module identifying one or more media content associated with the at least one trigger; a software module determining a field of view of a user, the field of view including at least a portion of the publication; a software module modifying an orientation of the one or more media content to align with the field of view of the user; and a software module presenting, via a visual output device and to the user, the one or more media content whose orientation has been modified to align with the field of view of the user, such that the one or more media content is presented as a virtual overlay in relation to the at least a portion of the publication. In some embodiments, the publication is a printed publication. In other embodiments, the publication is an e-book. In various embodiments, the publication comprises one of: a fiction novel, a nonfiction novel, a children's book, a newspaper, a magazine, a comic book, a comic strip, a graphic novel, an encyclopedia, a dictionary, a map, a calendar, a greeting card, a bookmark, an event ticket stub, and a poster. In various embodiments, the at least one trigger each comprises one of: a QR code provided on the at least a portion of the publication, a barcode provided on the at least a portion of the publication, a graphical code provided on a sticker affixed to the at least a portion of the publication, a graphic on the at least a portion of the publication, a keyword or key code on the at least a portion of the publication, a cover image of the publication, a title on a cover of the publication, author name on the cover of the publication, a stuffed character associated with the publication that is positioned in proximity to the publication, a 3D-printed character associated with the publication that is positioned in proximity to the publication, and a 3D-printed object associated with the publication that is positioned in proximity to the publication. In some embodiments, the live video comprises at least 2 triggers, at least 3 triggers, at least 4 triggers, at least 5 triggers, at least 6 triggers, at least 7 triggers, at least 8 triggers, at least 9 triggers, or at least 10 triggers. In further embodiments, the software module identifying one or more media content associated with the at least one trigger identifies one or more media content associated with a pre-determined combination of triggers. In still further embodiments, the combination of triggers comprises the identity of each trigger and the sequence of the identification. In some embodiments, the one or more media content comprises at least one of: a 3D still graphic, a 3D animated graphic, and a 3D interactive animated graphic. In further embodiments, each of the 3D still graphic, the 3D animated graphic, or the 3D interactive animated graphic comprises at least one of: a graphic representation of one or more characters associated with the publication, a non-fictional geographical location associated with the publication, a fictional geographical location associated with the publication, a room associated with the publication, a building associated with the publication, a scene described in the publication, and one or more items described in the publication. In still further embodiments, each of the 3D still graphic, the 3D animated graphic, or the 3D interactive animated graphic is presented from the point of view of a character associated with the publication. In some embodiments, presenting the one or more media content comprises presenting, with the visual output device and to the user, the one or more media content whose orientation has been modified to align with the field of view of the user, such that the one or more media content is at least one of presented as a virtual overlay above a cover of the publication, presented as a virtual overlay on a cover of the publication, presented as a virtual overlay beside the publication, presented as a virtual overlay above a page of the publication, presented as a virtual overlay on a page of the publication, presented as a virtual overlay in front of a surface of the publication, presented as a virtual overlay in front of a binding of the publication, presented as a virtual overlay above a 2D graphic on a portion of the publication, or presented as a virtual overlay on a 2D graphic on a portion of the publication. In various embodiments, the visual output device comprises one of: a VR headset, an AR headset, a set of AR glasses, a tablet computer, a set of bionic contact lenses, a smart phone adapted as part of a VR headset, and a smart phone adapted as part of an AR system. In some embodiments, the visual output device is communicatively coupled with the computing device of the user. In some embodiments, the visual output device comprises a second camera that captures one or more images of eyes of the user as the first camera captures the one or more images of the at least a portion of the publication, wherein determining, with the computer system, a field of view of a user comprises determining, with the computer system, a field of view of a user based on an analysis of the captured one or more images of the eyes of the user. In some embodiments, the computing device comprises a mobile phone or a tablet computer.

In another aspect, disclosed herein are methods, comprising: capturing, with a first camera, one or more images of at least a portion of a printed publication; analyzing, with a computing system, the captured one or more images of the at least a portion of the printed publication to determine whether the captured one or more images contain one or more triggers; based on a determination that the captured one or more images contain at least one trigger of the one or more triggers, identifying, with the computing system, one or more media content of a plurality of media content that are associated with the at least one trigger; determining, with the computer system, a field of view of a user, the field of view including at least a portion of the printed publication; modifying, with the computer system, an orientation of the one or more media content to align with the field of view of the user; and presenting, with a visual output device and to the user, the one or more media content whose orientation has been modified to align with the field of view of the user, such that the one or more media content is presented as a virtual overlay in relation to the at least a portion of the printed publication. In some embodiments, the visual output device comprises one of a VR headset, an AR headset, a set of AR glasses, a tablet computer, a set of bionic contact lenses, a smart phone adapted as part of a VR headset, or a smart phone adapted as part of an AR system. In some embodiments, the visual output device comprises the first camera. In some embodiments, the first camera is external to the visual output device, while being communicatively coupled to the visual output device. In some embodiments, the visual output device comprises a second camera that captures one or more images of eyes of the user as the first camera captures the one or more images of the at least a portion of the printed publication, wherein determining, with the computer system, a field of view of a user comprises determining, with the computer system, a field of view of a user based on an analysis of the captured one or more images of the eyes of the user. In some embodiments, the printed publication comprises one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster. In some embodiments, the at least one trigger each comprises one of a QR code provided on the at least a portion of the publication, a barcode provided on the at least a portion of the publication, a graphical code provided on a sticker affixed to the at least a portion of the publication, a graphic printed on the at least a portion of the publication, a keyword or key code printed on the at least a portion of the publication, a cover image of the printed publication, a title printed on a cover of the printed publication, author name printed on the cover of the printed publication, a stuffed character associated with the printed publication that is positioned in proximity to the printed publication, a 3D-printed character associated with the printed publication that is positioned in proximity to the printed publication, or a 3D-printed object associated with the printed publication that is positioned in proximity to the printed publication. In some embodiments, the one or more media content comprises at least one of a 3D still graphic, a 3D animated graphic, or a 3D interactive animated graphic. In further embodiments, each of the 3D still graphic, the 3D animated graphic, or the 3D interactive animated graphic comprises at least one of a graphic representation of one or more characters associated with the printed publication, a non-fictional geographical location associated with the printed publication, a fictional geographical location associated with the printed publication, a room associated with the printed publication, a building associated with the printed publication, a scene described in the printed publication, a scene inspired by the scene described in the printed publication, one or more items described in the printed publication, or one or more items inspired by the one or more items described in the printed publication. In some embodiments, presenting the one or more media content comprises presenting, with the visual output device and to the user, the one or more media content whose orientation has been modified to align with the field of view of the user, such that the one or more media content is at least one of presented as a virtual overlay above a cover of the printed publication, presented as a virtual overlay on a cover of the printed publication, presented as a virtual overlay beside the printed publication, presented as a virtual overlay above a page of the printed publication, presented as a virtual overlay on a page of the printed publication, presented as a virtual overlay in front of a surface of the printed publication, presented as a virtual overlay in front of a binding of the printed publication, presented as a virtual overlay above a 2D graphic printed on a portion of the printed publication, or presented as a virtual overlay on a 2D graphic printed on a portion of the printed publication. In some embodiments, the computing system comprises at least one of a server computer, a cloud computing system, or a computing system of the visual output device.

In another aspect, disclosed herein are apparatus, comprising: a first camera; a display device; at least one processor; and a non-transitory computer readable medium, the non-transitory computer readable medium having stored thereon computer software comprising a set of instructions that, when executed by the at least one processors, causes the apparatus to: capture, with the first camera, one or more images of at least a portion of a printed publication; analyze the captured one or more images of the at least a portion of the printed publication to determine whether the captured one or more images contain one or more triggers; based on a determination that the captured one or more images contain at least one trigger, identify one or more media content of a plurality of media content that are associated with the at least one trigger; determine a field of view of a user, the field of view including at least a portion of the printed publication; modify an orientation of the one or more media content to align with the field of view of the user; and present, with the display device and to the user, the one or more media content whose orientation has been modified to align with the field of view of the user, such that the one or more media content is presented as a virtual overlay in relation to the at least a portion of the printed publication. In some embodiments, the apparatus comprises one of a VR headset, an AR headset, a set of AR glasses, a tablet computer, a set of bionic contact lenses, a smart phone adapted as part of a VR headset, or a smart phone adapted as part of an AR system. In some embodiments, further comprises: a second camera; wherein the set of instructions, when executed by the one or more processors, further causes the apparatus to: capture, with the second camera, one or more images of eyes of the user as the first camera captures the one or more images of the at least a portion of the printed publication; wherein determining a field of view of a user comprises determining a field of view of a user based on an analysis of the captured one or more images of the eyes of the user. In some embodiments, the printed publication comprises one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster. In some embodiments, the at least one trigger each comprises one of a QR code provided on the at least a portion of the publication, a barcode provided on the at least a portion of the publication, a graphical code provided on a sticker affixed to the at least a portion of the publication, a graphic printed on the at least a portion of the publication, a keyword or key code printed on the at least a portion of the publication, a cover image of the printed publication, a title printed on a cover of the printed publication, author name printed on the cover of the printed publication, a stuffed character associated with the printed publication that is positioned in proximity to the printed publication, a 3D-printed character associated with the printed publication that is positioned in proximity to the printed publication, or a 3D-printed object associated with the printed publication that is positioned in proximity to the printed publication. In some embodiments, the one or more media content comprises at least one of a 3D still graphic, a 3D animated graphic, or a 3D interactive animated graphic. In some embodiments, each of the 3D still graphic, the 3D animated graphic, or the 3D interactive animated graphic comprises at least one of a graphic representation of one or more characters associated with the printed publication, a non-fictional geographical location associated with the printed publication, a fictional geographical location associated with the printed publication, a room associated with the printed publication, a building associated with the printed publication, a scene described in the printed publication, a scene inspired by the scene described in the printed publication, one or more items described in the printed publication, or one or more items inspired by the one or more items described in the printed publication. In some embodiments, presenting the one or more media content comprises presenting, with the display device and to the user, the one or more media content whose orientation has been modified to align with the field of view of the user, such that the one or more media content is at least one of presented as a virtual overlay above a cover of the printed publication, presented as a virtual overlay on a cover of the printed publication, presented as a virtual overlay beside the printed publication, presented as a virtual overlay above a page of the printed publication, presented as a virtual overlay on a page of the printed publication, presented as a virtual overlay in front of a surface of the printed publication, presented as a virtual overlay in front of a binding of the printed publication, presented as a virtual overlay above a 2D graphic printed on a portion of the printed publication, or presented as a virtual overlay on a 2D graphic printed on a portion of the printed publication.

In another aspect, disclosed herein are systems, comprising: an image capture device, comprising: a first camera; at least one first processor; and a first non-transitory computer readable medium, the first non-transitory computer readable medium having stored thereon computer software comprising a first set of instructions that, when executed by the at least one first processors, causes the image capture device to: capture, with the first camera, one or more images of at least a portion of a printed publication; and send the captured one or more images to a computing system; the computing system, comprising: at least one second processor; and a second non-transitory computer readable medium, the second non-transitory computer readable medium having stored thereon computer software comprising a second set of instructions that, when executed by the at least one second processors, causes the computing system to: receive the captured one or more images from the image capture device; analyze the captured one or more images of the at least a portion of the printed publication to determine whether the captured one or more images contain one or more triggers; based on a determination that the captured one or more images contain at least one trigger, identify one or more media content of a plurality of media content that are associated with the at least one trigger; determine a field of view of a user, the field of view including at least a portion of the printed publication; modify an orientation of the one or more media content to align with the field of view of the user; and send the one or more media content whose orientation has been modified to align with the field of view of the user to a visual output device; and the visual output device, comprising: a display device; at least one third processor; and a third non-transitory computer readable medium, the third non-transitory computer readable medium having stored thereon computer software comprising a third set of instructions that, when executed by the at least one third processors, causes the visual output device to: receive the one or more media content whose orientation has been modified to align with the field of view of the user from the computing system; and present, with the display device and to the user, the one or more media content whose orientation has been modified to align with the field of view of the user, such that the one or more media content is presented as a virtual overlay in relation to the at least a portion of the printed publication. In some embodiments, the visual output device comprises one of a VR headset, an AR headset, a set of AR glasses, a tablet computer, a set of bionic contact lenses, a smart phone adapted as part of a VR headset, or a smart phone adapted as part of an AR system. In some embodiments, the visual output device comprises the image capture device. In some embodiments, the visual output device comprises a second camera that captures one or more images of eyes of the user as the first camera captures the one or more images of the at least a portion of the printed publication, wherein determining, with the computer system, a field of view of a user comprises determining, with the computer system, a field of view of a user based on an analysis of the captured one or more images of the eyes of the user. In some embodiments, the printed publication comprises one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster. In some embodiments, the at least one trigger each comprises one of a QR code provided on the at least a portion of the publication, a barcode provided on the at least a portion of the publication, a graphical code provided on a sticker affixed to the at least a portion of the publication, a graphic printed on the at least a portion of the publication, a keyword or key code printed on the at least a portion of the publication, a cover image of the printed publication, a title printed on a cover of the printed publication, author name printed on the cover of the printed publication, a stuffed character associated with the printed publication that is positioned in proximity to the printed publication, a 3D-printed character associated with the printed publication that is positioned in proximity to the printed publication, or a 3D-printed object associated with the printed publication that is positioned in proximity to the printed publication. In some embodiments, the one or more media content comprises at least one of a 3D still graphic, a 3D animated graphic, or a 3D interactive animated graphic. In further embodiments, each of the 3D still graphic, the 3D animated graphic, or the 3D interactive animated graphic comprises at least one of a graphic representation of one or more characters associated with the printed publication, a non-fictional geographical location associated with the printed publication, a fictional geographical location associated with the printed publication, a room associated with the printed publication, a building associated with the printed publication, a scene described in the printed publication, a scene inspired by the scene described in the printed publication, one or more items described in the printed publication, or one or more items inspired by the one or more items described in the printed publication. In some embodiments, presenting the one or more media content comprises presenting, with the visual output device and to the user, the one or more media content whose orientation has been modified to align with the field of view of the user, such that the one or more media content is at least one of presented as a virtual overlay above a cover of the printed publication, presented as a virtual overlay on a cover of the printed publication, presented as a virtual overlay beside the printed publication, presented as a virtual overlay above a page of the printed publication, presented as a virtual overlay on a page of the printed publication, presented as a virtual overlay in front of a surface of the printed publication, presented as a virtual overlay in front of a binding of the printed publication, presented as a virtual overlay above a 2D graphic printed on a portion of the printed publication, or presented as a virtual overlay on a 2D graphic printed on a portion of the printed publication. In some embodiments, the computing system comprises at least one of a server computer, a cloud computing system, or a computing system of the visual output device.

In another aspect, disclosed herein are methods, comprising: establishing communications between a visual output device and at least one trigger of one or more non-visual triggers associated with a printed publication; in response to establishing communications between the visual output device and the at least one trigger, identifying, with the computing system, one or more media content of a plurality of media content that are associated with the at least one trigger; determining, with the computer system, a field of view of a user, the field of view including at least a portion of the printed publication; modifying, with the computer system, an orientation of the one or more media content to align with the field of view of the user; and presenting, with the visual output device and to the user, the one or more media content whose orientation has been modified to align with the field of view of the user, such that the one or more media content is presented as a virtual overlay in relation to the at least a portion of the printed publication. In some embodiments, establishing communications between the visual output device and the at least one trigger comprises: determining, with the computing system, whether the visual output device is within communications range of the one or more non-visual triggers associated with the printed publication; and based on a determination that the visual output device is within communications range of the at least one trigger of the one or more non-visual triggers, establishing communications between the visual output device and the at least one trigger. In some embodiments, the visual output device comprises one of a VR headset, an AR headset, a set of AR glasses, a tablet computer, a set of bionic contact lenses, a smart phone adapted as part of a VR headset, or a smart phone adapted as part of an AR system. In some embodiments, the visual output device comprises a camera that captures one or more images of eyes of the user as the user is looking toward the at least a portion of the printed publication, wherein determining, with the computer system, a field of view of a user comprises determining, with the computer system, a field of view of a user based on an analysis of the captured one or more images of the eyes of the user. In some embodiments, the printed publication comprises one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster. In some embodiments, the at least one trigger each comprises one of a RFID tag, a BLE tag, a NFC tag, or a RTLS tag. In some embodiments, the one or more media content comprises at least one of a 3D still graphic, a 3D animated graphic, or a 3D interactive animated graphic. In further embodiments, each of the 3D still graphic, the 3D animated graphic, or the 3D interactive animated graphic comprises at least one of a graphic representation of one or more characters associated with the printed publication, a non-fictional geographical location associated with the printed publication, a fictional geographical location associated with the printed publication, a room associated with the printed publication, a building associated with the printed publication, a scene described in the printed publication, a scene inspired by the scene described in the printed publication, one or more items described in the printed publication, or one or more items inspired by the one or more items described in the printed publication. In some embodiments, presenting the one or more media content comprises presenting, with the visual output device and to the user, the one or more media content whose orientation has been modified to align with the field of view of the user, such that the one or more media content is at least one of presented as a virtual overlay above a cover of the printed publication, presented as a virtual overlay on a cover of the printed publication, presented as a virtual overlay beside the printed publication, presented as a virtual overlay above a page of the printed publication, presented as a virtual overlay on a page of the printed publication, presented as a virtual overlay in front of a surface of the printed publication, presented as a virtual overlay in front of a binding of the printed publication, presented as a virtual overlay above a 2D graphic printed on a portion of the printed publication, or presented as a virtual overlay on a 2D graphic printed on a portion of the printed publication. In some embodiments, the computing system comprises at least one of a server computer, a cloud computing system, or a computing system of the visual output device.

In another aspect, disclosed herein are apparatus, comprising: a wireless communications device; a display device; at least one processor; and a non-transitory computer readable medium, the non-transitory computer readable medium having stored thereon computer software comprising a set of instructions that, when executed by the at least one processors, causes the apparatus to: establish, with the wireless communications device, communications between a visual output device and at least one trigger of one or more non-visual triggers associated with a printed publication; in response to establishing communications between the visual output device and the at least one trigger, identify one or more media content of a plurality of media content that are associated with the at least one trigger; determine a field of view of a user, the field of view including at least a portion of the printed publication; modify an orientation of the one or more media content to align with the field of view of the user; and present, with the display device and to the user, the one or more media content whose orientation has been modified to align with the field of view of the user, such that the one or more media content is presented as a virtual overlay in relation to the at least a portion of the printed publication. In some embodiments, the apparatus comprises one of a VR headset, an AR headset, a set of AR glasses, a tablet computer, a set of bionic contact lenses, a smart phone adapted as part of a VR headset, or a smart phone adapted as part of an AR system. In some embodiments, the apparatus further comprises a camera that captures one or more images of eyes of the user as the user is looking toward the at least a portion of the printed publication, wherein determining, with the computer system, a field of view of a user comprises determining, with the computer system, a field of view of a user based on an analysis of the captured one or more images of the eyes of the user. In some embodiments, the printed publication comprises one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster. In some embodiments, the at least one trigger each comprises one of a RFID tag, a BLE tag, a NFC tag, or a RTLS tag. In some embodiments, the one or more media content comprises at least one of a 3D still graphic, a 3D animated graphic, or a 3D interactive animated graphic.

In another aspect, disclosed herein are systems, comprising: a wireless communication device, comprising: a transceiver; at least one first processor; and a first non-transitory computer readable medium, the first non-transitory computer readable medium having stored thereon computer software comprising a first set of instructions that, when executed by the at least one first processors, causes the image capture device to: establish communications between a visual output device and at least one trigger of one or more non-visual triggers associated with a printed publication; the computing system, comprising: at least one second processor; and a second non-transitory computer readable medium, the second non-transitory computer readable medium having stored thereon computer software comprising a second set of instructions that, when executed by the at least one second processors, causes the computing system to: in response to establishing communications between the visual output device and the at least one trigger, identify one or more media content of a plurality of media content that are associated with the at least one trigger; determine a field of view of a user, the field of view including at least a portion of the printed publication; modify an orientation of the one or more media content to align with the field of view of the user; and send the one or more media content whose orientation has been modified to align with the field of view of the user to a visual output device; and the visual output device, comprising: a display device; at least one third processor; and a third non-transitory computer readable medium, the third non-transitory computer readable medium having stored thereon computer software comprising a third set of instructions that, when executed by the at least one third processors, causes the visual output device to: receive the one or more media content whose orientation has been modified to align with the field of view of the user from the computing system; and present, with the display device and to the user, the one or more media content whose orientation has been modified to align with the field of view of the user, such that the one or more media content is presented as a virtual overlay in relation to the at least a portion of the printed publication.

In another aspect, disclosed herein are methods, comprising: presenting, with a visual output device and to a user, one or more media content, such that the one or more media content is presented as a virtual overlay in relation to at least a portion of a physical object; determining, with a computing system, how the one or more media content should be presented to the user; based on a determination to present the one or more media content as a virtual reality presentation, and based on a determination that the one or more media content is not already being presented as a virtual reality presentation, shifting, with the computing system, the presentation of the one or more media content to a virtual reality presentation, and presenting, with the visual output device and to the user, one or more second media content, the one or more second media content comprising virtual reality content; and based on a determination to present the one or more media content as a mixed reality presentation, and based on a determination that the one or more media content is not already being presented as a mixed reality presentation, shifting, with the computing system, the presentation of the one or more media content to a mixed reality presentation, and presenting, with the visual output device and to the user, one or more third media content, the one or more third media content comprising mixed reality content. In some embodiments, the visual output device comprises one of a VR headset, an AR headset, a set of AR glasses, a tablet computer, a set of bionic contact lenses, a smart phone adapted as part of a VR headset, or a smart phone adapted as part of an AR system. In some embodiments, the physical object comprises one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, a poster, a Christmas tree bulb, a Christmas tree ornament, a Hanukkah menorah, a gravestone, a sentimental artifact or ornament associated with the user, or a sentimental artifact or ornament associated with another individual who is associated with the user. In some embodiments, the one or more media content comprises at least one of a 3D still graphic, a 3D animated graphic, or a 3D interactive animated graphic. In some embodiments, the method further comprises at least one of: detecting, with one or more sensors, one or more physical characteristics of the user in response to stimuli from presentation of media content; or receiving, with the computing system, a user input indicating selection of how the media content should be presented; wherein determining, with the computing system, how the one or more media content should be presented to the user is based on at least one of analysis of the detected one or more physical characteristics of the user or the received user input. In some embodiments, the method further comprises: based on a determination to present the one or more media content as an augmented reality presentation, and based on a determination that the one or more media content is not already being presented as an augmented reality presentation, shifting, with the computing system, the presentation of the one or more media content to an augmented reality presentation, and presenting, with the visual output device and to the user, one or more fourth media content, the one or more fourth media content comprising augmented reality content.

In another aspect, disclosed herein are apparatus, comprising: a display device; at least one processor; and a non-transitory computer readable medium, the non-transitory computer readable medium having stored thereon computer software comprising a set of instructions that, when executed by the at least one processors, causes the apparatus to: present, with the display device and to a user, one or more media content, such that the one or more media content is presented as a virtual overlay in relation to at least a portion of a physical object; determine how the one or more media content should be presented to the user; based on a determination to present the one or more media content as a virtual reality presentation, and based on a determination that the one or more media content is not already being presented as a virtual reality presentation, shift the presentation of the one or more media content to a virtual reality presentation, and present, with the display device and to the user, one or more second media content, the one or more second media content comprising virtual reality content; and based on a determination to present the one or more media content as a mixed reality presentation, and based on a determination that the one or more media content is not already being presented as a mixed reality presentation, shift the presentation of the one or more media content to a mixed reality presentation, and present, with the display device and to the user, one or more third media content, the one or more third media content comprising mixed reality content. In some embodiments, the apparatus comprises one of a VR headset, an AR headset, a set of AR glasses, a tablet computer, a set of bionic contact lenses, a smart phone adapted as part of a VR headset, or a smart phone adapted as part of an AR system. In some embodiments, the physical object comprises one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, a poster, a Christmas tree bulb, a Christmas tree ornament, a Hanukkah menorah, a gravestone, a sentimental artifact or ornament associated with the user, or a sentimental artifact or ornament associated with another individual who is associated with the user. In some embodiments, the one or more media content comprises at least one of a 3D still graphic, a 3D animated graphic, or a 3D interactive animated graphic. In some embodiments, the apparatus further comprises at least one of: one or more sensors; or one or more user input devices; wherein the set of instructions, when executed by the one or more processors, further causes the apparatus to perform at least one of: detecting, with the one or more sensors, one or more physical characteristics of the user in response to stimuli from presentation of media content; or receiving, from the one or more user input devices, a user input indicating selection of how the media content should be presented; wherein determining how the one or more media content should be presented to the user is based on at least one of analysis of the detected one or more physical characteristics of the user or the received user input. In further embodiments, the set of instructions, when executed by the one or more processors, further causes the apparatus to: based on a determination to present the one or more media content as an augmented reality presentation, and based on a determination that the one or more media content is not already being presented as an augmented reality presentation, shift the presentation of the one or more media content to an augmented reality presentation, and present, with the display device and to the user, one or more fourth media content, the one or more fourth media content comprising augmented reality content.

In another aspect, disclosed herein are systems, comprising: a visual output device, comprising: a display device; at least one first processor; and a first non-transitory computer readable medium, the first non-transitory computer readable medium having stored thereon computer software comprising a first set of instructions that, when executed by the at least one first processors, causes the visual output device to: present, with the display device and to a user, one or more media content, such that the one or more media content is presented as a virtual overlay in relation to at least a portion of a physical object; a computing system, comprising: at least one second processor; and a second non-transitory computer readable medium, the second non-transitory computer readable medium having stored thereon computer software comprising a second set of instructions that, when executed by the at least one second processors, causes the computing system to: determine how the one or more media content should be presented to the user; based on a determination to present the one or more media content as a virtual reality presentation, and based on a determination that the one or more media content is not already being presented as a virtual reality presentation, shift the presentation of the one or more media content to a virtual reality presentation; and based on a determination to present the one or more media content as a mixed reality presentation, and based on a determination that the one or more media content is not already being presented as a mixed reality presentation, shift the presentation of the one or more media content to a mixed reality presentation; wherein the first set of instructions that, when executed by the at least one first processors, further causes the visual output device to: based on a determination to present the one or more media content as a virtual reality presentation, and based on a determination that the one or more media content is not already being presented as a virtual reality presentation, present, with the display device and to the user, one or more second media content, the one or more second media content comprising virtual reality content; and based on a determination to present the one or more media content as a mixed reality presentation, and based on a determination that the one or more media content is not already being presented as a mixed reality presentation, present, with the display device and to the user, one or more third media content, the one or more third media content comprising mixed reality content.

In another aspect, disclosed herein are methods, comprising: determining, with a computing system, how at least one of one or more first media content of a plurality of media content or one or more captured images of one or more physical objects should be presented to a user; based on a determination to present the one or more first media content as a virtual reality presentation, and based on a determination that the one or more first media content is not already being presented as a virtual reality presentation, controlling, with the computing system via a first API, an asset integration and control system to cause the asset integration and control system to modify the first media content to generate one or more second media content, the one or more second media content comprising virtual reality content, and sending, with the computing system via a second API, the one or more second media content to a first visual output device of a plurality of visual output devices that presents the one or more second media content to the user; based on a determination to present the one or more first media content and the one or more captured images of the one or more physical objects as an augmented reality presentation, and based on a determination that the one or more first media content and the one or more captured images of the one or more physical objects are not already being presented as an augmented reality presentation, controlling, with the computing system via the first API, the asset integration and control system to cause the asset integration and control system to generate one or more third media content by modifying the one or more first media content as a virtual overlay in relation to the one or more captured images of the one or more physical objects, the one or more third media content comprising augmented reality content, and sending, with the computing system via the second API, the one or more third media content to the first visual output device that presents the one or more third media content to the user; and based on a determination to present the one or more first media content and the one or more captured images of the one or more physical objects as a mixed reality presentation combining elements of virtual reality and augmented reality, and based on a determination that the one or more first media content and the one or more captured images of the one or more physical objects are not already being presented as a mixed reality presentation, controlling, with the computing system via the first API, the asset integration and control system to cause the asset integration and control system to generate one or more fourth media content based on the one or more first media content and the one or more captured images of the one or more physical objects, the one or more fourth media content comprising mixed reality content, and sending, with the computing system via the second API, the one or more fourth media content to the first visual output device that presents the one or more fourth media content to the user. In some embodiments, the method further comprises: tracking, with the computing system, a real-time status of each of the plurality of the media content in each of at least one of the asset integration and control system via the first API, the first visual output device via the second API, an asset production system via a third API, and a production management system via a fourth API; distributing, with the computing system, at least one fifth media content of the plurality of the media content whose status indicates that it is ready for integration from the asset production system to the asset integration and control system; distributing, with the computing system, at least one sixth media content of the plurality of the media content whose status indicates that it is ready for distribution from the asset integration and control system to the first visual output device; syncing, with the computing system, the at least one sixth media content with one or more second visual output devices of the plurality of visual output devices, the one or more second visual output devices being separate from the first visual output device; and in response to receiving updates to the at least one sixth media content, sending, with the computing system, the updates to the at least one sixth media content to each of the first visual output device and each of the one or more second visual output devices. In some embodiments, the method further comprises: receiving, with the computing system, the one or more first media content from an asset production system via a third API; and receiving, with the computing system, the one or more captured images of the one or more physical objects from an image capture device. In further embodiments, the method further comprises: determining, with the computing system, that the one or more first media content is ready for distribution to the first visual output device; sending, with the computing system, one or more first messages to a production management system via a fourth API, wherein the one or more first messages causes the production management system to change a status of the one or more first media content to indicate that the one or more first media content is ready for distribution to the first visual output device; and sending, with the computing system, one or more second messages to the asset production system via the third API, wherein the one or more second messages causes the asset production system to send the one or more first media content to the computing system via the third API. In still further embodiments, the method further comprises: determining, with the computing system, that one or more second media content is not ready for distribution to the first visual output device; sending, with the computing system, one or more third messages to a production management system via a fourth API, wherein the one or more third messages causes the production management system to change a status of the one or more second media content to indicate that the one or more second media content is not ready for distribution to the first visual output device; and sending, with the computing system, one or more fourth messages to an asset production system via the third API, wherein the one or more fourth messages causes the asset production system to send one or more fifth messages to one or more developers to continue work on the one or more second media content. In some embodiments, the computing system comprises at least one of a server computer, a cloud computing system, or a computing system of the visual output device. In some embodiments, the plurality of visual output devices each comprises one of a VR headset, an AR headset, a set of AR glasses, a tablet computer, a set of bionic contact lenses, a smart phone adapted as part of a VR headset, or a smart phone adapted as part of an AR system.

In another aspect, disclosed herein are computing systems, comprising: at least one processor; and a non-transitory computer readable medium, the non-transitory computer readable medium having stored thereon computer software comprising a set of instructions that, when executed by the at least one processors, causes the computing system to: determine how at least one of one or more first media content of a plurality of media content or one or more captured images of one or more physical objects should be presented to a user; based on a determination to present the one or more first media content as a virtual reality presentation, and based on a determination that the one or more first media content is not already being presented as a virtual reality presentation, control, via a first API, an asset integration and control system to cause the asset integration and control system to modify the first media content to generate one or more second media content, the one or more second media content comprising virtual reality content, and send, via a second API, the one or more second media content to a first visual output device of a plurality of visual output devices that presents the one or more second media content to the user; based on a determination to present the one or more first media content and the one or more captured images of the one or more physical objects as an augmented reality presentation, and based on a determination that the one or more first media content and the one or more captured images of the one or more physical objects are not already being presented as an augmented reality presentation, control, via the first API, the asset integration and control system to cause the asset integration and control system to generate one or more third media content by modifying the one or more first media content as a virtual overlay in relation to the one or more captured images of the one or more physical objects, the one or more third media content comprising augmented reality content, and send, via the second API, the one or more third media content to the first visual output device that presents the one or more third media content to the user; and based on a determination to present the one or more first media content and the one or more captured images of the one or more physical objects as a mixed reality presentation combining elements of virtual reality and augmented reality, and based on a determination that the one or more first media content and the one or more captured images of the one or more physical objects are not already being presented as a mixed reality presentation, control, via the first API, the asset integration and control system to cause the asset integration and control system to generate one or more fourth media content based on the one or more first media content and the one or more captured images of the one or more physical objects, the one or more fourth media content comprising mixed reality content, and send, via the second API, the one or more fourth media content to the first visual output device that presents the one or more fourth media content to the user.

BRIEF DESCRIPTION OF THE DRAWINGS

FIGS. 5A-5D are flow diagrams illustrating a method for implementing computer-simulated reality interactions between users and physical objects, in accordance with various embodiments.

DETAILED DESCRIPTION OF THE INVENTION

Certain Definitions

Figure 1:
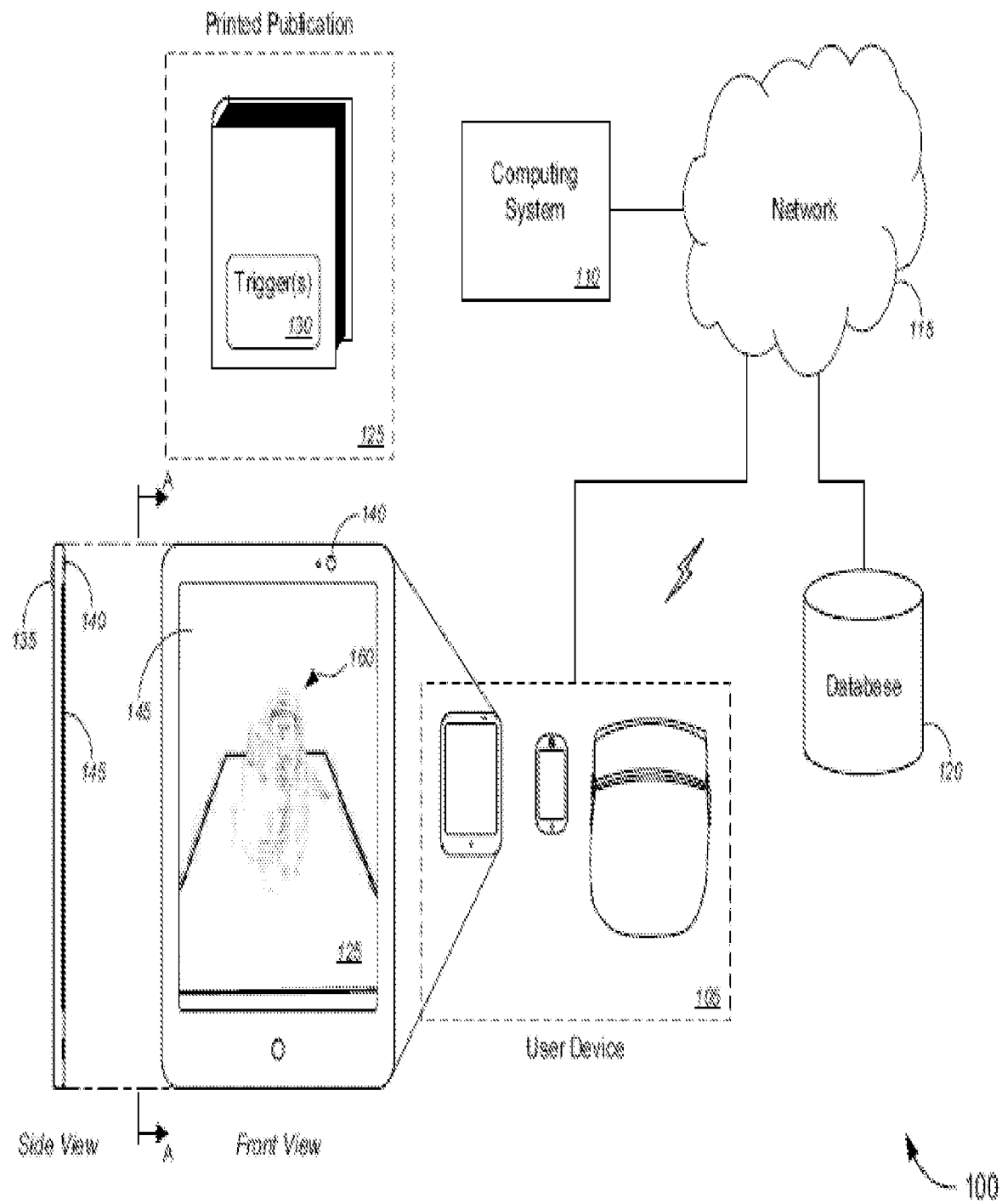
FIG. 1 is a schematic diagram illustrating a system for implementing computer-simulated reality interactions between users and physical publications, in accordance with various embodiments.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

A used herein, "trigger" includes an image, frame marker (e.g., QR code), text, physical three-dimensional object, and the like, used to identify and/or activate AR, VR, or MxR media content.

As used herein, "non-visual trigger" includes a Near Field Communications (NFC) tag, Radio Frequency Identification Data (RFID) Mode 2 or 6 tag, Location Based Service (LBS) active on a smartphone, and the like, used to identify and/or activate AR, VR, or MxR media content.

Various embodiments provide tools and techniques for implementing computer-simulated reality interactions, and, in particular embodiments, to methods, systems, and computer software for implementing computer-simulated reality interactions between users and physical publications.

Computer-Simulated Reality User Experience ("UX")

In various embodiments, a first camera might capture one or more images of at least a portion of a printed publication, and a computing system might analyze the captured one or more images to determine whether the captured one or more images contain one or more triggers. Based on a determination that the captured one or more images contain at least one trigger of the one or more triggers, the computing system might identify one or more media content of a plurality of media content that are associated with the at least one trigger. The computing system might determine a field of view of a user (e.g., by capturing an eye(s) of the user using a camera in relation to what the user is looking at), the field of view including at least a portion of the printed publication. The computing system might subsequently modify an orientation of the one or more media content to align with the field of view of the user, if necessary (i.e., if the computing system determines that the orientation of the one or more media content are not already aligned with the field of view of the user, or the like). The one or more media content (in some cases, whose orientation has been modified to align with the field of view of the user) may then be presented with a visual output device and to the user, such that the one or more media content is presented as a virtual overlay in relation to at least a portion of the printed publication.

Alternatively, rather than using visual triggers, non-visual triggers may be used. In such cases, wireless communications may be established between a visual output device and at least one trigger of one or more non-visual triggers associated with a printed publication. In response to establishing communications between the visual output device and the at least one trigger, the computing system might identify one or more media content of a plurality of media content that are associated with the at least one trigger. The computing system might determine a field of view of a user (e.g., by capturing an eye(s) of the user using a camera in relation to what the user is looking at), the field of view including at least a portion of the printed publication. The computing system might subsequently modify an orientation of the one or more media content to align with the field of view of the user, if necessary (i.e., if the computing system determines that the orientation of the one or more media content are not already aligned with the field of view of the user, or the like). The one or more media content (in some cases, whose orientation has been modified to align with the field of view of the user) may then be presented with a visual output device and to the user, such that the one or more media content is presented as a virtual overlay in relation to the at least a portion of the printed publication.

In some embodiments, the printed publication might include, without limitation, one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster, and/or the like. According to some embodiments, the at least one visual trigger might each include, without limitation, one of a quick response ("QR") code provided on the at least a portion of the publication, a barcode provided on the at least a portion of the publication, a graphical code provided on a sticker affixed to the at least a portion of the publication, a graphic printed on the at least a portion of the publication, a keyword or key code printed on the at least a portion of the publication, a cover image of the printed publication, a title printed on a cover of the printed publication, author name printed on the cover of the printed publication, a stuffed character associated with the printed publication that is positioned in proximity to the printed publication, a 3D-printed character associated with the printed publication that is positioned in proximity to the printed publication, or a 3D-printed object associated with the printed publication that is positioned in proximity to the printed publication, and/or the like. The at least one non-visual trigger, in some cases, might each include, but is not limited to, one of a radio frequency identification ("RFED") tag, a Bluetooth low energy ("BLE") tag, a near field communication ("NFC") tag, or a real-time locating systems ("RTLS") tag, and/or the like.

In some instances, the one or more media content comprises at least one of a three-dimensional ("3D") still graphic, a 3D animated graphic, or a 3D interactive animated graphic, and/or the like, each of which might include, without limitation, one of a graphic representation of one or more characters associated with the printed publication, a non-fictional geographical location associated with the printed publication, a fictional geographical location associated with the printed publication, a room associated with the printed publication, a building associated with the printed publication, a scene described in the printed publication, a scene inspired by the scene described in the printed publication, one or more items described in the printed publication, or one or more items inspired by the one or more items described in the printed publication, and/or the like.

In some embodiments, the visual output device might include, without limitation, one of a VR headset, an AR headset, a set of AR glasses, a tablet computer, a set of bionic contact lenses, a smart phone adapted as part of a VR headset, or a smart phone adapted as part of an AR system, and/or the like. According to some embodiments, presenting the one or more media content might comprise presenting, with the visual output device and to the user, the one or more media content whose orientation has been modified to align with the field of view of the user, such that the one or more media content is at least one of presented as a virtual overlay above a cover of the printed publication, presented as a virtual overlay on a cover of the printed publication, presented as a virtual overlay beside the printed publication, presented as a virtual overlay above a page of the printed publication, presented as a virtual overlay on a page of the printed publication, presented as a virtual overlay in front of a surface of the printed publication, presented as a virtual overlay in front of a binding of the printed publication, presented as a virtual overlay above a two-dimensional ("2D") graphic printed on a portion of the printed publication, or presented as a virtual overlay on a 2D graphic printed on a portion of the printed publication, and/or the like.

In some embodiments, the computing system described above might include computer vision (in some cases, with object recognition). Here, "computer vision" might refer to image capture technology that recognizes objects and triggers, and that initiates AR presentations of content in response to detecting the triggers (which could be visual-based triggers, non-visual-based triggers, any combination of visual and non-visual triggers, and/or the like). In some instances, computer vision technology might further comprise using AR as a bridge into VR, and vice versa, where, in some cases, the computer vision system might dynamically or selectively shift between AR and VR depending on factors that would enhance the interactive experience for the user or reader (and which might be based on detecting and identifying user responses to certain stimuli in the AR and/or VR presentations). Herein, "augmented reality" or "AR" might refer to virtual overlay of simulated constructs either over actual views of actual objects and settings or over images of actual objects and settings, while "virtual reality" or "VR" might refer to an enclosed sensory environment where everything that is observed by the user is simulated, and "mixed reality" or "MxR" might refer to a combination of AR and VR (e.g., a VR presentation in which AR elements are simulated are embedded in the presentation, or the like). These and other implementations of computer vision are described in detail below with respect to the various non-limiting embodiments.

The virtual overlay of characters, story elements, settings, scenes, and/or the like that are associated with the printed publication provides the user or reader with a virtual interaction (aside from the user's or reader's imagination) with the characters, the settings, and/or the story associated with the publication. In some cases, such interactions include interactive games that the user plays with the virtual characters from the story of the publication. Some embodiments would also allow the user or reader to experience, via the AR, VR, and/or mixed reality (i.e., combination of AR and VR), the story from the point of view of a protagonist or an antagonist in the story, thereby enhancing the user's or reader's sense of cognitive and effective or affected empathy for the characters or the story in the publication. Further, the dynamic or selected shifts between AR and VR provides the user or reader with a more immersive interactive experience with the story and/or the characters in the publication.

Computer-Simulated Reality Platform

The computer-simulated reality platform is a scalable and reusable framework and end user application for a MxR media content application, with an AR and 2D front-end launching functionality into immersive VR. The computer-simulated reality platform provides an end-to-end production process and media content application framework that enables a streamlined and cost-effective production process, which is tracked and managed from first design of the media content presentation through publication and analytics. In some cases, the framework, which is a completely custom client/server technology, provides for creation, distribution, and management of every media content asset or application (herein also referred to as "assets," "media content," "application," etc.) that is released into the proprietary application framework. The platform includes, without limitation, a graphic representation of a user interface ("un and/or user experience ("UX"), architectural and server-based functionality (e.g., for hosted content), technical requirements and a content management solution ("CMS") for the hosting and support of the development and live versions of the application. The platform is intended to be universally adaptable to any MxR-based platforms as well as development projects including, but not limited to, repurposing of assets for episodic television.

Pre-Production Planning and Scheduling:

The traditional method of tracking production of assets (e.g., Microsoft° EXCEL®, Google® Docs, e-mail applications, messaging applications, etc.) have the disadvantage of being disconnected and typically one-way in terms of communication. The platform creates an all-in-one tracking and management solution that takes the place of these traditional means of tracking production of assets, while providing direct connection and launching capabilities with asset production systems and software, including, but not limited to, Autodesk®$^{Maya}$®, Autodesk® Mudbox°, Adobe° Photoshop®, and/or the like. Using the software as a service ("SaaS") model, custom production processes have been built-out, in some cases using pre-production planning and scheduling tools (e.g., Autodesk Shotgun, or the like). Custom interfaces for every stage of production have been created to accurately track design, development, artists' tasks, media content structure and tasking, animations, audio, as well as the bug management system for tracking bugs in release versions and beta version of the applications, and these are tracked in a redundantly backed-up, 128-bit (or better) encrypted online database.

Using proprietary tracking and production templates, the platform can manage both internal and external artists, developers, writers, etc. (herein collectively referred to as "developers") to scale productions on books exponentially, all while maintaining a tight level of quality control, with a minimal amount of production overhead.

In some embodiments, an internal toolset of the platform (e.g., Quantum Bridge™ or the like), which might run on one or more of desktop computers, laptop computers, mobile devices, tablet platforms, and/or the like, might connect all of the internal software and development tools via custom workflows (e.g., Quantum Transport™, and/or the like), which might be written in languages such as Python, JavaScript, and C#, and/or the like. The custom workflow application programming interface ("API") might provide each disparate section or component of the development pipeline with ability to communicate with each other, sending messages back and forth when digital assets change their status from pre-production phase to asset integration or to asset distribution, when the asset has been flagged as ready for integration or ready for distribution, etc.

According to some embodiments, a production tracking, planning, and tasking system might be used to develop custom workflows that fit particular pre-production and production styles of the developers, while enabling improvement and modification as production progresses. The production tracking, planning, and tasking system can track artists' time, track deliveries on every asset required for creation of new digital stories, create dependent tasks (where one task starts when another is finished, where one task starts when another has progressed to a certain stage, etc.), and track versions of all of the above. The production tracking, planning, and tasking system can also seed development, testing, and production database on the server or computing system, for delivery of assets. Using built-in APIs and/or the platform toolset, as assets are flagged for approval, the resulting files can be synchronized or synced through custom scripts (e.g., Quantum Trigger scripts, or the like) that push and convert the data on the production management system into asset bundles for the asset production system (e.g., Unity 3D, etc.) for viewing and reviewing in the framework in the asset production system.

From planning out timelines, to costing per asset (e.g., models, sounds, animations, etc.), the platform will be able to accurately schedule and manage the time/cost using scheduling tools (e.g., in the production management system, or the like) as well as custom tools in the platform toolset. With these, the platform can track and predict new assets as the process progresses from concept to completion, through to distribution and delivery. This is important for each asset that is published, where timelines in which they are created may constantly require revision and where the workforce or developers required to complete each stage may need to be changed.

Asset Production:

Typically, production in 3D or 2D takes on a more manual assignment and iteration process that creates many single points of failure from building the assets to seeing the latest content updated inside the application. In some cases, some production methodologies are not scalable for multistory solutions that are being deployed.

The platform, using tools (e.g., the production management system tools, the platform toolset, industry standard software for asset creation, and/or the like) with tasking, review, and approval functionalities, can build, track, and deploy assets in a much more streamlined fashion. Every asset created in the production process can be connected via meta-data, scripts, and/or the like, via codes created in the platform toolset, for accurate tracking, as well as easier digital distribution and updating to end users' devices. The platform can task artists and other developers directly, and, with custom scripts, can push approved versions of assets directly from the production suite of tools into the development testing areas for review in VR-based applications, AR-based applications, or MxR-based applications, or a combination of these applications, and the like.

Asset Integration and Control:

Custom tools in the platform can tie in data from the earliest stages of pre-production. Using a data-based approach allows for tracking every asset in the asset builds that are tested and that subsequently go public. This not only helps with quality control, but also helps with cost overruns, time delays, and content bugs that are highly typical in more manual-based development workflows. Using a multi-platform asset production system, very customizable appearances and assets (in both 2D and 3D implementations) can be made. The multi-platform functionality allows for development within one codebase that with minor tweaks enables pushing the framework to any one of a plurality of different presentation platforms. Computer vision technology and the corresponding system can be used to allow the asset integration system to recognize and track real-world objects and images with a camera on a mobile device for an augmented reality-based experience (or a mixed reality-based experience). The images can be hosted in the application (or app), or dynamically served from a computer vision development website.

Asset Integration and Control:

A server (e.g., Parse Server, etc.) might allow for storing and delivering large amounts of data digitally to the framework, and might tie directly into the asset integration systems, as well as other development platforms. The server might be highly scalable horizontally and vertically and might run seamlessly on currently available web service solutions (e.g., Amazon® Web Services, or the like). Other benefits might include, without limitation, user login and account creation, custom database schemas, oAuth2 connections for easier parent accounts, storing of Children's Online Privacy Protection Act (COPPA) compliancy information, push notification framework and server, and/or the like.

The asset integration system might tie directly in the data that is hosted in the server(s), which in turn might run on the web service solutions. The server data can be synced between the production management system and the server, with hooks into the assets created in the asset production system and the asset integration system, etc. This allows for tracking assets and versions from pre-production all the way through to delivery to release of the platform. The server can track devices, assets, and users, and can create custom analytics that will drive better user retention and monetization of the framework across every platform on which the asset is available.

Delivery Platforms:

Using the asset integration system, and delivery of the asset or media content dynamically through the server(s), multiple platforms can be quickly supported and at a much lower cost than manual delivery methods. Various delivery platforms can be used, including, but not limited to, Google Cardboard, Samsung Gear VR°, Google Daydream™, Microsoft HoloLens™, Oculus, HTC Vive™, Sony PlayStation VR°, and/or the like.

Syncing:

Using proprietary tools, both in the server and the front-end client, the server controls all aspects of the user experience. Syncing with the production management system, the server maintains the latest, up-to-date information on assets, updates, users, devices, and the like, and runs up-to-the-minute analytics on anything and everything related to the applications, assets, etc., both for testing as well as for release.

Users, COPPA compliancy tracking, application flow and structure, etc. can be managed through custom interfaces into the data through the servers. The servers utilize various tools (e.g., MongoDB®, Node.js, ReST, custom APIs, etc.) that communicate with client devices, which may be located anywhere in the world. They rely on a stateless, client-server, cacheable communications protocols, with the ability to scale to millions of users dynamically.

Utilizing the multiversion concurrency control ("MVCC") approach to database management allows the platform to update data in client applications within minutes. Changing story points or flow, removing or adding assets, and the like are straightforward and immediately available to all of the client devices.

Users, installations, geo-locations, time spent in the user experiences, and/or the like, down to the granular level of time spent in a specific location (e.g., virtual location, etc.) in an asset application can be tracked and fed through the servers for custom analytics that can be used to track retention, user funnels for events, and a myriad of custom reports that allow for continual refinement and honing of the process for offering the user experience, using real customer data.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, augmented reality technology, virtual reality technology, mixed reality technology, interactive gaming technology, and/or the like. In other aspects, certain embodiments, can improve the functioning of a computer or network system itself (e.g., computing devices or systems, user devices, or the like for performing the functionalities described below, etc.), for example, by determining, with a computer system, a field of view of a user, the field of view including at least a portion of the printed publication, modifying, with the computer system, an orientation of the one or more media content to align with the field of view of the user, and presenting, with a visual output device and to the user, the one or more media content whose orientation has been modified to align with the field of view of the user, such that the one or more media content is presented as a virtual overlay in relation to the at least a portion of the printed publication, thereby improving the functioning of an augmented or virtual reality interface for a user by generating virtual projections of media content that seem more realistic, by shifting between two of augmented reality, mixed reality, and virtual reality in a seamless manner (which requires simulation and modification of media content to maintain proper perspectives particularly as the user is moving about and changing his or her field of view), and presenting media content in AR, mixed reality, or VR based on the shifting, and/or the like. In particular, to the extent any abstract concepts are present in the various embodiments, those concepts can be implemented as described herein by devices, software, systems, and methods that involve specific novel functionality (e.g., steps or operations), such as modifying, with the computer system, an orientation of the one or more media content to align with the field of view of the user, and presenting, with a visual output device and to the user, the one or more media content whose orientation has been modified to align with the field of view of the user, such that the one or more media content is presented as a virtual overlay in relation to the at least a portion of the printed publication, or enabling shifting between two of augmented reality, mixed reality, and virtual reality in a seamless manner (which requires simulation and modification of media content to maintain proper perspectives particularly as the user is moving about and changing his or her field of view), and presenting media content in AR, mixed reality, or VR based on the shifting, and/or the like, to name a few examples, that extend beyond mere conventional computer processing operations. These functionalities can produce tangible results outside of the implementing computer system, including, merely by way of example, ability to generate 3D virtual projections of media content in relation to physical publications that seem realistic to a user, ability to seamlessly transition between two of augmented reality, mixed reality, and virtual reality thereby providing the user with an immersive interactive environment, and/or the like, which may be observed or measured by customers and/or service providers.

In an aspect, a method might comprise capturing, with a first camera, one or more images of at least a portion of a printed publication; analyzing, with a computing system, the captured one or more images of the at least a portion of the printed publication to determine whether the captured one or more images contain one or more triggers; and, based on a determination that the captured one or more images contain at least one trigger of the one or more triggers, identifying, with the computing system, one or more media content of a plurality of media content that are associated with the at least one trigger. The method might also comprise determining, with the computer system, a field of view of a user, the field of view including at least a portion of the printed publication and modifying, with the computer system, an orientation of the one or more media content to align with the field of view of the user. The method might further comprise presenting, with a visual output device and to the user, the one or more media content whose orientation has been modified to align with the field of view of the user, such that the one or more media content is presented as a virtual overlay in relation to the at least a portion of the printed publication.

In some embodiments, the visual output device might comprise one of a VR headset, an AR headset, a set of AR glasses, a tablet computer, a set of bionic contact lenses, a smart phone adapted as part of a VR headset, or a smart phone adapted as part of an AR system, and/or the like. In some cases, the visual output device might comprise the first camera. Alternatively, the first camera might be external to the visual output device, while being communicatively coupled to the visual output device.

According to some embodiments, the visual output device might comprise a second camera that captures one or more images of eyes of the user as the first camera captures the one or more images of the at least a portion of the printed publication, and determining, with the computer system, a field of view of a user might comprise determining, with the computer system, a field of view of a user based on an analysis of the captured one or more images of the eyes of the user.

In some instances, the printed publication might comprise one of a fiction novel, a nonfiction novel, a children's book, a newspaper, a magazine, a comic book, a comic strip, a graphic novel, an encyclopedia, a dictionary, a map, a calendar, a greeting card, a bookmark, a venue or event ticket stub, or a poster, and/or the like. The at least one trigger, according to some embodiments, might each comprise one of a QR code provided on the at least a portion of the publication, a barcode provided on the at least a portion of the publication, a graphical code provided on a sticker affixed to the at least a portion of the publication, a graphic printed on the at least a portion of the publication, a keyword or key code printed on the at least a portion of the publication, a cover image of the printed publication, a title printed on a cover of the printed publication, author name printed on the cover of the printed publication, a stuffed character associated with the printed publication that is positioned in proximity to the printed publication, a 3D-printed character associated with the printed publication that is positioned in proximity to the printed publication, or a 3D-printed object associated with the printed publication that is positioned in proximity to the printed publication, and/or the like.

In some cases, the one or more media content might comprise at least one of a 3D still graphic, a 3D animated graphic, or a 3D interactive animated graphic, and/or the like. Each of the 3D still graphic, the 3D animated graphic, or the 3D interactive animated graphic might comprise at least one of a graphic representation of one or more characters associated with the printed publication, a non-fictional geographical location associated with the printed publication, a fictional geographical location associated with the printed publication, a room associated with the printed publication, a building associated with the printed publication, a scene described in the printed publication, a scene inspired by the scene described in the printed publication, one or more items described in the printed publication, or one or more items inspired by the one or more items described in the printed publication, and/or the like.

In some embodiments, presenting the one or more media content might comprise presenting, with the visual output device and to the user, the one or more media content whose orientation has been modified to align with the field of view of the user, such that the one or more media content is at least one of presented as a virtual overlay above a cover of the printed publication, presented as a virtual overlay on a cover of the printed publication, presented as a virtual overlay beside the printed publication, presented as a virtual overlay above a page of the printed publication, presented as a virtual overlay on a page of the printed publication, presented as a virtual overlay in front of a surface of the printed publication, presented as a virtual overlay in front of a binding of the printed publication, presented as a virtual overlay above a 2D graphic printed on a portion of the printed publication, or presented as a virtual overlay on a 2D graphic printed on a portion of the printed publication, and/or the like. In some cases, the computing system might comprise at least one of a server computer, a cloud computing system, or a computing system of the visual output device, and/or the like.

In another aspect, an apparatus might comprise a first camera, a display device, at least one processor, and a non-transitory computer readable medium. The non-transitory computer readable medium might have stored thereon computer software comprising a set of instructions that, when executed by the at least one processors, causes the apparatus to: capture, with the first camera, one or more images of at least a portion of a printed publication; analyze the captured one or more images of the at least a portion of the printed publication to determine whether the captured one or more images contain one or more triggers; based on a determination that the captured one or more images contain at least one trigger, identify one or more media content of a plurality of media content that are associated with the at least one trigger; determine a field of view of a user, the field of view including at least a portion of the printed publication; modify an orientation of the one or more media content to align with the field of view of the user; and present, with the display device and to the user, the one or more media content whose orientation has been modified to align with the field of view of the user, such that the one or more media content is presented as a virtual overlay in relation to the at least a portion of the printed publication.

In some embodiments, the apparatus might comprise one of a VR headset, an AR headset, a set of AR glasses, a tablet computer, a set of bionic contact lenses, a smart phone adapted as part of a VR headset, or a smart phone adapted as part of an AR system, and/or the like.

In some cases, the apparatus might further comprise a second camera. The set of instructions, when executed by the one or more processors, might further cause the apparatus to: capture, with the second camera, one or more images of eyes of the user as the first camera captures the one or more images of the at least a portion of the printed publication. Determining a field of view of a user might comprise determining a field of view of a user based on an analysis of the captured one or more images of the eyes of the user.

According to some embodiments, the printed publication might comprise one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster, and/or the like. In some cases, the at least one trigger might each comprise one of a QR code provided on the at least a portion of the publication, a barcode provided on the at least a portion of the publication, a graphical code provided on a sticker affixed to the at least a portion of the publication, a graphic printed on the at least a portion of the publication, a keyword or key code printed on the at least a portion of the publication, a cover image of the printed publication, a title printed on a cover of the printed publication, author name printed on the cover of the printed publication, a stuffed character associated with the printed publication that is positioned in proximity to the printed publication, a 3D-printed character associated with the printed publication that is positioned in proximity to the printed publication, or a 3D-printed object associated with the printed publication that is positioned in proximity to the printed publication, and/or the like.

Merely by way of example, the one or more media content might comprise at least one of a 3D still graphic, a 3D animated graphic, or a 3D interactive animated graphic, and/or the like. Each of the 3D still graphic, the 3D animated graphic, or the 3D interactive animated graphic might comprise at least one of a graphic representation of one or more characters associated with the printed publication, a nonfictional geographical location associated with the printed publication, a fictional geographical location associated with the printed publication, a room associated with the printed publication, a building associated with the printed publication, a scene described in the printed publication, a scene inspired by the scene described in the printed publication, one or more items described in the printed publication, or one or more items inspired by the one or more items described in the printed publication, and/or the like.

In some embodiments, presenting the one or more media content might comprise presenting, with the display device and to the user, the one or more media content whose orientation has been modified to align with the field of view of the user, such that the one or more media content is at least one of presented as a virtual overlay above a cover of the printed publication, presented as a virtual overlay on a cover of the printed publication, presented as a virtual overlay beside the printed publication, presented as a virtual overlay above a page of the printed publication, presented as a virtual overlay on a page of the printed publication, presented as a virtual overlay in front of a surface of the printed publication, presented as a virtual overlay in front of a binding of the printed publication, presented as a virtual overlay above a 2D graphic printed on a portion of the printed publication, or presented as a virtual overlay on a 2D graphic printed on a portion of the printed publication, and/or the like.

In yet another aspect, a system might comprise an image capture device, a computing system, and a visual output device. The image capture device might comprise a first camera, at least one first processor, and a first non-transitory computer readable medium. The first non-transitory computer readable medium might have stored thereon computer software comprising a first set of instructions that, when executed by the at least one first processors, causes the image capture device to: capture, with the first camera, one or more images of at least a portion of a printed publication and send the captured one or more images to the computing system.

The computing system might comprise at least one second processor and a second non-transitory computer readable medium. The second non-transitory computer readable medium might have stored thereon computer software comprising a second set of instructions that, when executed by the at least one second processors, causes the computing system to: receive the captured one or more images from the image capture device; analyze the captured one or more images of the at least a portion of the printed publication to determine whether the captured one or more images contain one or more triggers; based on a determination that the captured one or more images contain at least one trigger, identify one or more media content of a plurality of media content that are associated with the at least one trigger; determine a field of view of a user, the field of view including at least a portion of the printed publication; modify an orientation of the one or more media content to align with the field of view of the user; and send the one or more media content whose orientation has been modified to align with the field of view of the user to the visual output device.

The visual output device might comprise a display device, at least one third processor, and a third non-transitory computer readable medium. The third non-transitory computer readable medium might have stored thereon computer software comprising a third set of instructions that, when executed by the at least one third processors, causes the visual output device to: receive the one or more media content whose orientation has been modified to align with the field of view of the user from the computing system; and present, with the display device and to the user, the one or more media content whose orientation has been modified to align with the field of view of the user, such that the one or more media content is presented as a virtual overlay in relation to the at least a portion of the printed publication.

In some embodiments, the visual output device might comprise one of a VR headset, an AR headset, a set of AR glasses, a tablet computer, a set of bionic contact lenses, a smart phone adapted as part of a VR headset, or a smart phone adapted as part of an AR system, and/or the like. In some cases, the visual output device might comprise the image capture device.

According to some embodiments, the visual output device might comprise a second camera that captures one or more images of eyes of the user as the first camera captures the one or more images of the at least a portion of the printed publication, and determining, with the computer system, a field of view of a user might comprise determining, with the computer system, a field of view of a user based on an analysis of the captured one or more images of the eyes of the user.

In some instances, the printed publication might comprise one of a fiction novel, a nonfiction novel, a children's book, a newspaper, a magazine, a comic book, a comic strip, a graphic novel, an encyclopedia, a dictionary, a map, a calendar, a greeting card, a bookmark, a venue or event ticket stub, or a poster, and/or the like. The at least one trigger, according to some embodiments, might each comprise one of a QR code provided on the at least a portion of the publication, a barcode provided on the at least a portion of the publication, a graphical code provided on a sticker affixed to the at least a portion of the publication, a graphic printed on the at least a portion of the publication, a keyword or key code printed on the at least a portion of the publication, a cover image of the printed publication, a title printed on a cover of the printed publication, author name printed on the cover of the printed publication, a stuffed character associated with the printed publication that is positioned in proximity to the printed publication, a 3D-printed character associated with the printed publication that is positioned in proximity to the printed publication, or a 3D-printed object associated with the printed publication that is positioned in proximity to the printed publication, and/or the like.

In some cases, the one or more media content might comprise at least one of a 3D still graphic, a 3D animated graphic, or a 3D interactive animated graphic, and/or the like. Each of the 3D still graphic, the 3D animated graphic, or the 3D interactive animated graphic might comprise at least one of a graphic representation of one or more characters associated with the printed publication, a non-fictional geographical location associated with the printed publication, a fictional geographical location associated with the printed publication, a room associated with the printed publication, a building associated with the printed publication, a scene described in the printed publication, a scene inspired by the scene described in the printed publication, one or more items described in the printed publication, or one or more items inspired by the one or more items described in the printed publication, and/or the like.

In some embodiments, presenting the one or more media content might comprise presenting, with the visual output device and to the user, the one or more media content whose orientation has been modified to align with the field of view of the user, such that the one or more media content is at least one of presented as a virtual overlay above a cover of the printed publication, presented as a virtual overlay on a cover of the printed publication, presented as a virtual overlay beside the printed publication, presented as a virtual overlay above a page of the printed publication, presented as a virtual overlay on a page of the printed publication, presented as a virtual overlay in front of a surface of the printed publication, presented as a virtual overlay in front of a binding of the printed publication, presented as a virtual overlay above a 2D graphic printed on a portion of the printed publication, or presented as a virtual overlay on a 2D graphic printed on a portion of the printed publication, and/or the like. In some cases, the computing system might comprise at least one of a server computer, a cloud computing system, or a computing system of the visual output device, and/or the like.

In still another aspect, a method might comprise establishing communications between a visual output device and at least one trigger of one or more non-visual triggers associated with a printed publication and, in response to establishing communications between the visual output device and the at least one trigger, identifying, with the computing system, one or more media content of a plurality of media content that are associated with the at least one trigger. The method might also comprise determining, with the computer system, a field of view of a user, the field of view including at least a portion of the printed publication and modifying, with the computer system, an orientation of the one or more media content to align with the field of view of the user. The method might further comprise presenting, with the visual output device and to the user, the one or more media content whose orientation has been modified to align with the field of view of the user, such that the one or more media content is presented as a virtual overlay in relation to the at least a portion of the printed publication.

According to some embodiments, establishing communications between the visual output device and the at least one trigger might comprise: determining, with the computing system, whether the visual output device is within communications range of the one or more non-visual triggers associated with the printed publication; and, based on a determination that the visual output device is within communications range of the at least one trigger of the one or more non-visual triggers, establishing communications between the visual output device and the at least one trigger.

In some embodiments, the visual output device might comprise one of a VR headset, an AR headset, a set of AR glasses, a tablet computer, a set of bionic contact lenses, a smart phone adapted as part of a VR headset, or a smart phone adapted as part of an AR system, and/or the like. In some cases, the visual output device might comprise a camera that captures one or more images of eyes of the user as the user is looking toward the at least a portion of the printed publication, and determining, with the computer system, a field of view of a user comprises determining, with the computer system, a field of view of a user based on an analysis of the captured one or more images of the eyes of the user.

Merely by way of example, in some cases, the printed publication might comprise one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster, and/or the like. In some instances, the at least one trigger might each comprise one of a RFID tag, a BLE tag, a NFC tag, or a RTLS tag, and/or the like.

In some cases, the one or more media content might comprise at least one of a 3D still graphic, a 3D animated graphic, or a 3D interactive animated graphic, and/or the like. Each of the 3D still graphic, the 3D animated graphic, or the 3D interactive animated graphic might comprise at least one of a graphic representation of one or more characters associated with the printed publication, a non-fictional geographical location associated with the printed publication, a fictional geographical location associated with the printed publication, a room associated with the printed publication, a building associated with the printed publication, a scene described in the printed publication, a scene inspired by the scene described in the printed publication, one or more items described in the printed publication, or one or more items inspired by the one or more items described in the printed publication, and/or the like.

In some embodiments, presenting the one or more media content might comprise presenting, with the visual output device and to the user, the one or more media content whose orientation has been modified to align with the field of view of the user, such that the one or more media content is at least one of presented as a virtual overlay above a cover of the printed publication, presented as a virtual overlay on a cover of the printed publication, presented as a virtual overlay beside the printed publication, presented as a virtual overlay above a page of the printed publication, presented as a virtual overlay on a page of the printed publication, presented as a virtual overlay in front of a surface of the printed publication, presented as a virtual overlay in front of a binding of the printed publication, presented as a virtual overlay above a 2D graphic printed on a portion of the printed publication, or presented as a virtual overlay on a 2D graphic printed on a portion of the printed publication, and/or the like. In some cases, the computing system might comprise at least one of a server computer, a cloud computing system, or a computing system of the visual output device, and/or the like.

In another aspect, an apparatus might comprise a wireless communications device, a display device, at least one processor, and a non-transitory computer readable medium. The non-transitory computer readable medium might have stored thereon computer software comprising a set of instructions that, when executed by the at least one processors, causes the apparatus to: establish, with the wireless communications device, communications between a visual output device and at least one trigger of one or more non-visual triggers associated with a printed publication; in response to establishing communications between the visual output device and the at least one trigger, identify one or more media content of a plurality of media content that are associated with the at least one trigger; determine a field of view of a user, the field of view including at least a portion of the printed publication; modify an orientation of the one or more media content to align with the field of view of the user; and present, with the display device and to the user, the one or more media content whose orientation has been modified to align with the field of view of the user, such that the one or more media content is presented as a virtual overlay in relation to the at least a portion of the printed publication.

In some embodiments, the apparatus might comprise one of a VR headset, an AR headset, a set of AR glasses, a tablet computer, a set of bionic contact lenses, a smart phone adapted as part of a VR headset, or a smart phone adapted as part of an AR system, and/or the like. In some cases, the apparatus might further comprise a camera that captures one or more images of eyes of the user as the user is looking toward the at least a portion of the printed publication, and determining, with the computer system, a field of view of a user comprises determining, with the computer system, a field of view of a user based on an analysis of the captured one or more images of the eyes of the user.

Merely by way of example, in some cases, the printed publication might comprise one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster, and/or the like. In some instances, the at least one trigger might each comprise one of a RFID tag, a BLE tag, a NFC tag, or a RTLS tag, and/or the like.

In some cases, the one or more media content might comprise at least one of a 3D still graphic, a 3D animated graphic, or a 3D interactive animated graphic, and/or the like.

In yet another aspect, a system might comprise a wireless communication device, a computing system, and a visual output device. The wireless communication device might comprise a transceiver, at least one first processor, and a first non-transitory computer readable medium. The first non-transitory computer readable medium might have stored thereon computer software comprising a first set of instructions that, when executed by the at least one first processors, causes the image capture device to: establish communications between a visual output device and at least one trigger of one or more non-visual triggers associated with a printed publication.

The computing system might comprise at least one second processor and a second non-transitory computer readable medium. The second non-transitory computer readable medium might have stored thereon computer software comprising a second set of instructions that, when executed by the at least one second processors, causes the computing system to: in response to establishing communications between the visual output device and the at least one trigger, identify one or more media content of a plurality of media content that are associated with the at least one trigger; determine a field of view of a user, the field of view including at least a portion of the printed publication; modify an orientation of the one or more media content to align with the field of view of the user; and send the one or more media content whose orientation has been modified to align with the field of view of the user to the visual output device.

The visual output device might comprise a display device, at least one third processor, and a third non-transitory computer readable medium. The third non-transitory computer readable medium might have stored thereon computer software comprising a third set of instructions that, when executed by the at least one third processors, causes the visual output device to: receive the one or more media content whose orientation has been modified to align with the field of view of the user from the computing system; and present, with the display device and to the user, the one or more media content whose orientation has been modified to align with the field of view of the user, such that the one or more media content is presented as a virtual overlay in relation to the at least a portion of the printed publication.

In another aspect, a method might comprise presenting, with a visual output device and to a user, one or more media content, such that the one or more media content is presented as a virtual overlay in relation to at least a portion of a physical object; and determining, with a computing system, how the one or more media content should be presented to the user. The method might also comprise, based on a determination to present the one or more media content as a virtual reality presentation, and based on a determination that the one or more media content is not already being presented as a virtual reality presentation, shifting, with the computing system, the presentation of the one or more media content to a virtual reality presentation, and presenting, with the visual output device and to the user, one or more second media content, the one or more second media content comprising virtual reality content. The method might further comprise, based on a determination to present the one or more media content as a mixed reality presentation, and based on a determination that the one or more media content is not already being presented as a mixed reality presentation, shifting, with the computing system, the presentation of the one or more media content to a mixed reality presentation, and presenting, with the visual output device and to the user, one or more third media content, the one or more third media content comprising mixed reality content.

In some embodiments, the visual output device might comprise one of a VR headset, an AR headset, a set of AR glasses, a tablet computer, a set of bionic contact lenses, a smart phone adapted as part of a VR headset, or a smart phone adapted as part of an AR system, and/or the like. In some cases, the physical object might comprise one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, a poster, a Christmas tree bulb, a Christmas tree ornament, a Hanukkah menorah, a gravestone, a sentimental artifact or ornament associated with the user, or a sentimental artifact or ornament associated with another individual who is associated with the user, and/or the like. In some instances, the one or more media content might comprise at least one of a 3D still graphic, a 3D animated graphic, or a 3D interactive animated graphic, and/or the like.

The method, according to some embodiments, might further comprise at least one of detecting, with one or more sensors, one or more physical characteristics of the user in response to stimuli from presentation of media content or receiving, with the computing system, a user input indicating selection of how the media content should be presented. In such embodiments, determining, with the computing system, how the one or more media content should be presented to the user might be based on at least one of analysis of the detected one or more physical characteristics of the user or the received user input. In some embodiments, the method might further comprise, based on a determination to present the one or more media content as an augmented reality presentation, and based on a determination that the one or more media content is not already being presented as an augmented reality presentation, shifting, with the computing system, the presentation of the one or more media content to an augmented reality presentation, and presenting, with the visual output device and to the user, one or more fourth media content, the one or more fourth media content comprising augmented reality content.

In yet another aspect, an apparatus might comprise a display device, at least one processor, and a non-transitory computer readable medium, the non-transitory computer readable medium having stored thereon computer software comprising a set of instructions that, when executed by the at least one processors, causes the apparatus to: present, with the display device and to a user, one or more media content, such that the one or more media content is presented as a virtual overlay in relation to at least a portion of a physical object; determine how the one or more media content should be presented to the user; based on a determination to present the one or more media content as a virtual reality presentation, and based on a determination that the one or more media content is not already being presented as a virtual reality presentation, shift the presentation of the one or more media content to a virtual reality presentation, and present, with the display device and to the user, one or more second media content, the one or more second media content comprising virtual reality content; and based on a determination to present the one or more media content as a mixed reality presentation, and based on a determination that the one or more media content is not already being presented as a mixed reality presentation, shift the presentation of the one or more media content to a mixed reality presentation, and present, with the display device and to the user, one or more third media content, the one or more third media content comprising mixed reality content.

In some embodiments, the apparatus might comprise one of a VR headset, an AR headset, a set of AR glasses, a tablet computer, a set of bionic contact lenses, a smart phone adapted as part of a VR headset, or a smart phone adapted as part of an AR system, and/or the like. In some cases, the physical object might comprise one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, a poster, a Christmas tree bulb, a Christmas tree ornament, a Hanukkah menorah, a gravestone, a sentimental artifact or ornament associated with the user, or a sentimental artifact or ornament associated with another individual who is associated with the user, and/or the like. In some instances, the one or more media content might comprise at least one of a 3D still graphic, a 3D animated graphic, or a 3D interactive animated graphic, and/or the like.

According to some embodiments, the apparatus might further comprise at least one of one or more sensors or one or more user input devices. The set of instructions, when executed by the one or more processors, further causes the apparatus to perform at least one of: detecting, with the one or more sensors, one or more physical characteristics of the user in response to stimuli from presentation of media content; or receiving, from the one or more user input devices, a user input indicating selection of how the media content should be presented. In such embodiments, determining how the one or more media content should be presented to the user might be based on at least one of analysis of the detected one or more physical characteristics of the user or the received user input.

In some instances, the set of instructions, when executed by the one or more processors, further causes the apparatus to: based on a determination to present the one or more media content as an augmented reality presentation, and based on a determination that the one or more media content is not already being presented as an augmented reality presentation, shift the presentation of the one or more media content to an augmented reality presentation, and present, with the display device and to the user, one or more fourth media content, the one or more fourth media content comprising augmented reality content.

In still another aspect, a system might comprise a visual output device and a computing system. The visual output device might comprise a display device, at least one first processor, and a first non-transitory computer readable medium. The first non-transitory computer readable medium might have stored thereon computer software comprising a first set of instructions that, when executed by the at least one first processors, causes the visual output device to: present, with the display device and to a user, one or more media content, such that the one or more media content is presented as a virtual overlay in relation to at least a portion of a physical object.

The computing system might comprise at least one second processor and a second non-transitory computer readable medium. The second non-transitory computer readable medium might have stored thereon computer software comprising a second set of instructions that, when executed by the at least one second processors, causes the computing system to: determine how the one or more media content should be presented to the user; based on a determination to present the one or more media content as a virtual reality presentation, and based on a determination that the one or more media content is not already being presented as a virtual reality presentation, shift the presentation of the one or more media content to a virtual reality presentation; and based on a determination to present the one or more media content as a mixed reality presentation, and based on a determination that the one or more media content is not already being presented as a mixed reality presentation, shift the presentation of the one or more media content to a mixed reality presentation.

The first set of instructions, when executed by the at least one first processors, might further cause the visual output device to: based on a determination to present the one or more media content as a virtual reality presentation, and based on a determination that the one or more media content is not already being presented as a virtual reality presentation, present, with the display device and to the user, one or more second media content, the one or more second media content comprising virtual reality content; and based on a determination to present the one or more media content as a mixed reality presentation, and based on a determination that the one or more media content is not already being presented as a mixed reality presentation, present, with the display device and to the user, one or more third media content, the one or more third media content comprising mixed reality content.

In another aspect, a method might comprise determining, with a computing system, how at least one of one or more first media content of a plurality of media content or one or more captured images of one or more physical objects should be presented to a user. The method might further comprise, based on a determination to present the one or more first media content as a virtual reality presentation, and based on a determination that the one or more first media content is not already being presented as a virtual reality presentation, controlling, with the computing system via a first API, an asset integration and control system to cause the asset integration and control system to modify the first media content to generate one or more second media content, the one or more second media content comprising virtual reality content, and sending, with the computing system via a second API, the one or more second media content to a first visual output device of a plurality of visual output devices that presents the one or more second media content to the user.

The method might also comprise, based on a determination to present the one or more first media content and the one or more captured images of the one or more physical objects as an augmented reality presentation, and based on a determination that the one or more first media content and the one or more captured images of the one or more physical objects are not already being presented as an augmented reality presentation, controlling, with the computing system via the first API, the asset integration and control system to cause the asset integration and control system to generate one or more third media content by modifying the one or more first media content as a virtual overlay in relation to the one or more captured images of the one or more physical objects, the one or more third media content comprising augmented reality content, and sending, with the computing system via the second API, the one or more third media content to the first visual output device that presents the one or more third media content to the user. The method might further comprise, based on a determination to present the one or more first media content and the one or more captured images of the one or more physical objects as a mixed reality presentation combining elements of virtual reality and augmented reality, and based on a determination that the one or more first media content and the one or more captured images of the one or more physical objects are not already being presented as a mixed reality presentation, controlling, with the computing system via the first API, the asset integration and control system to cause the asset integration and control system to generate one or more fourth media content based on the one or more first media content and the one or more captured images of the one or more physical objects, the one or more fourth media content comprising mixed reality content, and sending, with the computing system via the second API, the one or more fourth media content to the first visual output device that presents the one or more fourth media content to the user.

In some embodiments, the method might further comprise tracking, with the computing system, a real-time status of each of the plurality of the media content in each of at least one of the asset integration and control system via the first API, the first visual output device via the second API, an asset production system via a third API, and a production management system via a fourth API. In some cases, the method might also comprise distributing, with the computing system, at least one fifth media content of the plurality of the media content whose status indicate it is ready for integration from the asset production system to the asset integration and control system and distributing, with the computing system, at least one sixth media content of the plurality of the media content whose status indicate it is ready for distribution from the asset integration and control system to the first visual output device. In some instances, the method might further comprise syncing, with the computing system, the at least one sixth media content with one or more second visual output devices of the plurality of visual output devices, the one or more second visual output devices being separate from the first visual output device and, in response to receiving updates to the at least one sixth media content, sending, with the computing system, the updates to the at least one sixth media content to each of the first visual output device and each of the one or more second visual output devices.

According to some embodiments, the method might further comprise receiving, with the computing system, the one or more first media content from an asset production system via a third API and receiving, with the computing system, the one or more captured images of the one or more physical objects from an image capture device. In some embodiments, the method might further comprise determining, with the computing system, that the one or more first media content is ready for distribution to the first visual output device; sending, with the computing system, one or more first messages to a production management system via a fourth API, wherein the one or more first messages causes the production management system to change a status of the one or more first media content to indicate that the one or more first media content is ready for distribution to the first visual output device; and sending, with the computing system, one or more second messages to the asset production system via the third API, wherein the one or more second messages causes the asset production system to send the one or more first media content to the computing system via the third API.

In some cases, the method might further comprise determining, with the computing system, that one or more second media content is not ready for distribution to the first visual output device; sending, with the computing system, one or more third messages to a production management system via a fourth API, wherein the one or more third messages causes the production management system to change a status of the one or more second media content to indicate that the one or more second media content is not ready for distribution to the first visual output device; and sending, with the computing system, one or more fourth messages to an asset production system via the third API, wherein the one or more fourth messages causes the asset production system to send the one or more fifth messages to one or more developers to continue work on the one or more second media content.

In some instances, the computing system might comprise at least one of a server computer, a cloud computing system, or a computing system of the visual output device, and/or the like. According to some embodiments, the plurality of visual output devices might each comprise one of a VR headset, an AR headset, a set of AR glasses, a tablet computer, a set of bionic contact lenses, a smart phone adapted as part of a VR headset, or a smart phone adapted as part of an AR system, and/or the like.

In yet another aspect, a computing system might comprise at least one processor and a non-transitory computer readable medium, the non-transitory computer readable medium having stored thereon computer software comprising a set of instructions that, when executed by the at least one processors, causes the computing system to: determine how at least one of one or more first media content of a plurality of media content or one or more captured images of one or more physical objects should be presented to a user; based on a determination to present the one or more first media content as a virtual reality presentation, and based on a determination that the one or more first media content is not already being presented as a virtual reality presentation, control, via a first API, an asset integration and control system to cause the asset integration and control system to modify the first media content to generate one or more second media content, the one or more second media content comprising virtual reality content, and send, via a second API, the one or more second media content to a first visual output device of a plurality of visual output devices that presents the one or more second media content to the user; based on a determination to present the one or more first media content and the one or more captured images of the one or more physical objects as an augmented reality presentation, and based on a determination that the one or more first media content and the one or more captured images of the one or more physical objects are not already being presented as an augmented reality presentation, control, via the first API, the asset integration and control system to cause the asset integration and control system to generate one or more third media content by modifying the one or more first media content as a virtual overlay in relation to the one or more captured images of the one or more physical objects, the one or more third media content comprising augmented reality content, and send, via the second API, the one or more third media content to the first visual output device that presents the one or more third media content to the user; and based on a determination to present the one or more first media content and the one or more captured images of the one or more physical objects as a mixed reality presentation combining elements of virtual reality and augmented reality, and based on a determination that the one or more first media content and the one or more captured images of the one or more physical objects are not already being presented as a mixed reality presentation, control, via the first API, the asset integration and control system to cause the asset integration and control system to generate one or more fourth media content based on the one or more first media content and the one or more captured images of the one or more physical objects, the one or more fourth media content comprising mixed reality content, and send, via the second API, the one or more fourth media content to the first visual output device that presents the one or more fourth media content to the user.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

Figure 8:
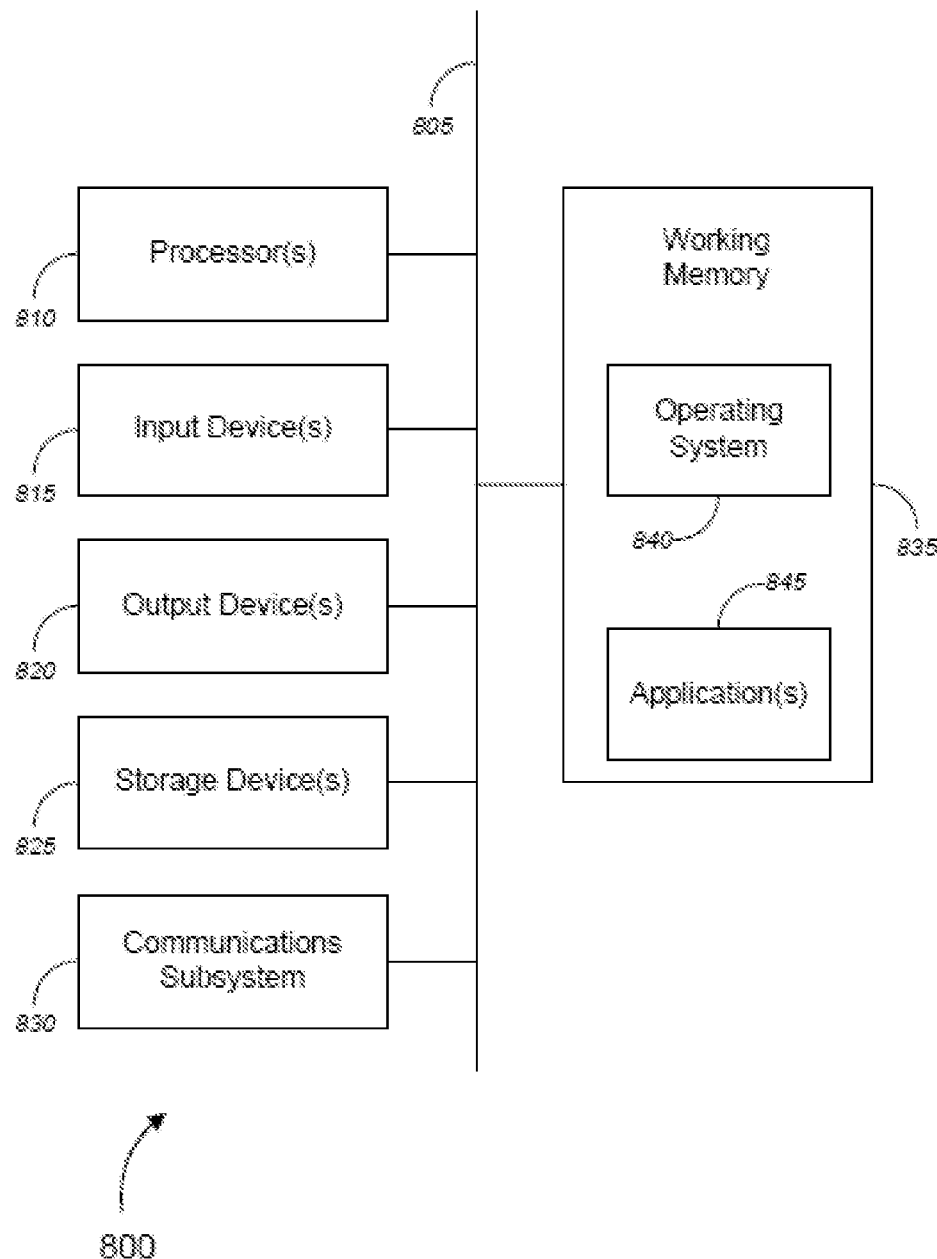
FIG. 8 is a block diagram illustrating an exemplary computer or system hardware architecture, in accordance with various embodiments.
Figure 9:
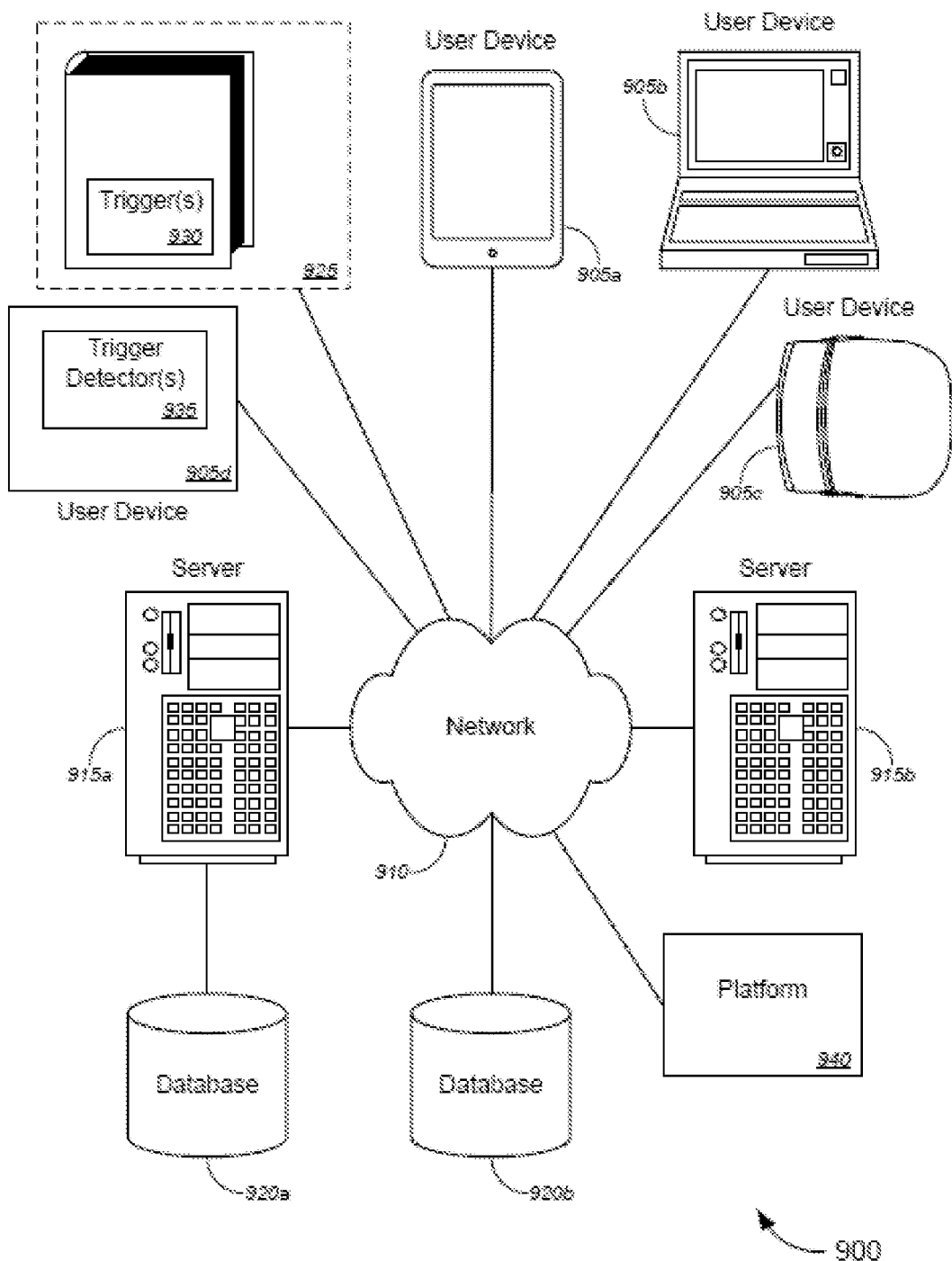
FIG. 9 is a block diagram illustrating a networked system of computers, which can be used in accordance with various embodiments.
Figure 10:
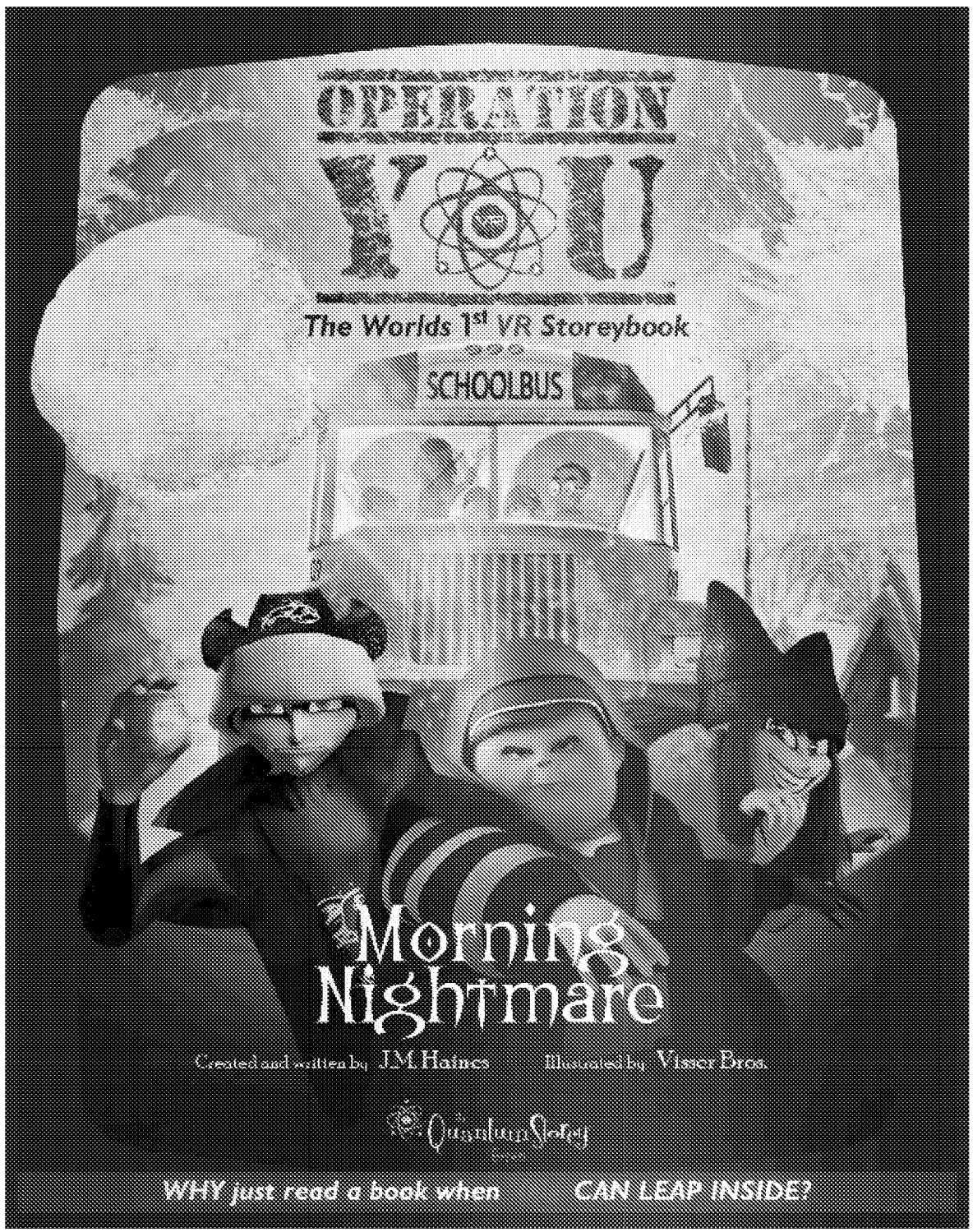
FIGS. 10-25 illustrate an exemplary e-book.
Figure 11:
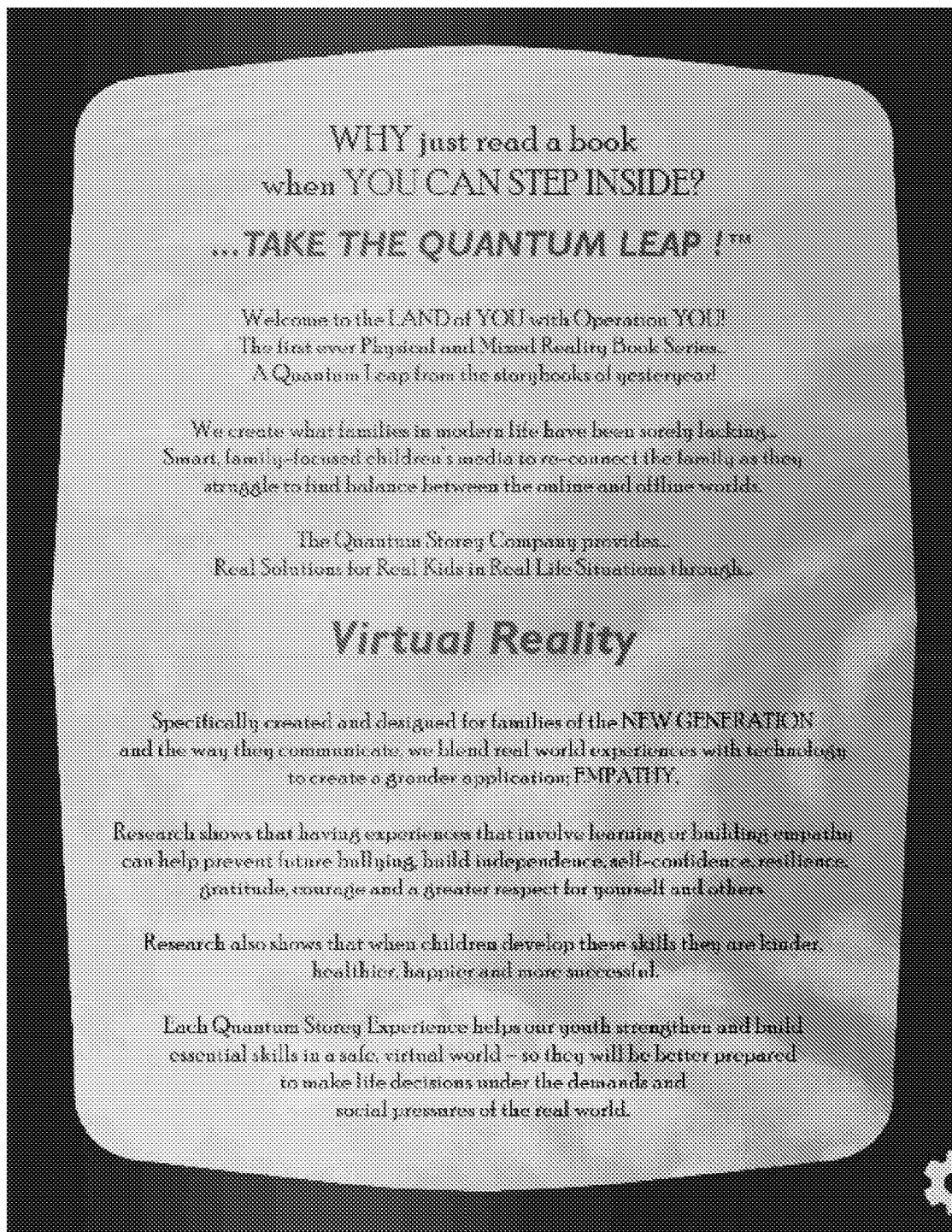
Figure 12:
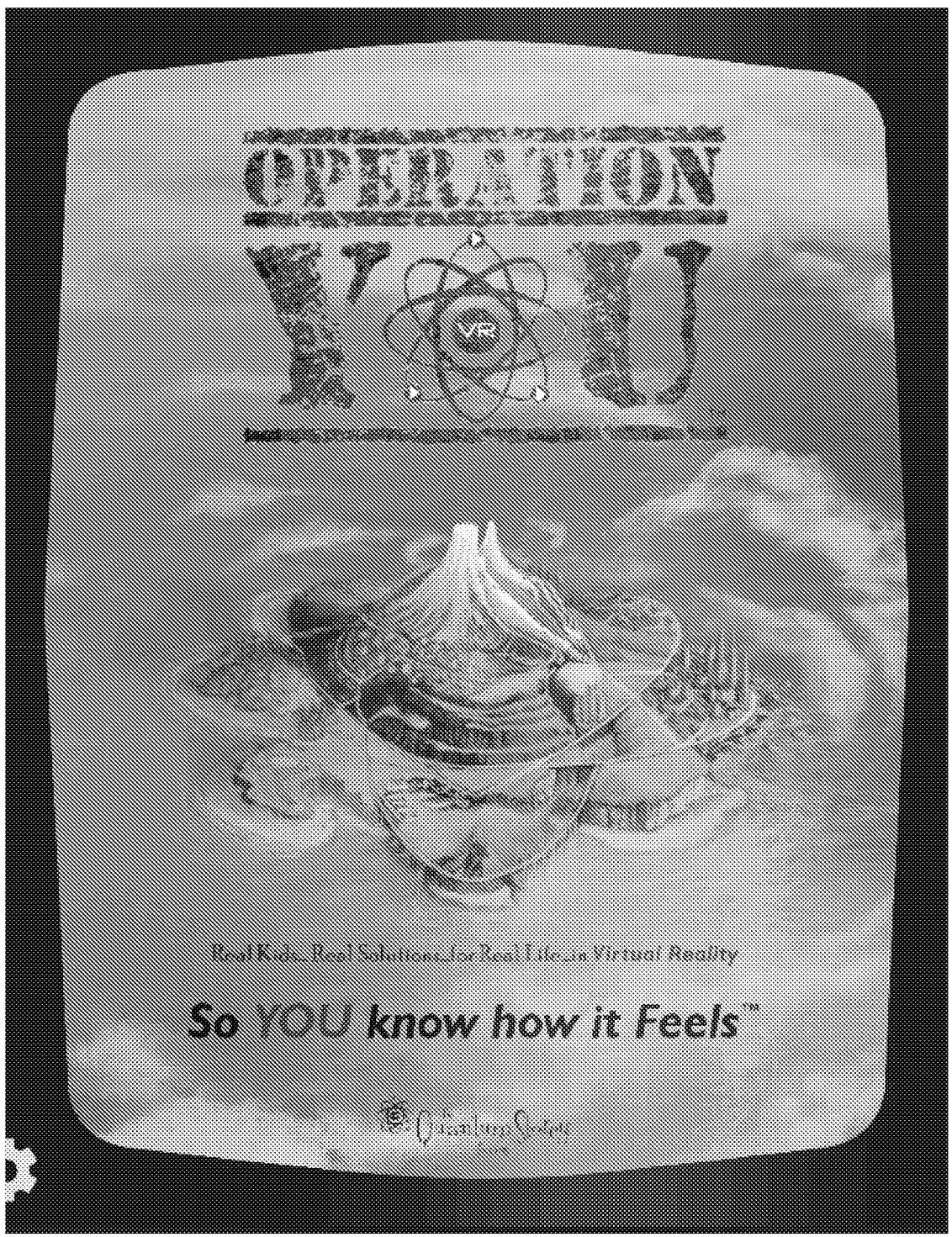
Figure 13:
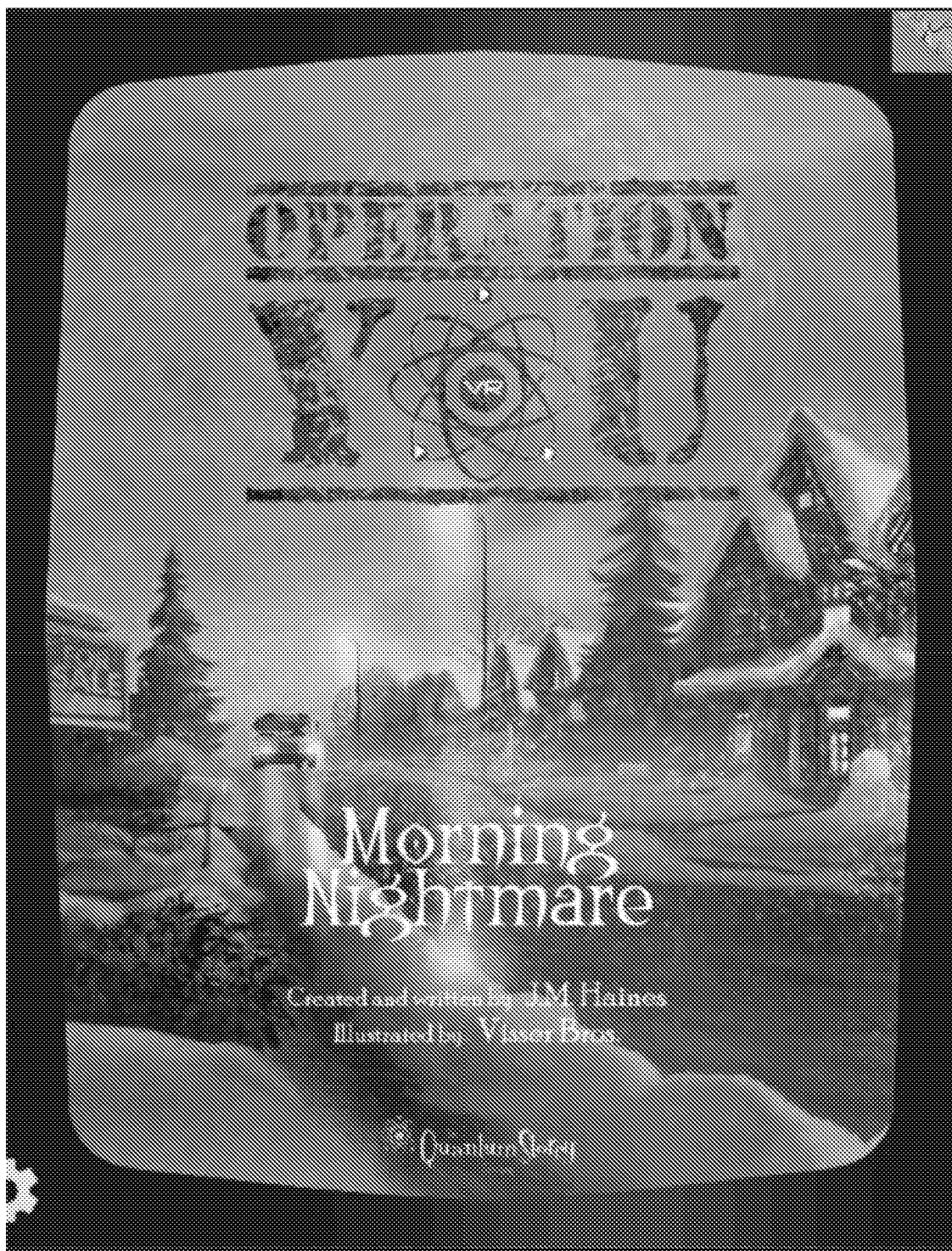
Figure 14:
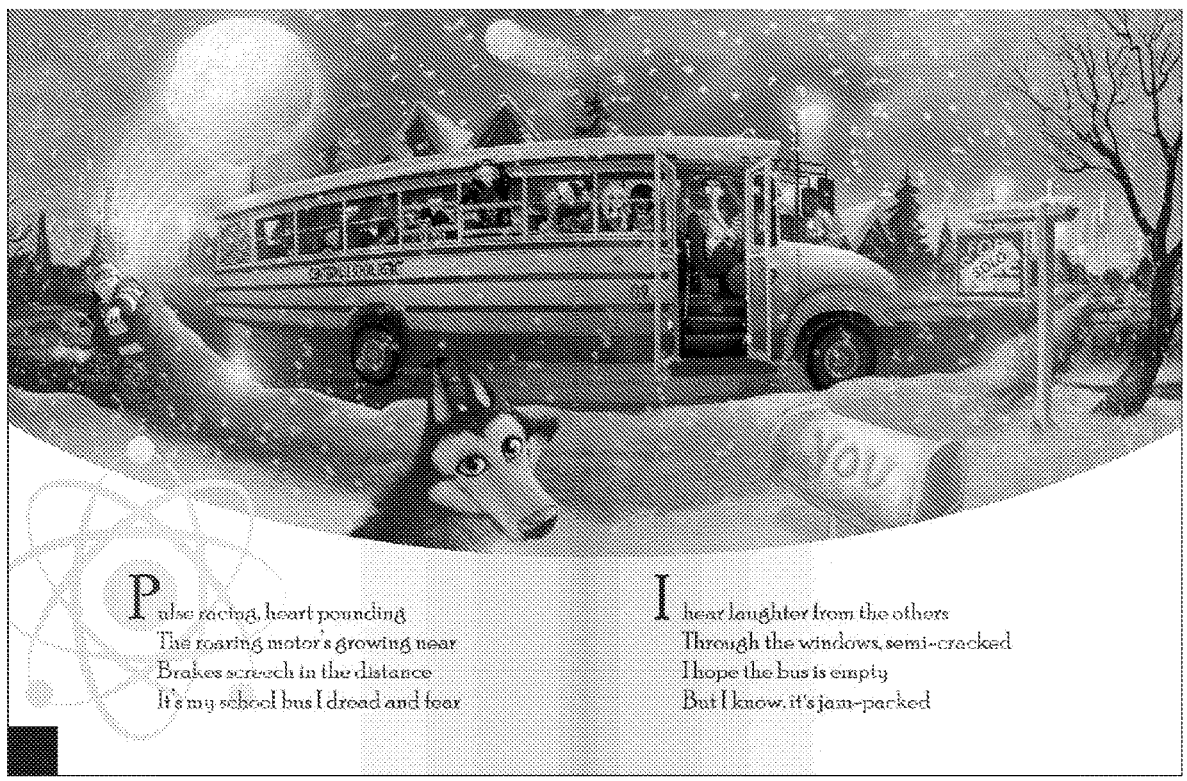
Figure 15:
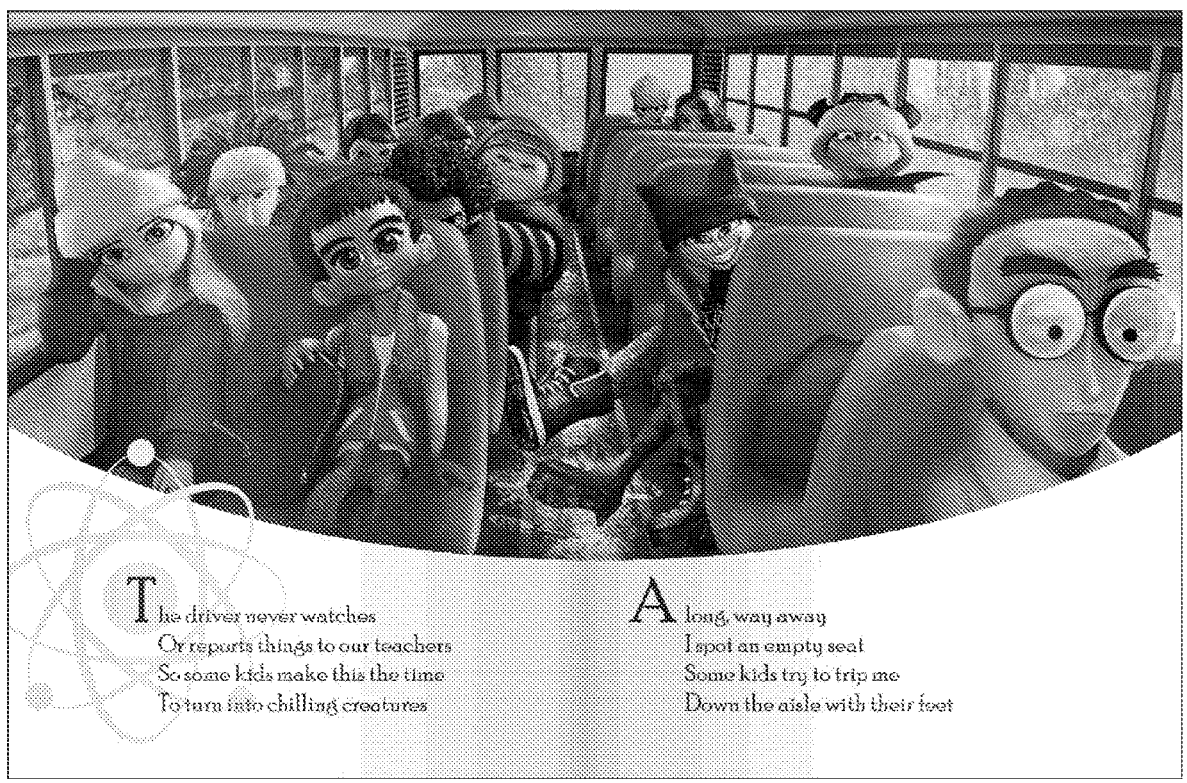
Figure 16:
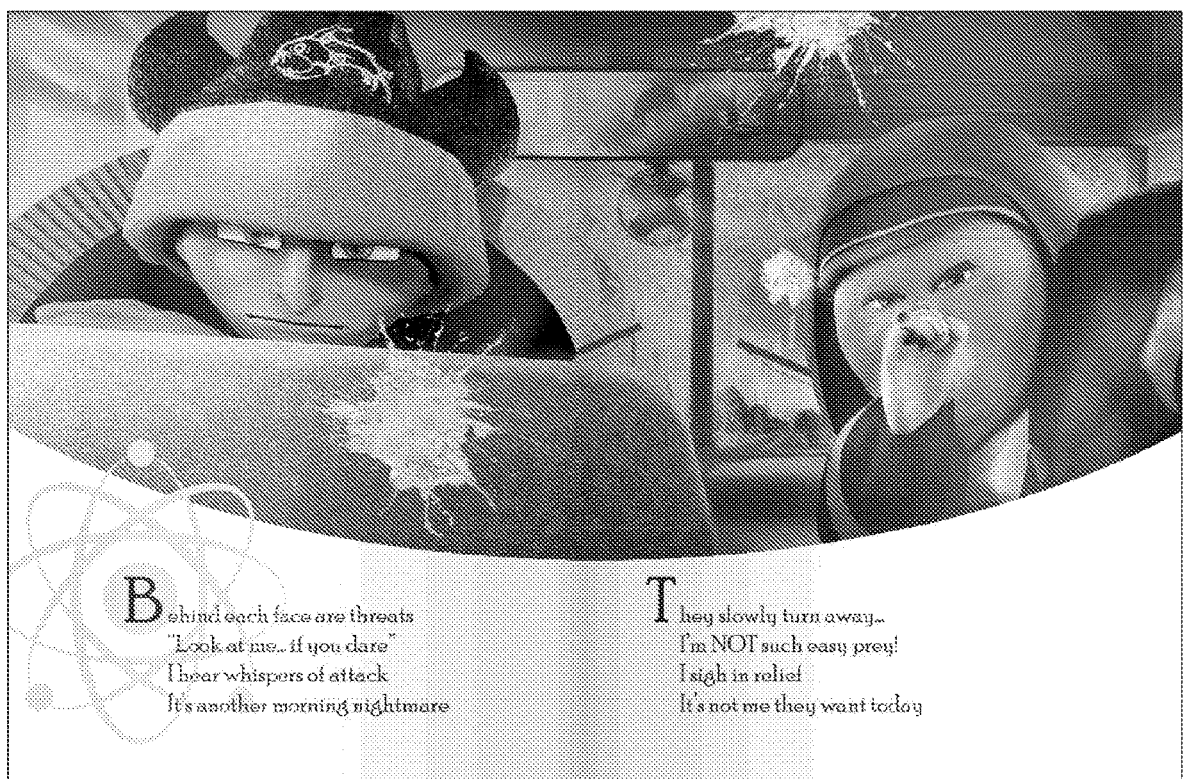
Figure 17:
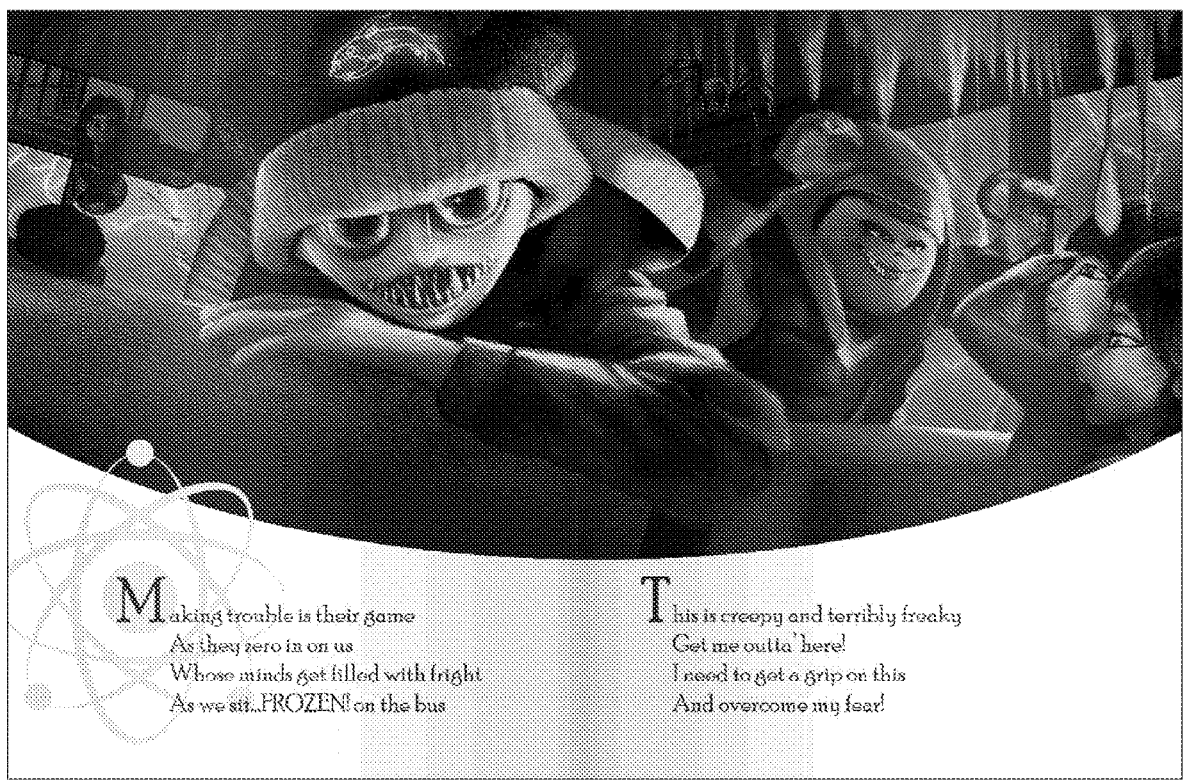
Figure 18:

We now turn to the embodiments as illustrated by the drawings. FIGS. 1-9 illustrate some of the features of the method, system, and apparatus for implementing computer-simulated reality interactions, and, in particular embodiments, to methods, systems, and computer software for implementing computer-simulated reality interactions between users and physical publications, as referred to above. FIGS. 1-5 are directed to the methods, systems, and apparatuses for implemented computer-simulated reality user experiences, while FIGS. 6 and 7 are directed to the methods, systems, and apparatuses for implemented computer-simulated reality platform, and FIGS. 8 and 9 are directed to the hardware systems for implementing the computer-simulated reality user experiences and the computer-simulated reality platform. The methods, systems, and apparatuses illustrated by FIGS. 1-9 refer to examples of different embodiments that include various components and steps, which can be considered alternatives, or which can be used in conjunction with one another in the various embodiments. The description of the illustrated methods, systems, and apparatuses shown in FIGS. 1-9 is provided for purposes of illustration and should not be considered to limit the scope of the different embodiments.

Computer-Simulated Reality UX

With reference to the figures, FIG. 1 is a schematic diagram illustrating a system 100 for implementing computer-simulated reality interactions between users and physical publications, in accordance with various embodiments.

In the non-limiting embodiment of FIG. 1, system 100 might comprise one or more user devices 105 (also referred to herein as "visual output devices" or the like). Although specific embodiments of user devices 105 are shown in FIG. 1 (e.g., a tablet computer, a smart phone, and a virtual reality or augmented reality headset), the various embodiments are not so limited, and each user device 105 might include, without limitation, one of a VR headset, an AR headset, a set of AR glasses, a tablet computer, a set of bionic contact lenses, a smart phone adapted as part of a VR headset, or a smart phone adapted as part of an AR system, and/or the like. In some embodiments, system 100 might further comprise a computing system 110 (including, without limitation, a server computer, a cloud computing system, and/or the like) that is separate from, or remote from, the one or more user devices 105, and that is accessible via network 115 over a wired connection (e.g., as shown in FIG. 1 by the solid line between the one or more user devices 105 and the network 115) or over a wireless connection (e.g., as shown in FIG. 1 by the lightning bolt symbol between the one or more user devices 105 and the network 115). In some cases, the network 115 might include, but is not limited to, a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

According to some embodiments, system 100 might further comprise a printed publication 125. Although a specific embodiment of the printed publication 125 is shown in FIG. 1 (e.g., a book), the various embodiments are not so limited and the printed publication 125 can include, without limitation, one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster, and/or the like. In some embodiments, one or more triggers 130 might be provided on at least a portion of the printed publication, and might each include, but is not limited to, one of a QR code provided on the at least a portion of the publication, a barcode provided on the at least a portion of the publication, a graphical code provided on a sticker affixed to the at least a portion of the publication, a graphic printed on the at least a portion of the publication, a keyword or key code printed on the at least a portion of the publication, a cover image of the printed publication, a title printed on a cover of the printed publication, author name printed on the cover of the printed publication, a stuffed character associated with the printed publication that is positioned in proximity to the printed publication, a 3D-printed character associated with the printed publication that is positioned in proximity to the printed publication, or a 3D-printed object associated with the printed publication that is positioned in proximity to the printed publication, and/or the like. According to some embodiments, the user device 105 might further include, but is not limited to, a first camera 135 (as shown in the side view of user device 105 as shown along the direction of arrows A-A of the front view of the user device 105), a second camera 140, and a display device or display screen 145, and/or the like.

In operation, the first camera 135 of user device 105 might capture one or more images of at least a portion of the printed publication 125 (e.g., a front cover, the entire publication, a back cover, a page of the printed publication, a binding of the printed publication, a portion of any of these, and/or the like). The user device 105 and/or the computing system 110 might analyze the captured one or more images of the at least a portion of the printed publication to determine whether the captured one or more images contain one or more triggers 130 (as described above). According to some embodiments, the user device 105 or the computing system 110 might map points on the one or more captured images of the at least a portion of the printed publication 125 as part of the analysis to determine whether the captured one or more images contain one or more triggers 130.

Based on a determination that the captured one or more images contain at least one trigger of the one or more triggers, the user device 105 and/or the computing system 110 might identify one or more media content 160 of a plurality of media content that are associated with the at least one trigger. The user device 105 and/or the computing system 110 might subsequently determine a field of view of a user (e.g., by capturing an image of an eye(s) of the user using second camera 140), the field of view including at least a portion of the printed publication, and might modify an orientation of the one or more media content to align with the field of view of the user, if necessary (i.e., based on a determination that the orientation of the one or more media content is not already aligned with the field of view of the user, or the like). The user device 105 and/or the computing system 110 might then display, on display device 145 of user device 105 the one or more media content (whose orientation may have been modified to align with the field of view of the user), such that the one or more media content is presented as a virtual overlay in relation to the at least a portion of the printed publication. In the non-limiting embodiment of FIG. 1, the one or more media content 160 comprises a character in the act of throwing an object (e.g., a snowball or the like), and the character is presented as a virtual overlay on top of an image of the cover of the printed publication 125. Although the one or more media content 160 is depicted as being displayed on the display device of the tablet computer 105 in FIG. 1, the various embodiments are not so limited, and the one or more media content 160 may be displayed on the display device of any of the user devices 105 (e.g., a VR headset, an AR headset, a set of AR glasses, a set of bionic contact lenses, a smart phone adapted as part of a VR headset, or a smart phone adapted as part of an AR system, and/or the like) as described above.

In some cases, system 100 might further comprise one or more databases 120 that store at least one of information regarding the one or more triggers 130 associated with each printed publication 125 (among a plurality of printed publications), information regarding the one or more media content 160 that are associated with each printed publication 125 (among the plurality of printed publications), the one or more media content 160 themselves, formatting information for each of the visual output devices or display devices of user devices 105, and/or the like.

According to some embodiments, the functionalities of the one or more user devices 105 as described above might be provided by a software application ("app") that are downloaded and installed on the one or more user devices 105, and the software app provides the functionalities for capturing images of the at least a portion of the printed publication, analyzing the images for triggers, identifying media content associated with the triggers, determining the field of view of the user, modifying (if necessary) the orientation of the media content to align with the field of view of the user, and presenting the media content to the user as a virtual overlay in relation to (in some cases, an image of) the at least a portion of the printed publication.

In some embodiments, the trigger might include a particular arrangement of two or more printed publications. For example, placing two books in a particular series of books next to each other might serve as a trigger for generating media content comprising characters from the two books that are presented as virtual overlays in relation to the two books, where the characters are presented as interacting with each other (e.g., a first character initiates a snowball fight with a second character, where each character might be presented as overlays on top of one of the two books, or the like). In another example, placing three or more books in a series of books in a first sequence or order relative to each other might serve as a trigger for one set of media content (which might include a first set of interactions amongst characters in the series of books), while placing the three or more books in a second sequence or order relative to each other might serve as a trigger for another set of media content (which might include a second set of interactions amongst characters in the series of books). In some cases, rather than characters, the arrangement of the printed publications in a particular order might result in triggering presentation of a map, clues, or other content that might lead users to actual or virtual prizes or the like (e.g., as part of a marketing campaign for the series of books, for a movie, for a TV series, for a game, for toys, and/or the like). In some cases, placing all of the books in a series together in a particular configuration and/or order might serve as a trigger for generating a virtual location or venue (e.g., presenting a virtual representation of a town, a town center, a city, a city center, a building, a room, etc., that is associated with the book series or the like). These virtual projections described above (also referred to herein as "combined effects") might be 3D virtual projections, or 2D slices that might change when the user device moves around or relative to the printed publications (e.g., looking from one angle might allow the user to see one side of the virtual projection, while looking from another angle might allow the user to see another side of the same virtual projection, or the like).

Alternatively, or additionally, geolocation functionalities of user devices 105 might be used as an additional trigger for each of the presentation of media content. For example, if the user is located in a location that is associated with one of the settings of the story of the printed publication and implements the app as described above, the resultant media content might be specially tailored for that location compared with media content that would otherwise be triggered.

Alternatively, or additionally, weather tracking functionalities of user devices 105 might be used as an additional trigger (which may also be coupled with geolocation functionalities) for triggering presentation of particular media content. For example, if the user device (through its weather tracking apps or the Internet and/or with information about the geolocation of the user device) determines that it is snowing at the location of the user device as the user is using the app as described above, the resultant media content being presented to the user in response to the trigger associated with the printed publication might include characters associated the printed publication engaging in a snowball fight or other snow sports, consistent with the story. If the user device otherwise determines that it is sunny at the location of the user device as the user is using the app as described above, the resultant media content being presented to the user in response to the trigger associated with the printed publication might include characters associated the printed publication engaging in a water balloon fight or other summer activities, consistent with the story. And so on.

According to some embodiments, the media content being presented as a virtual overlay might include characters that interact with the user, as in a conversation or a game, and/or the like. For example, such virtual conversations between the projected virtual character and the user might be consistent with conversations or topics associated with the story of the printed publication. In the case of interactive games, the virtual character might engage in a snowball fight or water balloon fight with the user and the user tapping or otherwise entering inputs on the user device (e.g., touching particular buttons or portions of the screen) might cause virtual snowballs or water balloons to fly toward the virtual character, and so on.

Although the above embodiments are described with respect to printed publications, in some cases, e-books or books read from a computing device might be used instead of the printed publications. In such cases, a separate user device as described above might capture images of the e-book cover or page to determine if the images contain triggers, and the other processes would otherwise be the same or similar. Rather than putting two or more printed publications together to trigger combined effects as described above, the e-book reader or computing device might display the covers of the two or more printed publications on the same screen. In some cases, the app might also serve as an e-book reader, and might allow for arrangement of multiple publications on the display screen to trigger the combined effects. In alternative cases, rather than using a separate user device to capture images of the e-books, the app might allow for reading the e-books while providing options for triggering the processes described above without using a camera (perhaps instead using screen capture technology to capture images of the screen showing the e-publications or the like, or simply recognizing triggers that are being displayed on the screen). In some cases, triggers might be flagged for the user to actuate by clicking on the triggers, resulting in presentation of the triggered media content. According to some embodiments, a 3D projection or holographic device or the like might be used in conjunction with the e-book reader/user device to present a 3D projection above the screen of the device (which might allow a user wearing corresponding 3D/holographic glasses to view the projections or which might allow glass-less 3D holographic projection of the media content).

In some embodiments, a graphic in the printed publication might serve as a trigger. For example, a map illustration might trigger a 3D projection of the location (or one of the locations) shown by the map. In some cases, a map of a valley might trigger a 3D animation of a bird swooping down into the valley, or the like. A 2D map of a region of space might trigger a 3D pan of the same region of space. And so on. A 2D illustration of a scene in the book might trigger a 3D animation of the same scene. In these 3D projections, the user can change the point of view by moving the display device to view a different angle of the 3D projections.

These interactions and media content as described are merely non-limiting examples consistent with the embodiments of the invention, and other interactions and media content may be implemented (so long as consistent with the embodiments described or implied herein).

Figure 2:
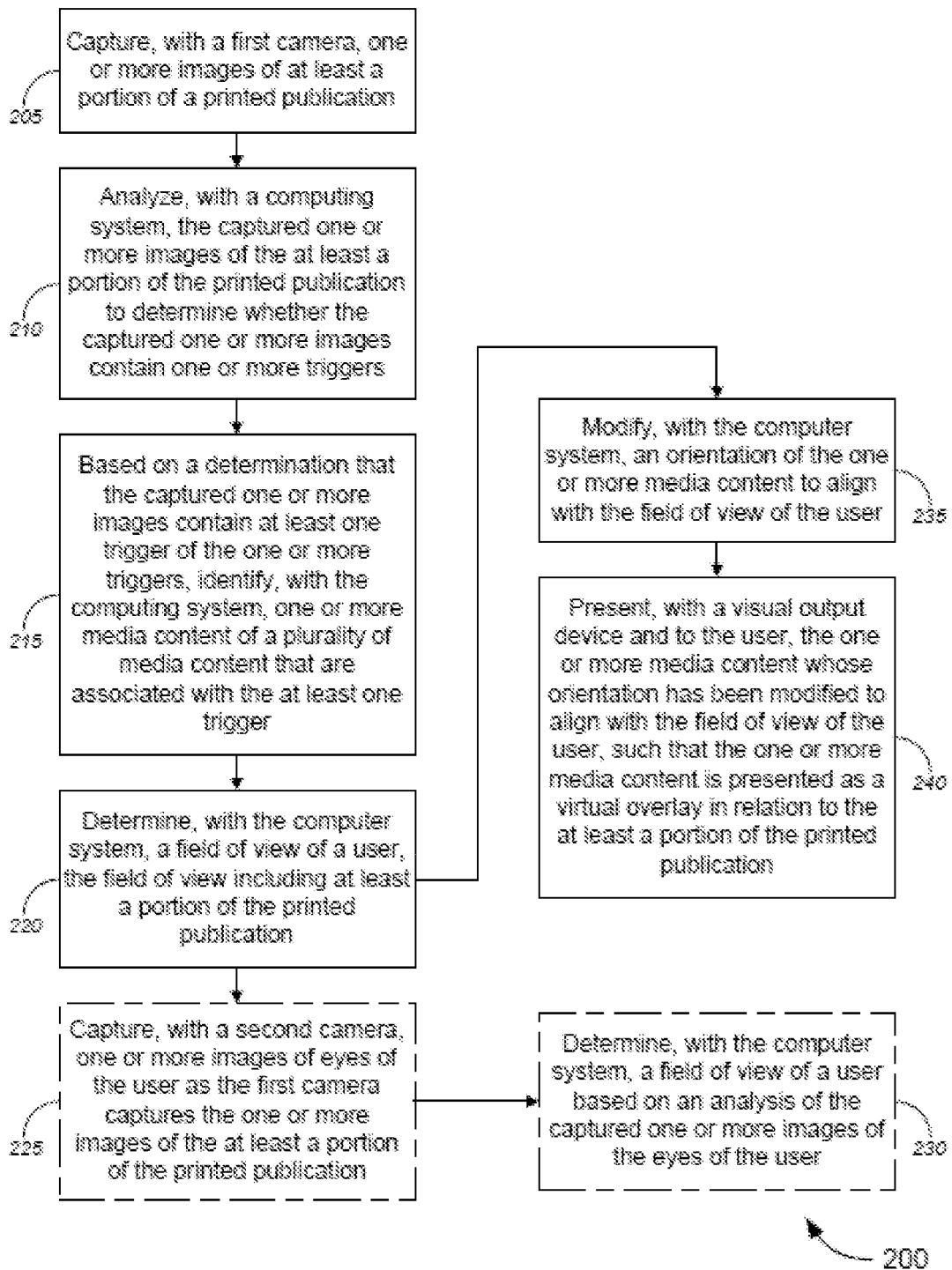
FIG. 2 is a flow diagram illustrating a method for implementing computer-simulated reality interactions between users and physical publications, in accordance with various embodiments.

FIG. 2 is a flow diagram illustrating a method 200 for implementing computer-simulated reality interactions between users and physical publications, in accordance with various embodiments.

While the techniques and procedures are depicted and/or described in a certain order for purposes of illustration, it should be appreciated that certain procedures may be reordered and/or omitted within the scope of various embodiments. Moreover, while the method illustrated by FIG. 2 can be implemented by or with (and, in some cases, are described below with respect to) the system 100 of FIG. 1 (or components thereof), such method may also be implemented using any suitable hardware (or software) implementation. Similarly, while the system 100 of FIG. 1 (or components thereof), can operate according to the method illustrated by FIG. 2 (e.g., by executing instructions embodied on a computer readable medium), the system 100 of FIG. 1 can also operate according to other modes of operation and/or perform other suitable procedures.

With reference to FIG. 2, method 200, according to some embodiments, might comprise, at block 205, capturing, with a first camera, one or more images of at least a portion of a printed publication (e.g., printed publication 125 of FIG. 1 or the like). At block 210, method 200 might comprise analyzing, with a computing system (which might correspond to either user device 105 or computing system 110 of FIG. 1, or the like), the captured one or more images of the at least a portion of the printed publication to determine whether the captured one or more images contain one or more triggers (e.g., one or more triggers 130 of FIG. 1, or the like). In some embodiments, the printed publication might include, without limitation, one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster, and/or the like. The at least one trigger, in some cases, might each include, but is not limited to, one of a QR code provided on the at least a portion of the publication, a barcode provided on the at least a portion of the publication, a graphical code provided on a sticker affixed to the at least a portion of the publication, a graphic printed on the at least a portion of the publication, a keyword or key code printed on the at least a portion of the publication, a cover image of the printed publication, a title printed on a cover of the printed publication, author name printed on the cover of the printed publication, a stuffed character associated with the printed publication that is positioned in proximity to the printed publication, a 3D-printed character associated with the printed publication that is positioned in proximity to the printed publication, or a 3D-printed object associated with the printed publication that is positioned in proximity to the printed publication, and/or the like. In some cases, the first camera might be part of or might be embodied in the user device. Alternatively, the first camera might be external to the user device, while being communicatively coupled to the user device.

Method 200 might further comprise, based on a determination that the captured one or more images contain at least one trigger of the one or more triggers, identifying, with the computing system, one or more media content of a plurality of media content that are associated with the at least one trigger (block 215). In some instances, the one or more media content comprises at least one of a 3D still graphic, a 3D animated graphic, or a 3D interactive animated graphic, and/or the like, each of which might include, without limitation, one of a graphic representation of one or more characters associated with the printed publication, a non-fictional geographical location associated with the printed publication, a fictional geographical location associated with the printed publication, a room associated with the printed publication, a building associated with the printed publication, a scene described in the printed publication, a scene inspired by the scene described in the printed publication, one or more items described in the printed publication, or one or more items inspired by the one or more items described in the printed publication, and/or the like.

At block 220, method 200 might comprise determining, with the computer system, a field of view of a user, the field of view including at least a portion of the printed publication. In some embodiments, determining a field of view of the user might comprise capturing, with a second camera (which might correspond to second camera 140 of user device 105 of FIG. 1, or the like), one or more images of eyes of the user as the first camera captures the one or more images of the at least a portion of the printed publication (optional block 225) and determining, with the computer system, a field of view of a user based on an analysis of the captured one or more images of the eyes of the user (e.g., relative to the captured one or more images of the at least a portion of the printed publication by the first camera, or the like) (optional block 230).

Method 200 might further comprise, at block 235, modifying, with the computer system, an orientation of the one or more media content to align with the field of view of the user, if necessary (i.e., if it is determined that the orientation of one or more media content does not already align with the field of view of the user). At block 240, method 200 might comprise presenting, with a visual output device and to the user, the one or more media content whose orientation has been modified to align with the field of view of the user, such that the one or more media content is presented as a virtual overlay in relation to the at least a portion of the printed publication. Here, the visual output device might correspond to the user device as described above, and might include, without limitation, one of a VR headset, an AR headset, a set of AR glasses, a tablet computer, a set of bionic contact lenses, a smart phone adapted as part of a VR headset, or a smart phone adapted as part of an AR system, and/or the like. According to some embodiments, presenting the one or more media content might comprise presenting, with the visual output device and to the user, the one or more media content whose orientation has been modified to align with the field of view of the user, such that the one or more media content is at least one of presented as a virtual overlay above a cover of the printed publication, presented as a virtual overlay on a cover of the printed publication, presented as a virtual overlay beside the printed publication, presented as a virtual overlay above a page of the printed publication, presented as a virtual overlay on a page of the printed publication, presented as a virtual overlay in front of a surface of the printed publication, presented as a virtual overlay in front of a binding of the printed publication, presented as a virtual overlay above a 2D graphic printed on a portion of the printed publication, or presented as a virtual overlay on a 2D graphic printed on a portion of the printed publication, and/or the like.

Figure 3:
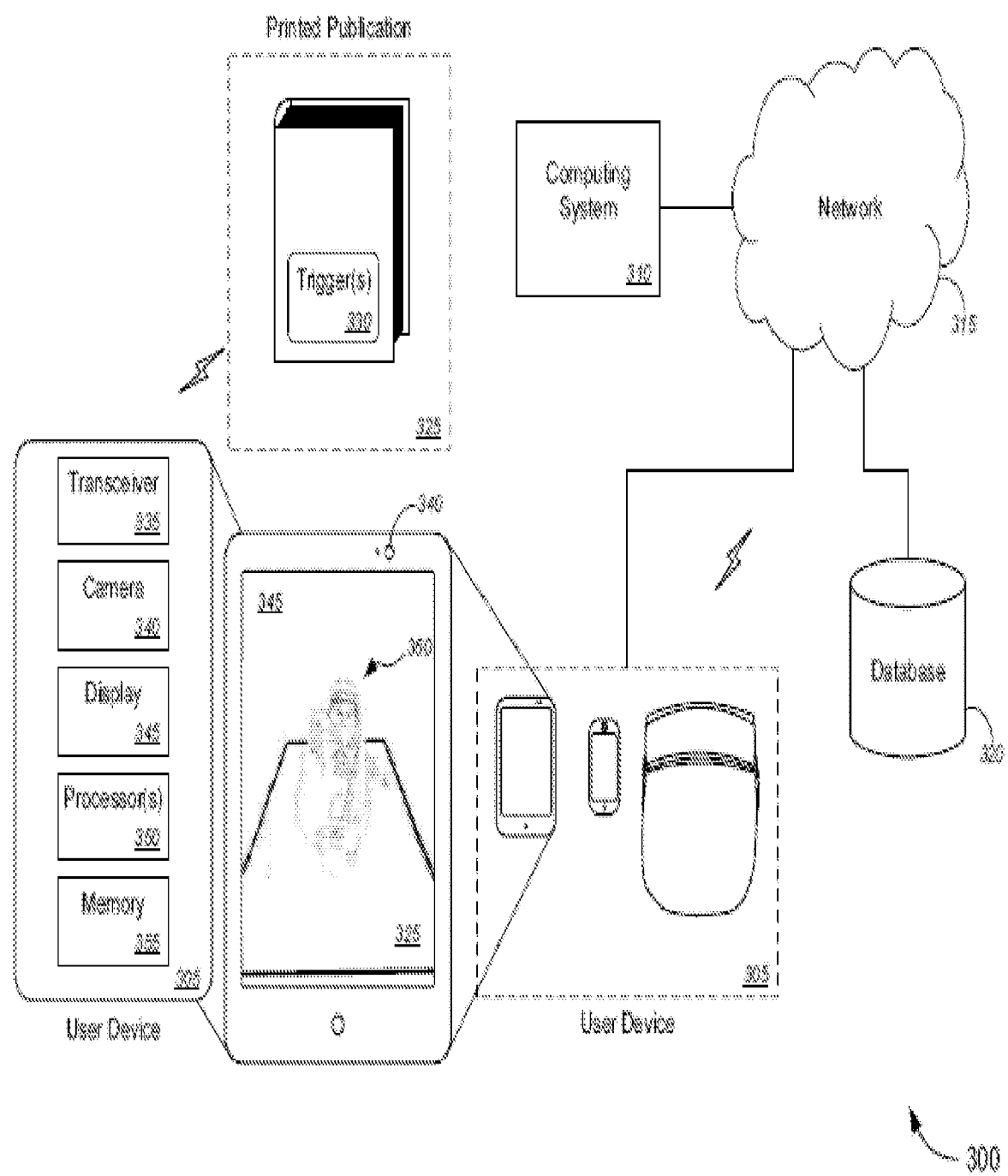
FIG. 3 is a schematic diagram illustrating another system for implementing computer-simulated reality interactions between users and physical publications, in accordance with various embodiments.

FIG. 3 is a schematic diagram illustrating another system 300 for implementing computer-simulated reality interactions between users and physical publications, in accordance with various embodiments.

In the non-limiting embodiment of FIG. 3, system 300 might comprise one or more user devices 305 (also referred to herein as "visual output devices" or the like). Although specific embodiments of user devices 305 are shown in FIG. 3 (e.g., a tablet computer, a smart phone, and a virtual reality or augmented reality headset), the various embodiments are not so limited, and each user device 305 might include, without limitation, one of a VR headset, an AR headset, a set of AR glasses, a tablet computer, a set of bionic contact lenses, a smart phone adapted as part of a VR headset, or a smart phone adapted as part of an AR system, and/or the like. In some embodiments, system 300 might further comprise a computing system 310 (including, without limitation, a server computer, a cloud computing system, and/or the like) that is separate from, or remote from, the one or more user devices 305, and that is accessible via network 315 over a wired connection (e.g., as shown in FIG. 3 by the solid line between the one or more user devices 305 and the network 315) or over a wireless connection (e.g., as shown in FIG. 3 by the lightning bolt symbol between the one or more user devices 305 and the network 315). In some cases, the network 315 might include, but is not limited to, a LAN, including, without limitation, a fiber network, an Ethernet network, a Token-Ring"" network, and/or the like; a WAN; a WWAN; a virtual network, such as a VPN; the Internet; an intranet; an extranet; a PSTN; an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an ISP). In another embodiment, the network might include a core network of the service provider, and/or the Internet.

According to some embodiments, system 300 might further comprise a printed publication 325. Although a specific embodiment of the printed publication 325 is shown in FIG. 3 (e.g., a book), the various embodiments are not so limited and the printed publication 325 can include, without limitation, one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster, and/or the like. In some embodiments, one or more triggers 330 might be provided on at least a portion of the printed publication, and might each comprise a non-visual trigger, including, but is not limited to, one of a RF1D tag, a BLE tag, a NFC tag, or a RTLS tag, and/or the like. According to some embodiments, the user device 305 might further include, but is not limited to, a transceiver 335 that wirelessly communicates with the one or more triggers 330 (e.g., as shown in FIG. 3 by the lightning bolt symbol between the transceiver 335 and the one or more triggers 330), a camera 340, a display device or display screen 345, one or more processors 350, memory 355, and/or the like.

In operation, the user device 305 (or perhaps the transceiver 335) might determine whether the user device 305 is within communications range of at least one non-visual trigger 330 associated with the printed publication. Based on a determination that the user device 330 is within communications range of at least one non-visual trigger 330, wireless communications may be established between the transceiver 335 and the at least one non-visual trigger 330 associated with the printed publication.

In response to establishing communications between the user device 305 and the at least one non-visual trigger 330, the user device 305 and/or the computing system 310 might identify one or more media content 360 of a plurality of media content that are associated with the at least one trigger. The (processor 350 of the) user device 305 and/or the computing system 310 might subsequently determine a field of view of a user (e.g., by capturing an image of an eye(s) of the user using camera 340), the field of view including at least a portion of the printed publication, and might modify an orientation of the one or more media content to align with the field of view of the user, if necessary (i.e., based on a determination that the orientation of the one or more media content is not already aligned with the field of view of the user, or the like). The user device 305 and/or the computing system 310 might then display, on display device 345 of user device 305 the one or more media content (whose orientation may have been modified to align with the field of view of the user), such that the one or more media content is presented as a virtual overlay in relation to the at least a portion of the printed publication. In the non-limiting embodiment of FIG. 3, the one or more media content 360 comprises a character in the act of throwing an object (e.g., a snowball or the like), and the character is presented as a virtual overlay on top of an image of the cover of the printed publication 325. Although the one or more media content 360 is depicted as being displayed on the display device of the tablet computer 305 in FIG. 3, the various embodiments are not so limited, and the one or more media content 360 may be displayed on the display device of any of the user devices 305 (e.g., a VR headset, an AR headset, a set of AR glasses, a set of bionic contact lenses, a smart phone adapted as part of a VR headset, or a smart phone adapted as part of an AR system, and/or the like) as described above.

In some cases, system 300 might further comprise one or more databases 320 that store at least one of information regarding the one or more triggers 330 associated with each printed publication 325 (among a plurality of printed publications), information regarding the one or more media content 360 that are associated with each printed publication 325 (among the plurality of printed publications), the one or more media content 360 themselves, formatting information for each of the visual output devices or display devices of user devices 305, and/or the like.

According to some embodiments, the functionalities of the one or more user devices 305 as described above might be provided by an app that are downloaded and installed on the one or more user devices 305, and the software app provides the functionalities for establishing communications between (the transceiver 335 of) the user device and the non-visual triggers, identifying media content associated with the non-visual triggers, determining the field of view of the user, modifying (if necessary) the orientation of the media content to align with the field of view of the user, and presenting the media content to the user as a virtual overlay in relation to (in some cases, an image of) the at least a portion of the printed publication.

In some embodiments, the trigger might include a particular arrangement of two or more printed publications. For example, placing two books in a particular series of books next to each other, where establishing wireless communications between the transceiver and each trigger associated with each book in turn, might serve as a trigger for generating media content comprising characters from the two books that are presented as virtual overlays in relation to the two books, where the characters are presented as interacting with each other (e.g., a first character initiates a snowball fight with a second character, where each character might be presented as overlays on top of one of the two books, or the like). In another example, placing three or more books in a series of books in a first sequence or order relative to each other, where establishing wireless communications between the transceiver and each trigger associated with each book in turn, might serve as a trigger for one set of media content (which might include a first set of interactions amongst characters in the series of books), while placing the three or more books in a second sequence or order relative to each other, where establishing wireless communications between the transceiver and each trigger associated with each book in turn, might serve as a trigger for another set of media content (which might include a second set of interactions amongst characters in the series of books). In some cases, rather than characters, the arrangement of the printed publications in a particular order might result in triggering presentation of a map, clues, or other content that might lead users to actual or virtual prizes or the like (e.g., as part of a marketing campaign for the series of books, for a movie, for a TV series, for a game, for toys, and/or the like). In some cases, placing all of the books in a series together in a particular configuration and/or order, where establishing wireless communications between the transceiver and each trigger associated with each book either in turn or concurrently, might serve as a trigger for generating a virtual location or venue (e.g., presenting a virtual representation of a town, a town center, a city, a city center, a building, a room, etc., that is associated with the book series or the like). These virtual projections described above (also referred to herein as "combined effects") might be 3D virtual projections, or 2D slices that might change when the user device moves around or relative to the printed publications (e.g., looking from one angle might allow the user to see one side of the virtual projection, while looking from another angle might allow the user to see another side of the same virtual projection, or the like).

Alternatively, or additionally, geolocation functionalities of user devices 305 might be used as an additional trigger for each of the presentation of media content. For example, if the user is located in a location that is associated with one of the settings of the story of the printed publication and implements the app as described above, the resultant media content might be specially tailored for that location compared with media content that would otherwise be triggered.

Alternatively, or additionally, weather tracking functionalities of user devices 305 might be used as an additional trigger (which may also be coupled with geolocation functionalities) for triggering presentation of particular media content. For example, if the user device (through its weather tracking apps or the Internet and/or with information about the geolocation of the user device) determines that it is snowing at the location of the user device as the user is using the app as described above, the resultant media content being presented to the user in response to the trigger associated with the printed publication might include characters associated the printed publication engaging in a snowball fight or other snow sports, consistent with the story. If the user device otherwise determines that it is sunny at the location of the user device as the user is using the app as described above, the resultant media content being presented to the user in response to the trigger associated with the printed publication might include characters associated the printed publication engaging in a water balloon fight or other summer activities, consistent with the story. And so on.

According to some embodiments, the media content being presented as a virtual overlay might include characters that interact with the user, as in a conversation or a game, and/or the like. For example, such virtual conversations between the projected virtual character and the user might be consistent with conversations or topics associated with the story of the printed publication. In the case of interactive games, the virtual character might engage in a snowball fight or water balloon fight with the user and the user tapping or otherwise entering inputs on the user device (e.g., touching particular buttons or portions of the screen) might cause virtual snowballs or water balloons to fly toward the virtual character, and so on.

Although the above embodiments are described with respect to printed publications, in some cases, e-books or books read from a computing device might be used instead of the printed publications. In such cases, a separate user device as described above might establish wireless communications with the e-book reader or computing device, and the other processes would otherwise be the same or similar. In other words, rather than putting two or more printed publications together to trigger combined effects as described above, the e-book reader or computing device might display the covers of the two or more printed publications on the same screen, and the e-book reader or computing device might have a transceiver that might simulate or serve as the non-visual trigger. In some cases, the app might also serve as an e-book reader, and might allow for arrangement of multiple publications on the display screen, while causing the e-book reader or computing device to use its transceiver as a non-visual trigger associated with the publication to trigger the combined effects. In alternative cases, rather than using a separate user device to capture images of the e-books, the app might allow for reading the e-books while providing options for triggering the processes described above without using external transceivers or the like (but rather causing a simulated or virtual trigger event to occur in lieu of the non-visual triggers described above). In some cases, virtual triggers might be flagged for the user to actuate by clicking on the triggers, resulting in presentation of the triggered media content. According to some embodiments, a 3D projection or holographic device or the like might be used in conjunction with the e-book reader/user device to present a 3D projection above the screen of the device (which might allow a user wearing corresponding 3D/holographic glasses to view the projections or which might allow glass-less 3D holographic projection of the media content).

In some embodiments, with e-book readers, accompanying audio readings may be utilized in conjunction with the user reading the e-book readers, and some triggers might comprise audio triggers, including, but not limited to, audio key words associated with the text, sub-vocal keywords as a hidden track underneath the audio track, audible tones, audible tunes, sub-audible tones, sub-audible tunes, etc. For example, after the audio track has described a particular scene in the publication, the audio track might pause as a 3D animation of the scene is projected and played out, and so on.

These interactions and media content as described are merely non-limiting examples consistent with the embodiments of the invention, and other interactions and media content may be implemented (so long as consistent with the embodiments described or implied herein).

System 300 of FIG. 3 might otherwise be similar, if not identical, to system 100 of FIG. 1, and the description of the components of system 100 might similarly apply to corresponding components of system 300.

Figure 4:
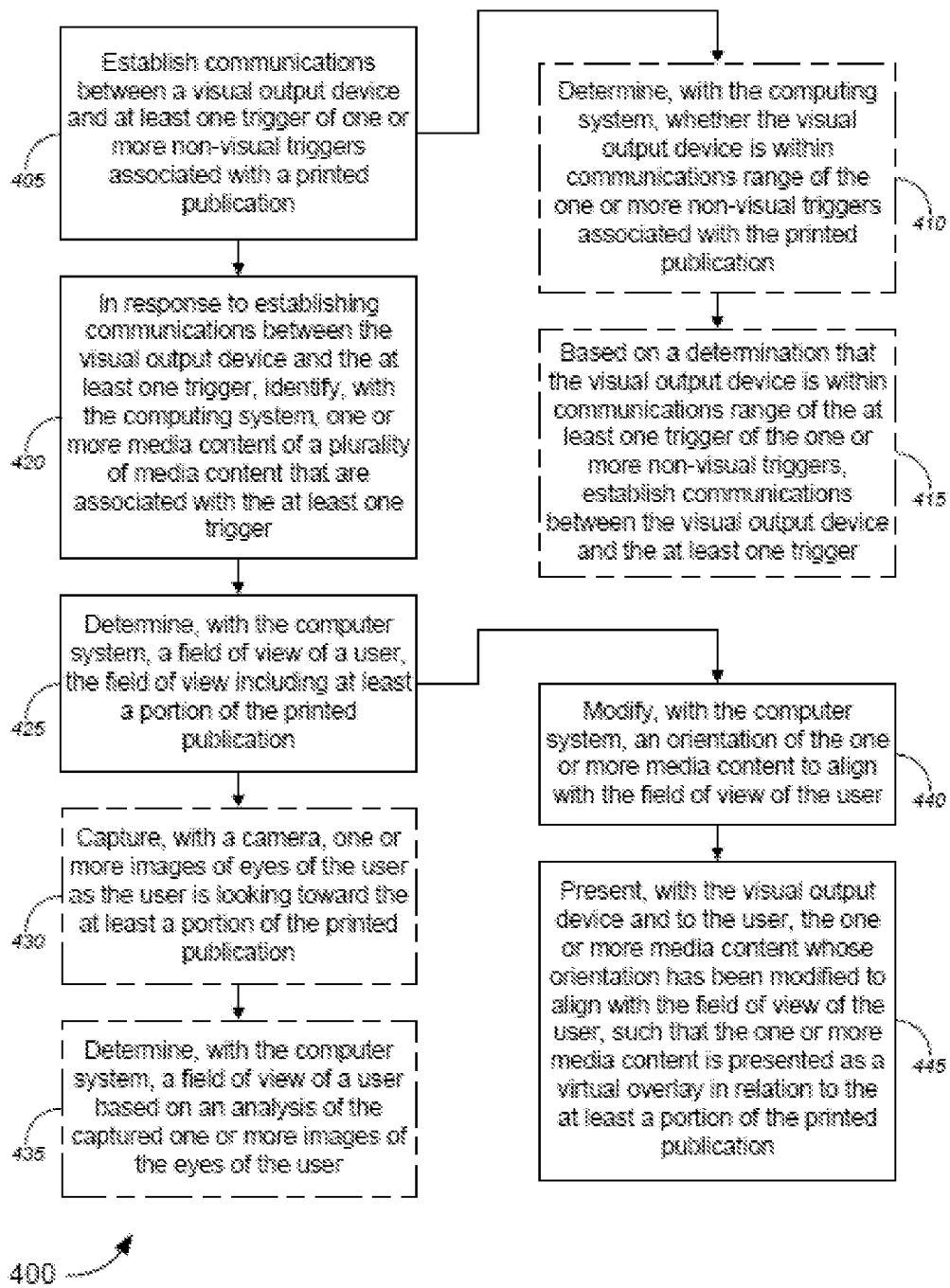
FIG. 4 is a flow diagram illustrating another method for implementing computer-simulated reality interactions between users and physical publications, in accordance with various embodiments.

FIG. 4 is a flow diagram illustrating another method 400 for implementing computer-simulated reality interactions between users and physical publications, in accordance with various embodiments.

While the techniques and procedures are depicted and/or described in a certain order for purposes of illustration, it should be appreciated that certain procedures may be reordered and/or omitted within the scope of various embodiments. Moreover, while the method illustrated by FIG. 4 can be implemented by or with (and, in some cases, are described below with respect to) the system 300 of FIG. 3 (or components thereof), such method may also be implemented using any suitable hardware (or software) implementation. Similarly, while the system 300 of FIG. 3 (or components thereof), can operate according to the method illustrated by FIG. 4 (e.g., by executing instructions embodied on a computer readable medium), the system 300 of FIG. 3 can also operate according to other modes of operation and/or perform other suitable procedures.

With reference to FIG. 4, method 400, according to some embodiments, might comprise, at block 405, establishing communications between a visual output device (which might correspond to user device 305 of FIG. 3, or the like) and at least one trigger of one or more non-visual triggers (which might correspond to the one or more triggers 330 of FIG. 3, or the like) that are associated with a printed publication (e.g., printed publication 325 of FIG. 3 or the like). In some embodiments, establishing communications between the visual output device and the at least one trigger might comprise determining, with the computing system, whether the visual output device is within communications range of the one or more non-visual triggers associated with the printed publication (optional block 410) and, based on a determination that the visual output device is within communications range of the at least one trigger of the one or more non-visual triggers, establishing communications between the visual output device and the at least one trigger (optional block 415). In some embodiments, the printed publication might include, without limitation, one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster, and/or the like. The at least one trigger, in some cases, might each include, but is not limited to, one of a RFID tag, a BLE tag, a NFC tag, or a RTLS tag, and/or the like.

Method 400 might further comprise, in response to establishing communications between the visual output device and the at least one trigger, identifying, with the computing system, one or more media content of a plurality of media content that are associated with the at least one trigger (block 420). In some instances, the one or more media content might comprise at least one of a 3D still graphic, a 3D animated graphic, or a 3D interactive animated graphic, and/or the like, each of which might include, without limitation, one of a graphic representation of one or more characters associated with the printed publication, a non-fictional geographical location associated with the printed publication, a fictional geographical location associated with the printed publication, a room associated with the printed publication, a building associated with the printed publication, a scene described in the printed publication, a scene inspired by the scene described in the printed publication, one or more items described in the printed publication, or one or more items inspired by the one or more items described in the printed publication, and/or the like.

At block 425, method 400 might comprise determining, with the computer system, a field of view of a user, the field of view including at least a portion of the printed publication. In some embodiments, determining a field of view of the user might comprise capturing, with a camera (which might correspond to camera 340 of user device 305 of FIG. 3, or the like), one or more images of eyes of the user as the user is looking toward the at least a portion of the printed publication (optional block 430) and determining, with the computer system, a field of view of a user based on an analysis of the captured one or more images of the eyes of the user (e.g., relative to the direction that the user is looking toward the at least a portion of the printed publication, or the like) (optional block 435).

Method 400 might further comprise, at block 440, modifying, with the computer system, an orientation of the one or more media content to align with the field of view of the user, if necessary (i.e., if it is determined that the orientation of one or more media content does not already align with the field of view of the user). At block 445, method 400 might comprise presenting, with the visual output device and to the user, the one or more media content whose orientation has been modified to align with the field of view of the user, such that the one or more media content is presented as a virtual overlay in relation to the at least a portion of the printed publication. Here, the visual output device might correspond to the user device as described above, and might include, without limitation, one of a VR headset, an AR headset, a set of AR glasses, a tablet computer, a set of bionic contact lenses, a smart phone adapted as part of a VR headset, or a smart phone adapted as part of an AR system, and/or the like. According to some embodiments, presenting the one or more media content might comprise presenting, with the visual output device and to the user, the one or more media content whose orientation has been modified to align with the field of view of the user, such that the one or more media content is at least one of presented as a virtual overlay above a cover of the printed publication, presented as a virtual overlay on a cover of the printed publication, presented as a virtual overlay beside the printed publication, presented as a virtual overlay above a page of the printed publication, presented as a virtual overlay on a page of the printed publication, presented as a virtual overlay in front of a surface of the printed publication, presented as a virtual overlay in front of a binding of the printed publication, presented as a virtual overlay above a 2D graphic printed on a portion of the printed publication, or presented as a virtual overlay on a 2D graphic printed on a portion of the printed publication, and/or the like.

Method 400 of FIG. 4 might otherwise be similar, if not identical, to method 200 of FIG. 2, and the description of the processes of method 200 might similarly apply to corresponding processes of method 400.

FIGS. 5A-5D (collectively, "FIG. 5") are flow diagrams illustrating a method 500 for implementing computer-simulated reality interactions between users and physical objects, in accordance with various embodiments. In FIG. 5, the process in method 500 continues from FIG. 5A to FIG. 5B following the circular marker, denoted "A," continues from FIG. 5A to FIG. 5C following the circular marker, denoted "B," continues from FIG. 5A to FIG. 5D following the circular marker, denoted "C," and returns from each of FIGS. 5B-5D to FIG. 5A following the circular marker, denoted, "D."

While the techniques and procedures are depicted and/or described in a certain order for purposes of illustration, it should be appreciated that certain procedures may be reordered and/or omitted within the scope of various embodiments. Moreover, while the method illustrated by FIG. 5 can be implemented by or with (and, in some cases, are described below with respect to) the system 100 of FIG. 1 (or components thereof) or the system 300 of FIG. 3 (or components thereof), such method may also be implemented using any suitable hardware (or software) implementation. Similarly, while the system 100 of FIG. 1 (or components thereof) or the system 300 of FIG. 3 (or components thereof), can operate according to the method illustrated by FIG. 3 (e.g., by executing instructions embodied on a computer readable medium), the system 100 of FIG. 1 or the system 300 of FIG. 3 can also operate according to other modes of operation and/or perform other suitable procedures.

With reference to FIG. 5A, method 500 might comprise, at block 505, presenting, with a visual output device and to a user, one or more media content, such that the one or more media content is presented as a virtual overlay in relation to at least a portion of a physical object. In some embodiments, the physical object might comprise a printed publication, and the process at block 505 might correspond to the process at block 240 of method 200 of FIG. 2 (and might follow the processes at blocks 205-235 of method 200), or might correspond to the process at block 445 of method 400 of FIG. 4 (and might follow the processes at blocks 405-440 of method 400). In general, the physical object need not be a printed publication, and can include, without limitation, one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, a poster, a Christmas tree bulb, a Christmas tree ornament, a Hanukkah menorah, a gravestone, a sentimental artifact or ornament associated with the user, or a sentimental artifact or ornament associated with another individual who is associated with the user, and/or the like. The visual output device can include, but is not limited to, one of a VR headset, an AR headset, a set of AR glasses, a tablet computer, a set of bionic contact lenses, a smart phone adapted as part of a VR headset, or a smart phone adapted as part of an AR system, and/or the like. The one or more media content can include, without limitation, at least one of a 3D still graphic, a 3D animated graphic, or a 3D interactive animated graphic, and/or the like.

At optional block 510, method 500 might comprise detecting, with one or more sensors, one or more physical characteristics of the user in response to stimuli from presentation of media content. In some instances, the one or more sensors might include, without limitation, at least one of one or more cameras, one or more heartrate monitors, one or more fitness trackers, one or more microphones, and/or the like. The one or more physical characteristics might include, but are not limited to, at least one of smiling, laughing, exclaiming, shouting, moving toward virtual objects in the media content, moving away from virtual objects in the media content, attempting to interact with virtual objects in the media content, and/or the like. Alternatively or additionally, method 500, at optional block 515, might comprise receiving, with the computing system, a user input indicating selection of how the media content should be presented. The user input, for example, might include, without limitation, at least one of voice input, tactile input, attempted tactile input, gesturing, eye movement selection of options, blinking, and/or the like.

Method 500 might further comprise, at block 520, determining, with a computing system, how the one or more media content should be presented to the user, which in some cases might be based on at least one of analysis of the detected one or more physical characteristics of the user or the received user input. The process might continue to one of the process at block 525 in FIG. 5B following marker "A" (for virtual reality presentation), the process at block 535 in FIG. 5C following marker "B" (for mixed reality presentation), or the process at block 545 in FIG. 5D following marker "C" (for augmented reality presentation).

With reference to FIG. 5B, method 500 might comprise, based on a determination to present the one or more media content as a virtual reality presentation, and based on a determination that the one or more media content is not already being presented as a virtual reality presentation, shifting, with the computing system, the presentation of the one or more media content to a virtual reality presentation (block 525), and presenting, with the visual output device and to the user, one or more second media content, the one or more second media content comprising virtual reality content (block 530). The process might return to the process at optional block 510 in FIG. 5A.

Figures 5C, 5D:
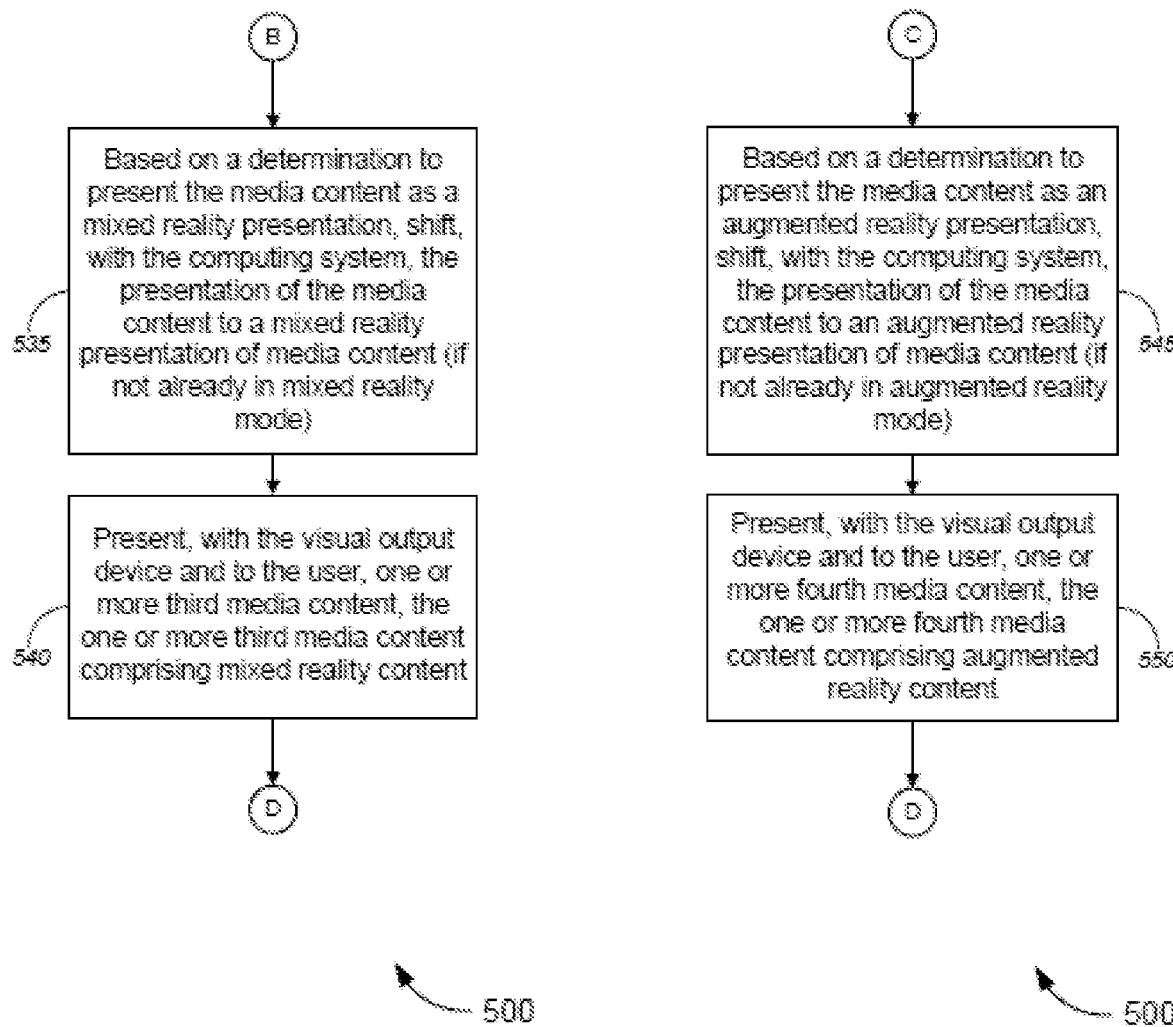
Figure 6:
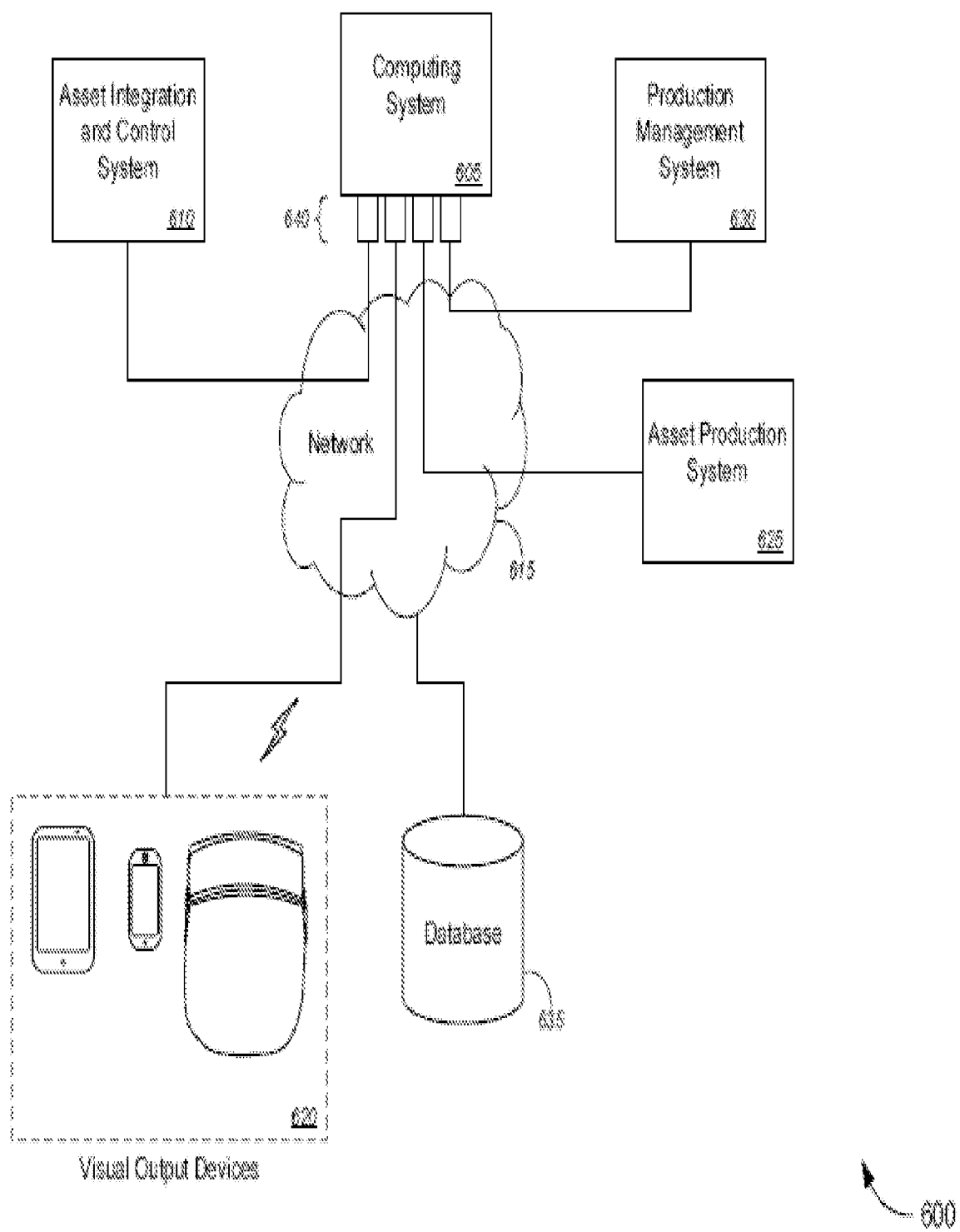
FIG. 6 is a schematic diagram illustrating a system for implementing a computer-simulated reality platform that enables shifting from one of virtual reality, augmented reality, or mixed reality to another of virtual reality, augmented reality, or mixed reality, in accordance with various embodiments.

Turning to FIG. 5C, method 500 might comprise, based on a determination to present the one or more media content as a mixed reality presentation, and based on a determination that the one or more media content is not already being presented as a mixed reality presentation, shifting, with the computing system, the presentation of the one or more media content to a mixed reality presentation (block 535), and presenting, with the visual output device and to the user, one or more third media content, the one or more third media content comprising mixed reality content (block 540). Here, "mixed reality" refers to a combination of augmented reality and virtual reality. For example, a simulated augmented reality presentation might be generated and embedded within a virtual reality presentation. The process might return to the process at optional block 510 in FIG. 5A.

In FIG. 5D, method 500 might comprise, based on a determination to present the one or more media content as an augmented reality presentation, and based on a determination that the one or more media content is not already being presented as an augmented reality presentation, shifting, with the computing system, the presentation of the one or more media content to an augmented reality presentation (block 545), and presenting, with the visual output device and to the user, one or more fourth media content, the one or more fourth media content comprising augmented reality content (block 550). The process might return to the process at optional block 510 in FIG. 5A.

In the embodiment of method 500, augmented reality is initially triggered, and subsequently serves as a bridge to one or mixed reality or virtual reality. The computing system (which in some cases is a computer vision system, as described above) dynamically or selectively shifts between two of augmented reality, mixed reality, or virtual reality, in order to provide the user with an immersive interactive experience.

In some embodiments, the virtual reality presentation might include simulated reality segments embedded within the virtual reality presentation. In such cases, the user would be unable to distinguish between physical reality, augmented reality, and virtual reality. For example, a user might enter his or her physical or actual bedroom, in which a trigger might cause the system to generate an augmented reality presentation of media, which might overlay the images of the bedroom. Further triggers or selections might cause a virtual simulation of the bedroom to be generated which might accurately reproduce an exact (or near exact) replica of the bedroom (with the proper perspectives of the user based on the positions and movements of the user's eyes relative to points in the bedroom). The augmented reality presentation is then shifted to a virtual reality presentation in which the simulated bedroom is seamlessly presented so that the user is unaware that the image of the physical bedroom has shifted to a simulated reproduction of the bedroom. In the virtual space, the simulated bedroom can be morphed or manipulated in any suitable manner consistent with the story of the physical object or printed publication that triggered the augmented reality presentation. For instance, the story might include a scene in which the main character's bedroom morphs into a castle or into a space vessel or into a fantastical landscape, and/or the like. In such a case, the user's simulated bedroom (which is very familiar to the user) would upon appropriate triggers morph into the castle, or space vessel, or fantastical landscape, and/or the like. In this manner, the seamless transition from physical or actual reality, to augmented reality, to virtual reality would immerse the user more fully into the story. Further shifting between two of augmented reality, mixed reality, or virtual reality at a time would facilitate the immersion process, thus likely enhancing the user's cognitive and effective or affected empathy for the story. In a similar manner, images of real people might be morphed into characters in the story (and might either be completely changed or might be partially changed such that some characteristics of the real people might remain after morphing in the virtual realm).

In some embodiments, where mirrors are used in the presentation, the user might see himself or herself as the protagonist or as the antagonist. In such cases, a real mirror might be fully reproduced as a simulated mirror in which a morphed representation of the user might be presented in a simulated reflection of the simulated mirror. Alternatively, the real mirror might be partially reproduced (the rest being image of the actual mirror) such that a portion of the mirror includes a simulated reflection of the morphed representation of the user. In this manner, the seamless transition from physical or actual reality, to augmented reality, to virtual reality would immerse the user more fully into the story and might provide a first person point of view that enhances the user's sense of cognitive and effective or affected empathy for the characters in the story. The presentation might then simulate scenes in the story with the user playing the role of one of the characters in the story.

According to some embodiments, the user might be immersed, transported, or teleported into the story via the seamless transition from physical or actual reality, to augmented reality, to virtual reality (or any combination of such seamless transitions or shifts) to inhabit the role of characters in the story. For example, in the story of Little Red Riding Hood, the user might find herself being transported or teleported in this manner to inhabit the role of little Red Riding Hood as she goes off to visit her grandma and as she encounters the wolf. Alternatively, or additionally, the. user might find herself being transported or teleported in the manner described above to inhabit the role of the grandmother as she encounters the wolf, and what happens to her during the encounter. Alternatively, or additionally, the user might find herself being transported or teleported in the manner described above to inhabit the role of the wolf, as the wolf takes the role of the grandma and as the wolf encounters Little Red Riding Hood. In another set of examples, e.g., in the story of the three little pigs, the user might find himself being transported or teleported in the manner described above to inhabit the role of one of the little pigs (or each in turn) as the little pig builds its house (made of straw, sticks, or bricks), and/or might find himself being transported or teleported in the manner described above to inhabit the role of the wolf as it huffs, puffs, and blows in the straw and stick houses, and attempts to do so with the brick house. In more sophisticated or more involved stories, such as the Harry Potter® series of books or the like, the user might find himself or herself being transported or teleported in the manner described above to inhabit the role of the characters in the books, including, but not limited to, Harry Potter®, Ron Weasley, Hermione Granger, Lord Voldemort, Albus Dumbledore, Severus Snape, and/or the like. Collaborations might be made with author 3. K. Rowling to create expanded storylines or scenes that allow the user to experience backstory or sidestory scenes with some of the secondary characters, to further immerse the user in the Potter universe. Similar user experiences could be created for television-based stories, video-streaming service-based original stories (e.g., Netflix® original series, Amazon® original series, etc.), other movie-based stories (e.g., Inception, the Marvel® Cinematic Universe series, the Star Wars® series, the Star Trek® series, etc.), comic book or manga stories (e.g., the Marvel® comics series, the DC° comics series, the Image comics series, etc.), stories in other novels, video game stories (e.g., the Star Wars® series of games, the Call of Duty® series of games, the Final Fantasy series of games, the Mario Bros®; series of games, the Zelda® series of games, the Madden® series of games, Myst®, and so on) and/or the like. The system might adapt existing stories and scenes from the source stories into 3D immersive virtual/augmented/mixed reality environments and scenes or might (perhaps in collaboration with the original creators or licensed entities) to create new scenes and stories (that are then adapted into 3D immersive virtual/augmented/mixed reality environments and scenes, etc.) based on these original source stories. In these various user experiences, the users can learn what it is like to experience certain trials and tribulations that the characters encounter in the stories, and to learn to perhaps see things from different perspectives. In sum, the transitioning techniques described above enable a user to, in a sense, become particular characters, thereby enhancing the user's sense of cognitive and effective or affected empathy for the characters in the story.

In some embodiments, aggregation, management, and retrieval of the various user experience settings and content can be performed or implemented within the computer-simulated reality platform (which system is described in detail below with respect to FIGS. 6 and 7), where the settings, content, and transition/shifting implementation information might be stored in the form of a library in a database accessible by the platform.

In some instances, the user experiences might be tailored to address psychological conditions of users, to implement exposure therapy for users, or to perform cognitive behavior conditioning, and/or the like. In some cases, the system and platform might be used to address or even cure certain phobias that might be plaguing users (e.g., fear of spiders, fear of open spaces, fear of heights, etc.), to help users cope with or thrive in particular settings (particularly if the user is hesitant or fearful in such settings; e.g., events or episodes that cause post-traumatic stress disorder in a user, a user's general/specific fear of speaking in front of a crowd, a user's wariness of people or home/school environments due to past abuses or the like, etc.), and so forth.

Computer-Simulated Reality Platform

FIG. 6 is a schematic diagram illustrating a system 600 for implementing a computer-simulated reality platform that enables shifting from one of virtual reality, augmented reality, and mixed reality to another of virtual reality, augmented reality, and mixed reality, in accordance with various embodiments. In FIG. 6, system 600 might comprise a computing system 605, which might include, without limitation, at least one of a server computer, a cloud computing system, or a computing system of the visual output device, and/or the like. In some cases, computing system 605 might correspond to computing system 110 of system 100 of FIG. 1 or computing system 310 of system 300 of FIG. 3, or the like. System 600 might further comprise an asset integration and control system 610 (as described in detail above), which might be communicatively coupled with the computing system 605 via a network 615 (which might correspond to network 115 of system 100 of FIG. 1 or network 315 of system 300 of FIG. 3, or the like). System 600 might further comprise one or more visual output devices 620, which might each include, but are not limited to, a VR headset, an AR headset, a set of AR glasses, a tablet computer, a set of bionic contact lenses, a smart phone adapted as part of a VR headset, or a smart phone adapted as part of an AR system, and/or the like. The one or more visual output devices 620 might be communicatively coupled with the computing system 605 via the network 615.

System 600 might further comprise an asset production system 625 and a production management system 630 (both as described in detail above), each of which might be communicatively coupled with the computing system 605 via the network 615. In some cases, system 600 might further comprise a database 635 that is accessible via network 615. Database 635, in some cases, might correspond to database 120 of system 100 of FIG. 1 or database 320 of system 300 of FIG. 3, or the like.

According to some aspects, the asset integration and control system 610, each of the one or more visual output devices 620, the asset production system 625, and the production management system 630 might communicatively couple with the computing system 605 (via the network 615) via a first API 640a, a second API 640b, a third API 640c, and a fourth API 640d, respectively (collectively, "APIs 640"). The interactions amongst the computing system 605, the asset integration and control system 610, each of the one or more visual output devices 620, the asset production system 625, and the production management system 630 (collectively, "the computer-simulated reality platform") for implementing shifting from one of VR, AR, or MxR to another of VR, AR, or MxR are described in detail with respect to FIGS. 7A-7F below.

We now turn to FIGS. 7A-7F (collectively, "FIG. 7"), which are flow diagrams illustrating a method 700 for implementing a computer-simulated reality platform that enables shifting from one of VR, AR, or MxR to another of VR, AR, or MxR, in accordance with various embodiments. In FIG. 7, the process in method 700 continues from FIG. 7A to FIG. 7B following the circular marker, denoted "A," continues from FIG. 7A to FIG. 7C following the circular marker, denoted "B," continues from FIG. 7A to FIG. 7D following the circular marker, denoted "C," continues from FIG. 7A to FIG. 7E following the circular marker, denoted "D," returns from FIG. 7E to FIG. 7A following the circular marker, denoted, "E," and continues from each of FIGS. 7B-7D to FIG. 7F following the circular marker, denoted "F."

While the techniques and procedures are depicted and/or described in a certain order for purposes of illustration, it should be appreciated that certain procedures may be reordered and/or omitted within the scope of various embodiments. Moreover, while the method illustrated by FIG. 7 can be implemented by or with (and, in some cases, are described below with respect to) the system 600 of FIG. 6 (or components thereof), such method may also be implemented using any suitable hardware (or software) implementation. Similarly, while the system 600 of FIG. 6 (or components thereof) can operate according to the method illustrated by FIG. 7 (e.g., by executing instructions embodied on a computer readable medium), the system 600 of FIG. 6 can also operate according to other modes of operation and/or perform other suitable procedures.

Figure 7A:
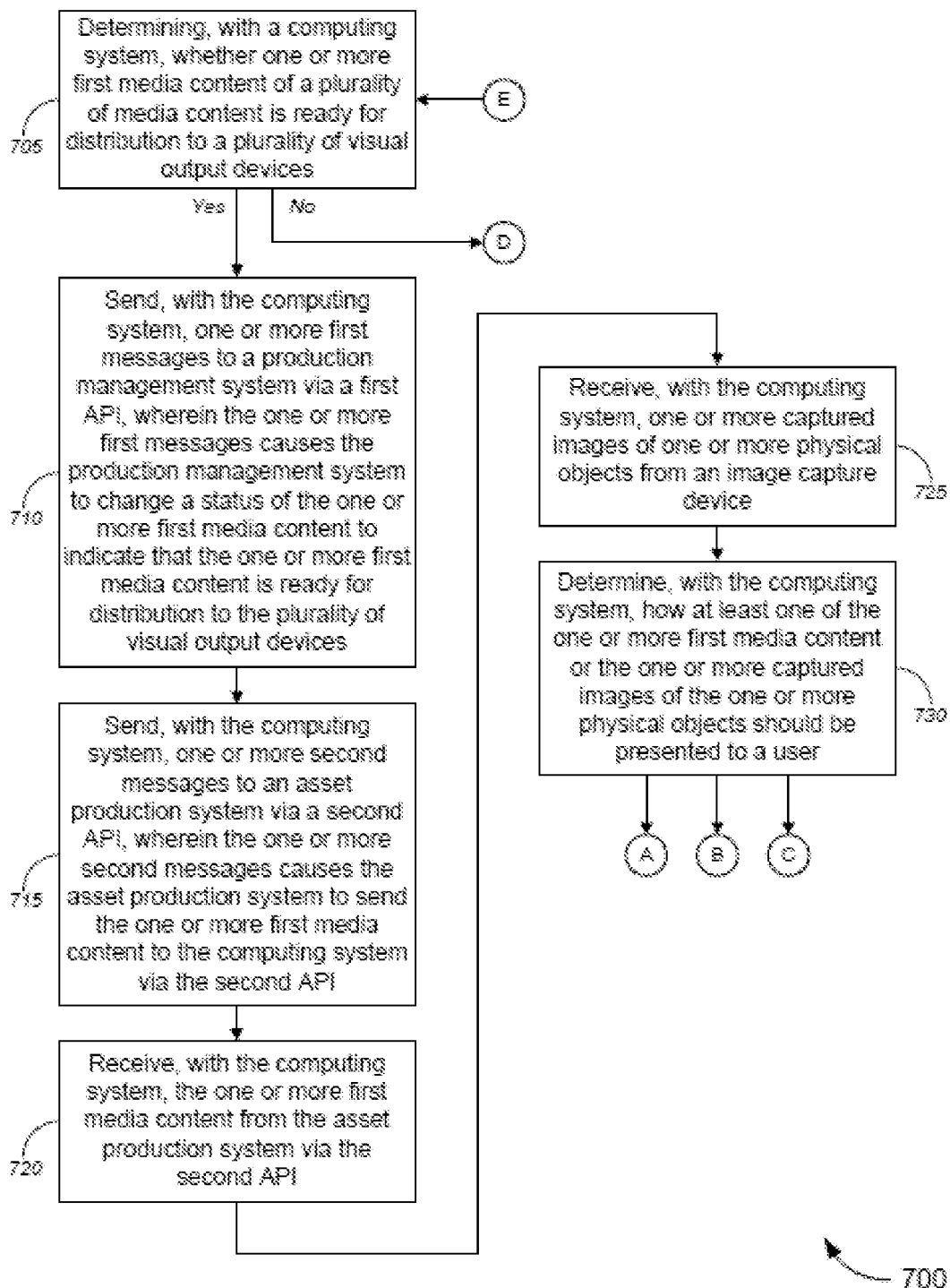
FIGS. 7A-7F are flow diagrams illustrating a method for implementing a computer-simulated reality platform that enables shifting from one of virtual reality, augmented reality, or mixed reality to another of virtual reality, augmented reality, or mixed reality, in accordance with various embodiments.

With reference to FIG. 7A, method 700 might comprise, at block 705, determining, with a computing system, whether one or more first media content of a plurality of media content (which might include VR/AR/MxR assets, VR/AR/MxR content, and/or the like) is ready for distribution to a plurality of visual output devices. If so, the process continues to block 710. If not, the process proceeds to block 765 in FIG. 7E.

At block 710, based on a determination that the one or more first media content is ready for distribution, method 700 might comprise sending, with the computing system, one or more first messages to a production management system via a first API. The one or more first messages causes the production management system to change a status of the one or more first media content to indicate that the one or more first media content is ready for distribution to the plurality of visual output devices. Method 700, at block 715, might comprise sending, with the computing system, one or more second messages to an asset production system via a second API. The one or more second messages causes the asset production system to send the one or more first media content to the computing system via the second API.

Method 700 might further comprise receiving, with the computing system, the one or more first media content from the asset production system via the second API (block 720) and receiving, with the computing system, the one or more captured images of the one or more physical objects from an image capture device (which might correspond to first camera 135 of system 100 of FIG. 1, or the like) (block 725). At block 730, method 700 might comprise determining, with the computing system, how at least one of the one or more first media content of the plurality of media content or the one or more captured images of the one or more physical objects should be presented to a user. The process might continue to one of the process at block 735 in FIG. 7B following marker "A" (for virtual reality presentation), the process at block 745 in FIG. 7C following marker "B" (for augmented reality presentation), or the process at block 755 in FIG. 7D following marker "C" (for mixed reality presentation)

Figures 7B, 7C:
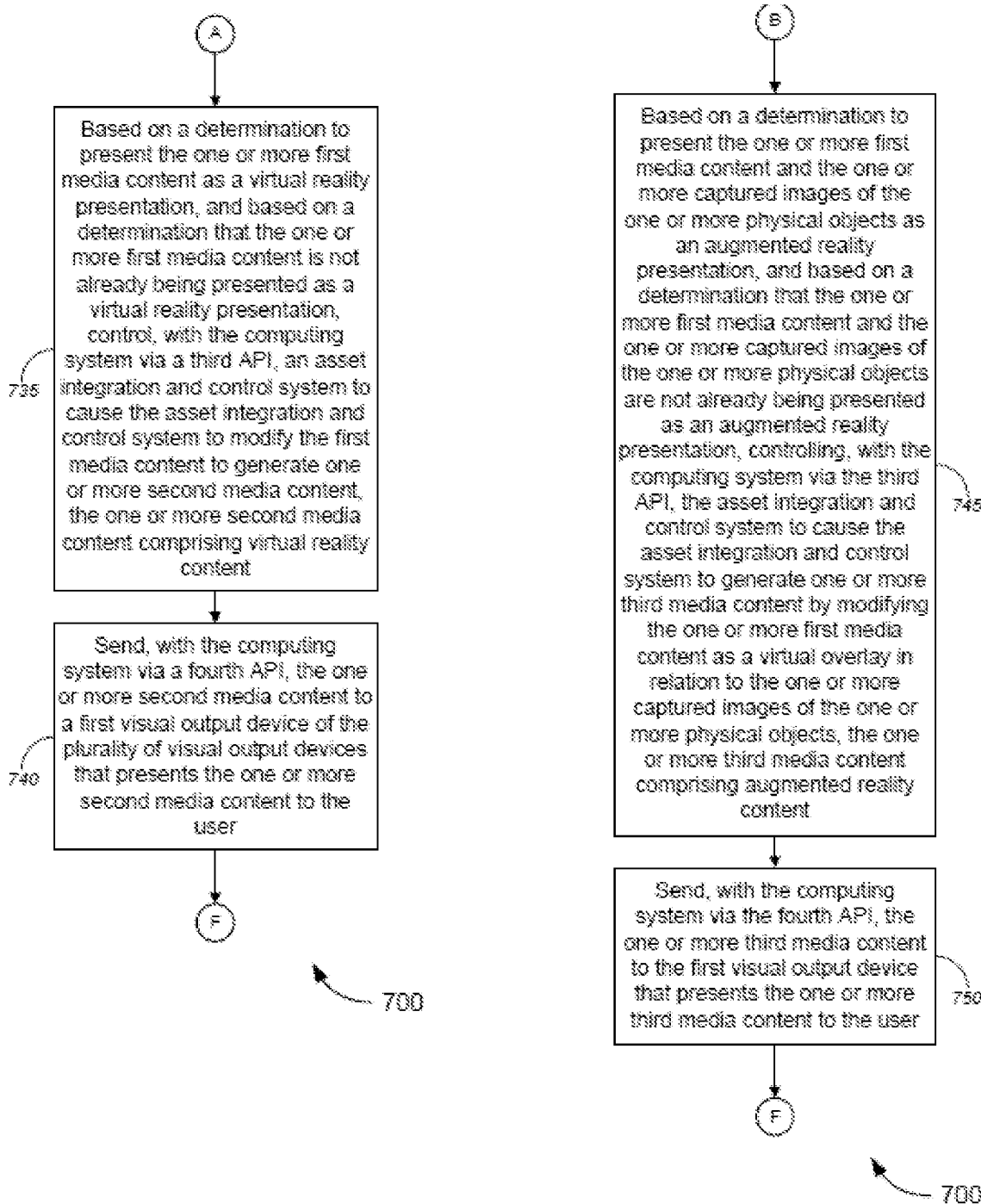

Turning to FIG. 7B, method 700 might comprise, based on a determination to present the one or more first media content as a virtual reality presentation, and based on a determination that the one or more first media content is not already being presented as a virtual reality presentation, controlling, with the computing system via a third API, an asset integration and control system to cause the asset integration and control system to modify the first media content to generate one or more second media content, the one or more second media content comprising virtual reality content (block 735), and sending, with the computing system via a fourth API, the one or more second media content to a first visual output device of the plurality of visual output devices that presents the one or more second media content to the user (block 740). The process might continue to the process at optional block 775 in FIG. 7F.

With reference to FIG. 7C, method 700 might comprise, based on a determination to present the one or more first media content and the one or more captured images of the one or more physical objects as an augmented reality presentation, and based on a determination that the one or more first media content and the one or more captured images of the one or more physical objects are not already being presented as an augmented reality presentation, controlling, with the computing system via the third API, the asset integration and control system to cause the asset integration and control system to generate one or more third media content by modifying the one or more first media content as a virtual overlay in relation to the one or more captured images of the one or more physical objects, the one or more third media content comprising augmented reality content (block 745), and sending, with the computing system via the fourth API, the one or more third media content to the first visual output device that presents the one or more third media content to the user (block 750). The process might continue to the process at optional block 775 in FIG. 7F.

Figures 7D, 7E:
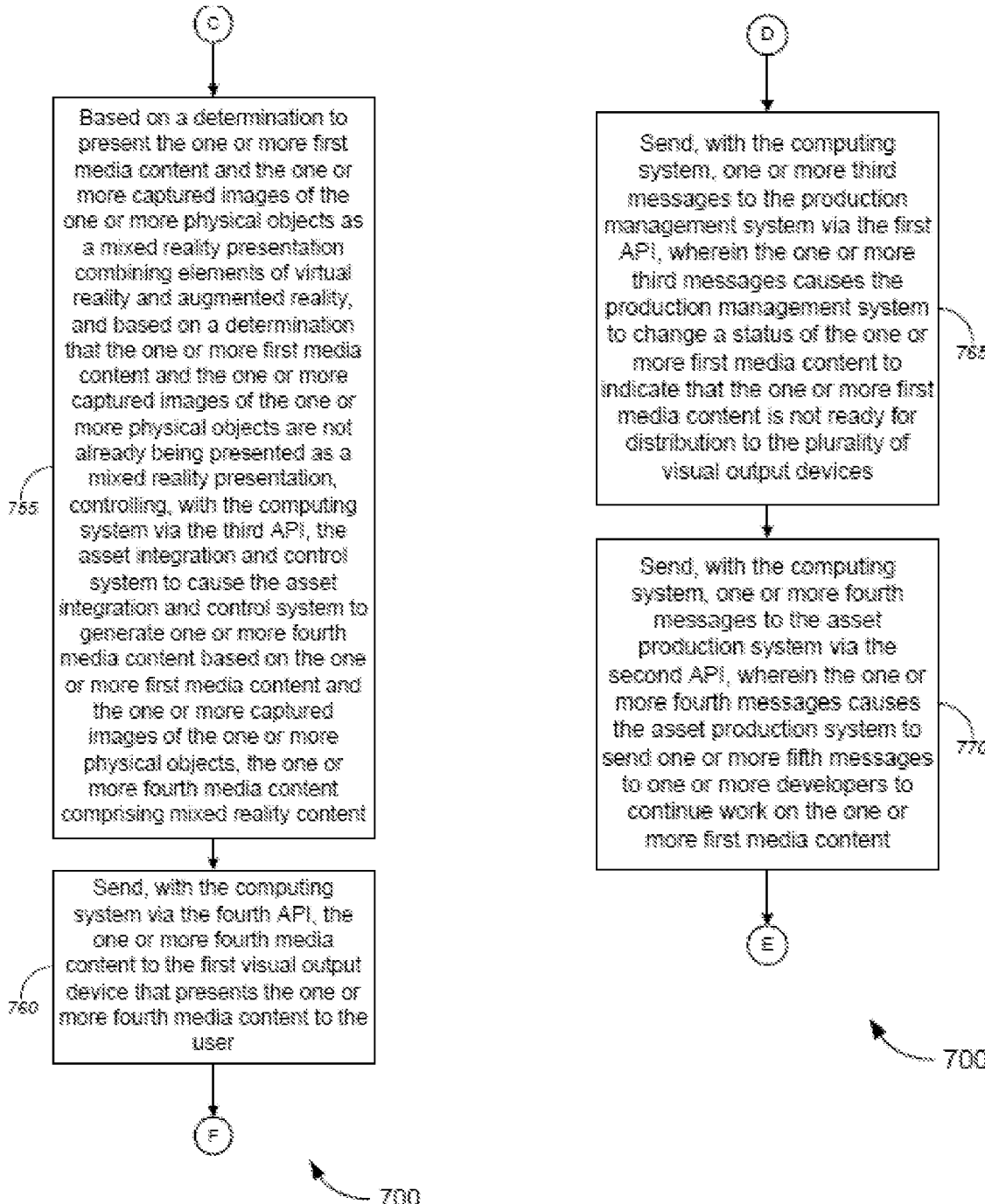

In FIG. 7D, method 700 might comprise, based on a determination to present the one or more first media content and the one or more captured images of the one or more physical objects as a mixed reality presentation combining elements of virtual reality and augmented reality, and based on a determination that the one or more first media content and the one or more captured images of the one or more physical objects are not already being presented as a mixed reality presentation, controlling, with the computing system via the third API, the asset integration and control system to cause the asset integration and control system to generate one or more fourth media content based on the one or more first media content and the one or more captured images of the one or more physical objects, the one or more fourth media content comprising mixed reality content (block 755), and sending, with the computing system via the fourth API, the one or more fourth media content to the first visual output device that presents the one or more fourth media content to the user (block 760). The process might continue to the process at optional block 775 in FIG. 7F.

Turning back to block 705 in FIG. 7A, based on a determination that the one or more first media content is not ready for distribution, method 700 might proceed to block 765 in FIG. 7E following marker "D." At block 765, method 700 might comprise sending, with the computing system, one or more third messages to the production management system via the first API. The one or more third messages causes the production management system to change a status of the one or more first media content to indicate that the one or more first media content is not ready for distribution to the plurality of visual output devices. Method 700, at block 770, might comprise sending, with the computing system, one or more fourth messages to the asset production system via the second API, wherein the one or more fourth messages causes the asset production system to send one or more fifth messages to one or more developers to continue work on the one or more first media content. The process might return to the process at block 705 in FIG. 7A following marker "E."

Figure 7F:
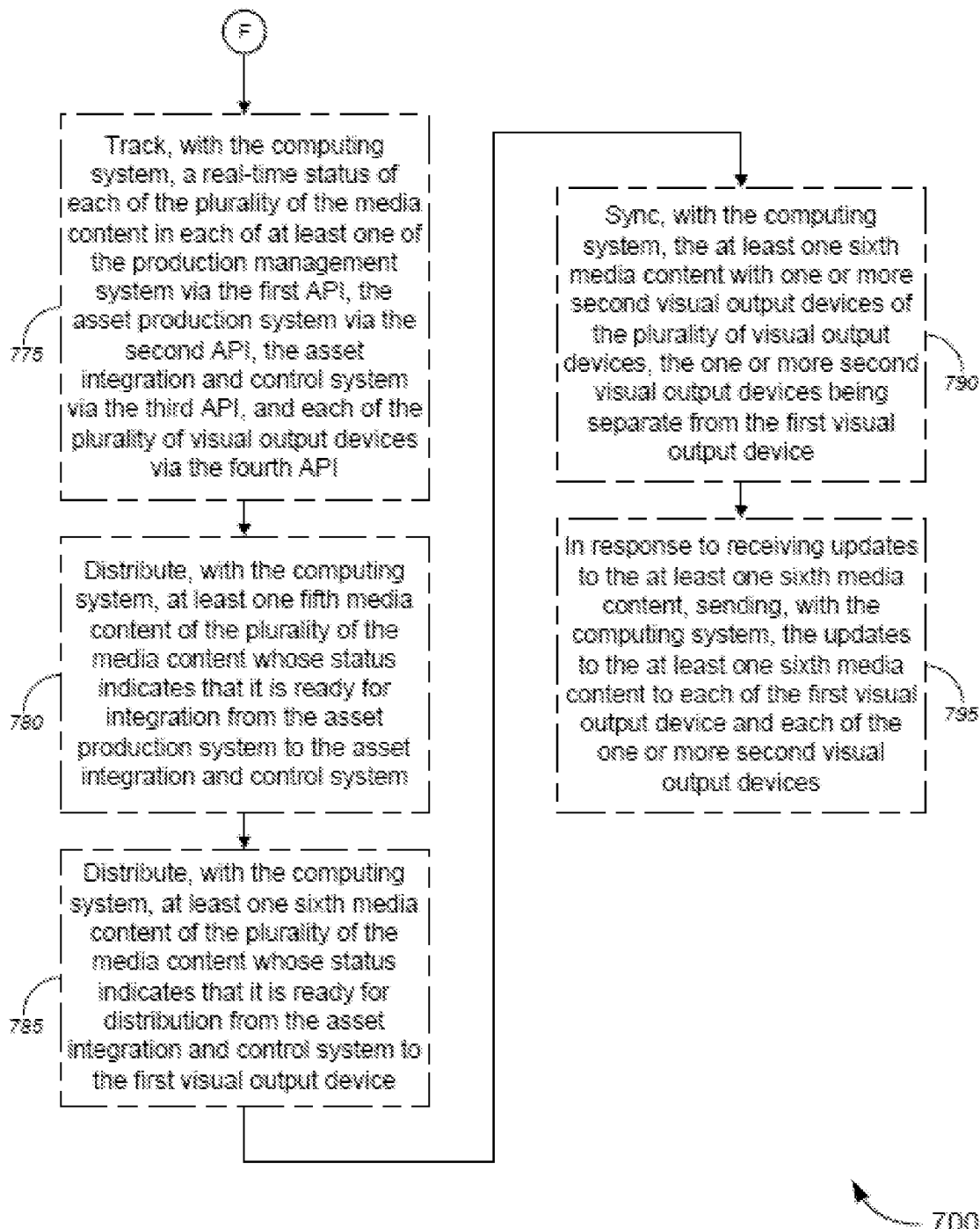

With reference to optional block 775 in FIG. 7F, which follows the marker "F" from each of blocks 740, 750, and 760 in FIGS. 7B, 7C, and 7D, respectively, method 700 might further comprise tracking, with the computing system, a real-time status of each of the plurality of the media content in each of at least one of the production management system via the first API, the asset production system via the second API, the asset integration and control system via the third API, and each of the plurality of visual output devices via the fourth API. System 700 might further comprise distributing, with the computing system, at least one fifth media content of the plurality of the media content whose status indicates that it is ready for integration from the asset production system to the asset integration and control system (optional block 780); distributing, with the computing system, at least one sixth media content of the plurality of the media content whose status indicates that it is ready for distribution from the asset integration and control system to the first visual output device (optional block 785); syncing, with the computing system, the at least one sixth media content with one or more second visual output devices of the plurality of visual output devices, the one or more second visual output devices being separate from the first visual output device (optional block 790); and, in response to receiving updates to the at least one sixth media content, sending, with the computing system, the updates to the at least one sixth media content to each of the first visual output device and each of the one or more second visual output devices (optional block 795).

The system 600 is otherwise similar to, if not identical to, the systems 100 and 300 of FIGS. 1 and 3, and the method 700 is otherwise similar to, if not identical to, the methods 200, 400, and 500 of FIGS. 2, 4, and 5, and descriptions of similar components or processes apply to the components of system 600 and the processes of method 700.

Exemplary System and Hardware Implementation

FIG. 8 is a block diagram illustrating an exemplary computer or system hardware architecture, in accordance with various embodiments. FIG. 8 provides a schematic illustration of one embodiment of a computer system 800 that can perform the methods provided by various other embodiments, as described herein, and/or can perform the functions of computer or hardware system (i.e., computing system 110 or 310, and/or the like), or of any other device (e.g., user device 105 or 305, etc.), as described above. It should be noted that FIG. 8 is meant only to provide a generalized illustration of various components, of which one or more (or none) of each may be utilized as appropriate. FIG. 8, therefore, broadly illustrates how individual system elements may be implemented in a relatively separated or relatively more integrated manner.

The computer or hardware system 800—which might represent an embodiment of the computer or hardware system (i.e., computing system 110 or 310, and/or the like), or of any other device (e.g., user device 105 or 305, etc.), described above with respect to FIGS. 1 and 3—is shown comprising hardware elements that can be electrically coupled via a bus 805 (or may otherwise be in communication, as appropriate). The hardware elements may include one or more processors 810, including, without limitation, one or more general-purpose processors and/or one or more special-purpose processors (such as digital signal processing chips, graphics acceleration processors, and/or the like); one or more input devices 815, which can include, without limitation, a mouse, a keyboard, and/or the like; and one or more output devices 820, which can include, without limitation, a display device, a printer, and/or the like.

The computer or hardware system 800 may further include (and/or be in communication with) one or more storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 800 might also include a communications subsystem 830, which can include, without limitation, a modem, a network card (wireless or wired), an infra-red communication device, a wireless communication device and/or chipset (such as a Bluetooth™ device, an 802.11 device, a WiFi device, a-WiMax device, a WWAN device, cellular communication facilities, etc.), and/or the like. The communications subsystem 830 may permit data to be exchanged with a network (such as the network described below, to name one example), with other computer or hardware systems, and/or with any other devices described herein. In many embodiments, the computer or hardware system 800 will further comprise a working memory 835, which can include a RAM or ROM device, as described above.

The computer or hardware system 800 also may comprise software elements, shown as being currently located within the working memory 835, including an operating system 840, device drivers, executable libraries, and/or other code, such as one or more application programs 845, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 800 and/or might take the form of source and/or installable code, which, upon compilation and/or installation on the computer or hardware system 800 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 800) to perform methods in accordance with various embodiments of the invention. According to a set of embodiments, some or all of the procedures of such methods are performed by the computer or hardware system 800 in response to processor 810 executing one or more sequences of one or more instructions (which might be incorporated into the operating system 840 and/or other code, such as an application program 845) contained in the working memory 835. Such instructions may be read into the working memory 835 from another computer readable medium, such as one or more of the storage device(s) 825. Merely by way of example, execution of the sequences of instructions contained in the working memory 835 might cause the processor(s) 810 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 800, various computer readable media might be involved in providing instructions/code to processor(s) 810 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 825. Volatile media includes, without limitation, dynamic memory, such as the working memory 835. In some alternative embodiments, a computer readable medium may take the form of transmission media, which includes, without limitation, coaxial cables, copper wire and fiber optics, including the wires that comprise the bus 805, as well as the various components of the communication subsystem 830 (and/or the media by which the communications subsystem 830 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 800. These signals, which might be in the form of electromagnetic signals, acoustic signals, optical signals, and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

As noted above, a set of embodiments comprises methods and systems for implementing computer-simulated reality interactions, and, in particular embodiments, to methods, systems, and computer software for implementing computer-simulated reality interactions between users and physical publications. FIG. 9 illustrates a schematic diagram of a system 900 that can be used in accordance with one set of embodiments. The system 900 can include one or more user computer or user device 905. A user computer or user device 905 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX"" or UNIX-like operating systems. A user computer or user device 905 can also have any of a variety of applications, including one or more applications configured to perform methods provided by various embodiments (as described above, for example), as well as one or more office applications, database client and/or server applications, and/or web browser applications. Alternatively, a user computer or user device 905 can be any other electronic device, such as a thin-client computer, Internet-enabled mobile telephone, and/or personal digital assistant, capable of communicating via a network (e.g., the network(s) 910 described below) and/or of displaying and navigating web pages or other types of electronic documents. Although the exemplary system 900 is shown with four user computers or user devices 905, any number of user computers or user devices can be supported.

Certain embodiments operate in a networked environment, which can include a network(s) 910. The network(s) 910 can be any type of network familiar to those skilled in the art that can support data communications using any of a variety of commercially-available (and/or free or proprietary) protocols, including, without limitation, TCP/IP, SNA™, AppleTalk™, and the like. Merely by way of example, the network(s) 910 (similar to network 115 of FIG. 1 or network 315 of FIG. 3, or the like) can each include a LAN, including, without limitation, a fiber network, an Ethernet network, a Token-Ring™ network, and/or the like; a WAN; a WWAN; a virtual network, such as a VPN; the Internet; an intranet; an extranet; a PSTN; an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an ISP). In another embodiment, the network might include a core network of the service provider, and/or the Internet.

Embodiments can also include one or more server computers 915. Each of the server computers 915 may be configured with an operating system, including, without limitation, any of those discussed above, as well as any commercially (or freely) available server operating systems. Each of the servers 915 may also be running one or more applications, which can be configured to provide services to one or more clients 905 and/or other servers 915.

Merely by way of example, one of the servers 915 might be a data server, a web server, a cloud computing device(s), or the like, as described above. The data server might include (or be in communication with) a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one or more application servers, which can be configured with one or more applications accessible by a client running on one or more of the client computers 905 and/or other servers 915. Merely by way of example, the server(s) 915 can be one or more general purpose computers capable of executing programs or scripts in response to the user computers 905 and/or other servers 915, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer or user device 905 and/or another server 915. In some embodiments, an application server can perform one or more of the processes for implementing computer-simulated reality interactions, and, in particular embodiments, to methods, systems, and computer software for implementing computer-simulated reality interactions between users and physical publications, or the like, as described in detail above. Data provided by an application server may be formatted as one or more web pages (comprising HTML, JavaScript, etc., for example) and/or may be forwarded to a user computer 905 via a web server (as described above, for example). Similarly, a web server might receive web page requests and/or input data from a user computer 905 and/or forward the web page requests and/or input data to an application server. In some cases, a web server may be integrated with an application server.

In accordance with further embodiments, one or more servers 915 can function as a file server and/or can include one or more of the files (e.g., application code, data files, etc.) necessary to implement various disclosed methods, incorporated by an application running on a user computer 905 and/or another server 915. Alternatively, as those skilled in the art will appreciate, a file server can include all necessary files, allowing such an application to be invoked remotely by a user computer or user device 905 and/or server 915.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920a and 920b (collectively, "databases 920"). The location of each of the databases 920 is discretionary: merely by way of example, a database 920a might reside on a storage medium local to (and/or resident in) a server 915a (and/or a user computer or user device 905). Alternatively, a database 920b can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 920 can be a relational database, such as an Oracle database, that is adapted to store, update, and retrieve data in response to SQL-formatted commands. The database might be controlled and/or maintained by a database server, as described above, for example.

According to some embodiments, system 900 might further comprise a printed publication 925 (which might correspond to printed publication 125 or 325 of FIGS. 1 and 3, respectively). In some embodiments, the printed publication 925 might include, without limitation, one of a fiction novel, a non-fiction novel, a children's book, a newspaper, a magazine, a comic book, a comic strip, a graphic novel, an encyclopedia, a dictionary, a map, a calendar, a greeting card, a bookmark, a venue or event ticket stub, or a poster, and/or the like. In some cases, the printed publication 925 might comprise one or more triggers 930 on at least a portion of the printed publication 925. The one or more triggers, in some instances, might each include, but is not limited to, one of a QR code provided on the at least a portion of the publication, a barcode provided on the at least a portion of the publication, a graphical code provided on a sticker affixed to the at least a portion of the publication, a graphic printed on the at least a portion of the publication, a keyword or key code printed on the at least a portion of the publication, a cover image of the printed publication, a title printed on a cover of the printed publication, author name printed on the cover of the printed publication, a stuffed character associated with the printed publication that is positioned in proximity to the printed publication, a 3D-printed character associated with the printed publication that is positioned in proximity to the printed publication, or a 3D-printed object associated with the printed publication that is positioned in proximity to the printed publication, and/or the like. Alternatively, the one or more triggers might each include, without limitation, one of a RFID tag, a BLE tag, a NFC tag, or a RTLS tag, and/or the like. The user device 905 might comprise one or more trigger detectors 935, which might each include, without limitation, one of a camera, a wireless transceiver, and/or the like. The wireless transceiver might comprise one of an RFID scanner, a BLE interface, a NFC interface, a RTLS interface, and/or the like. System 900 might further comprise a platform or computer-simulated reality platform 940, which enables shifting from one of VR, AR, or MxR to another of VR, AR, or MxR, and is described in detail with respect to FIGS. 6 and 7.

In operation, in response to at least one trigger detector 935 of the one or more trigger detector 935 detecting at least one trigger 930 of the one or more triggers 930, the user device 905 or the server 915 might identify one or more media content that are associated with the at least one trigger 930. In some embodiments, the one or more media content comprises at least one of a 3D still graphic, a 3D animated graphic, or a 3D interactive animated graphic. In some instances, each of the 3D still graphic, the 3D animated graphic, or the 3D interactive animated graphic comprises at least one of a graphic representation of one or more characters associated with the printed publication, a non-fictional geographical location associated with the printed publication, a fictional geographical location associated with the printed publication, a room associated with the printed publication, a building associated with the printed publication, a scene described in the printed publication, a scene inspired by the scene described in the printed publication, one or more items described in the printed publication, or one or more items inspired by the one or more items described in the printed publication, and/or the like.

The user device 905 might determine a field of view of the user (e.g., by using a camera such as camera 140 or 340 of FIGS. 1 and 3, respectively). The field of view might include at least a portion of the printed publication. The user device 905 or the server 930 might, if necessary, modify an orientation of the one or more media content to align with the field of view of the user, and might display, on a display device of the user device 905, the one or more media content whose orientation has been modified to align with the field of view of the user, in some cases, such that the one or more media content is presented as a virtual overlay in relation to the at least a portion of the printed publication (e.g., presented as a virtual overlay above a cover of the printed publication, presented as a virtual overlay on a cover of the printed publication, presented as a virtual overlay beside the printed publication, presented as a virtual overlay above a page of the printed publication, presented as a virtual overlay on a page of the printed publication, presented as a virtual overlay in front of a surface of the printed publication, presented as a virtual overlay in front of a binding of the printed publication, presented as a virtual overlay above a 2D graphic printed on a portion of the printed publication, or presented as a virtual overlay on a 2D graphic printed on a portion of the printed publication, and the like).

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Li$_{nux}$®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One®, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (ANIOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM° Lotus Domino°. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XFITML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome WebStore, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of user, publication, trigger, AR content, and VR content information. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example I—a Physical Book with Triggers Initiating AR and VR User Experiences In a particular embodiment, a user obtains a publication in the form of an e-book for young readers entitled "Morning Nightmare." As depicted in FIGS. 10-25, the publication presents an illustrated story of a memorable winter school bus ride. The story presented in the publication includes messages about overcoming fears and building self-confidence and highlights coping skills and conflict resolution techniques. The story is presented in the first person.

Figure 19:
Figure 20:
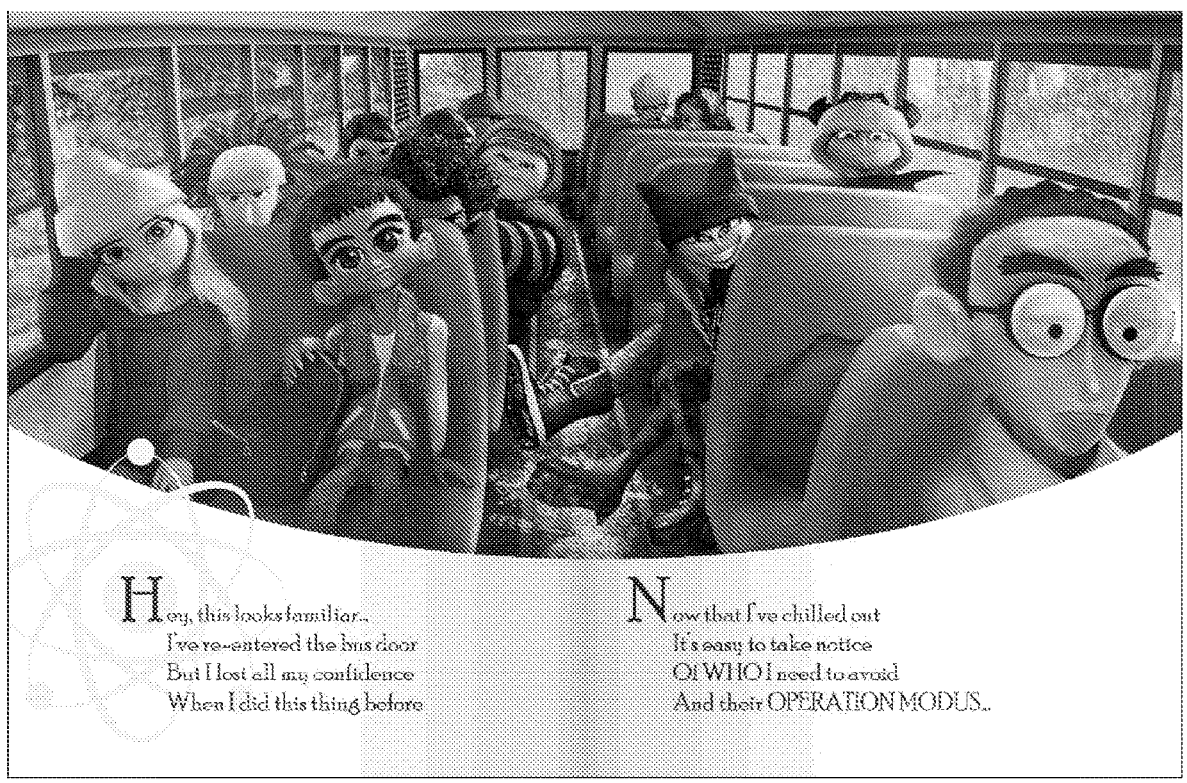
Figure 21:
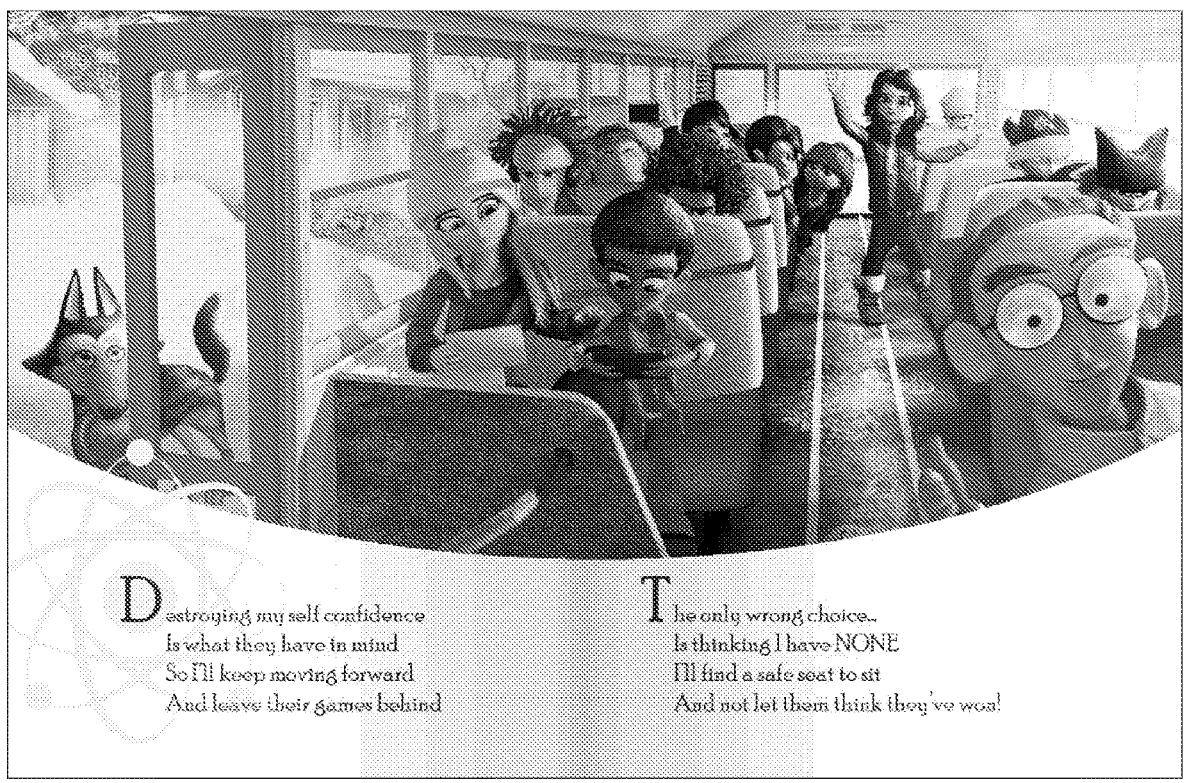
Figure 22:
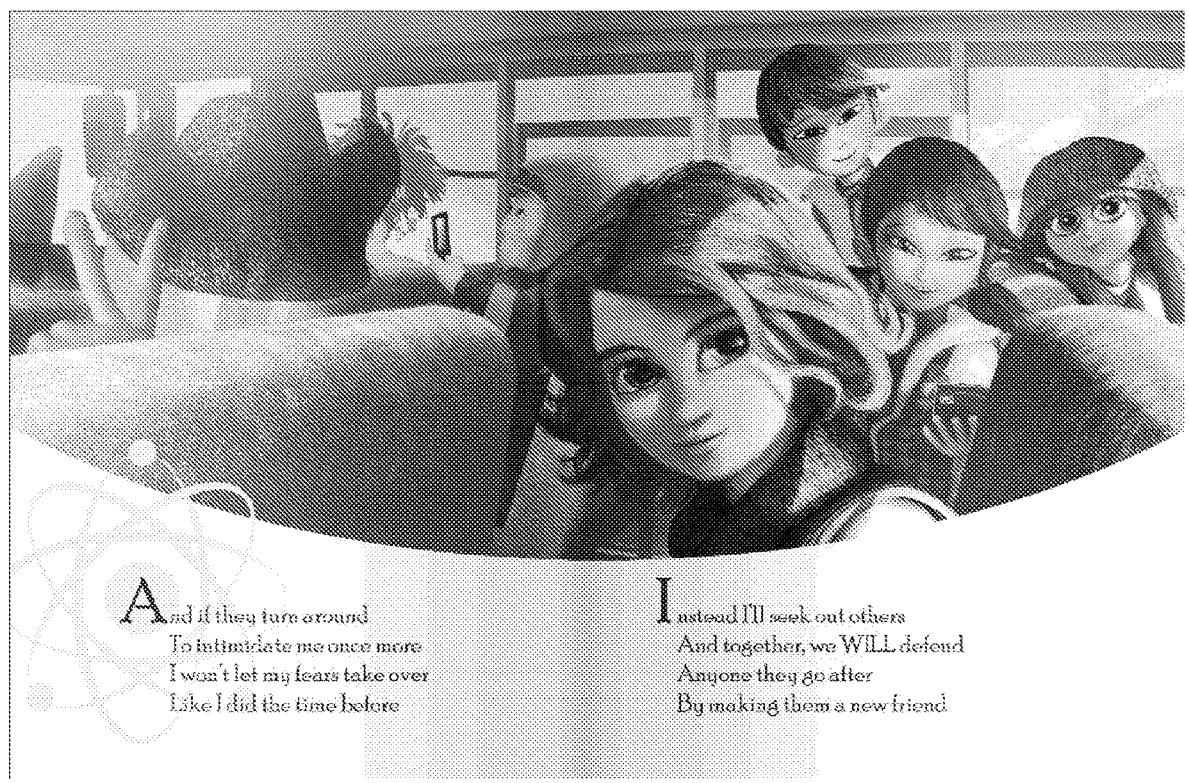
Figure 23:
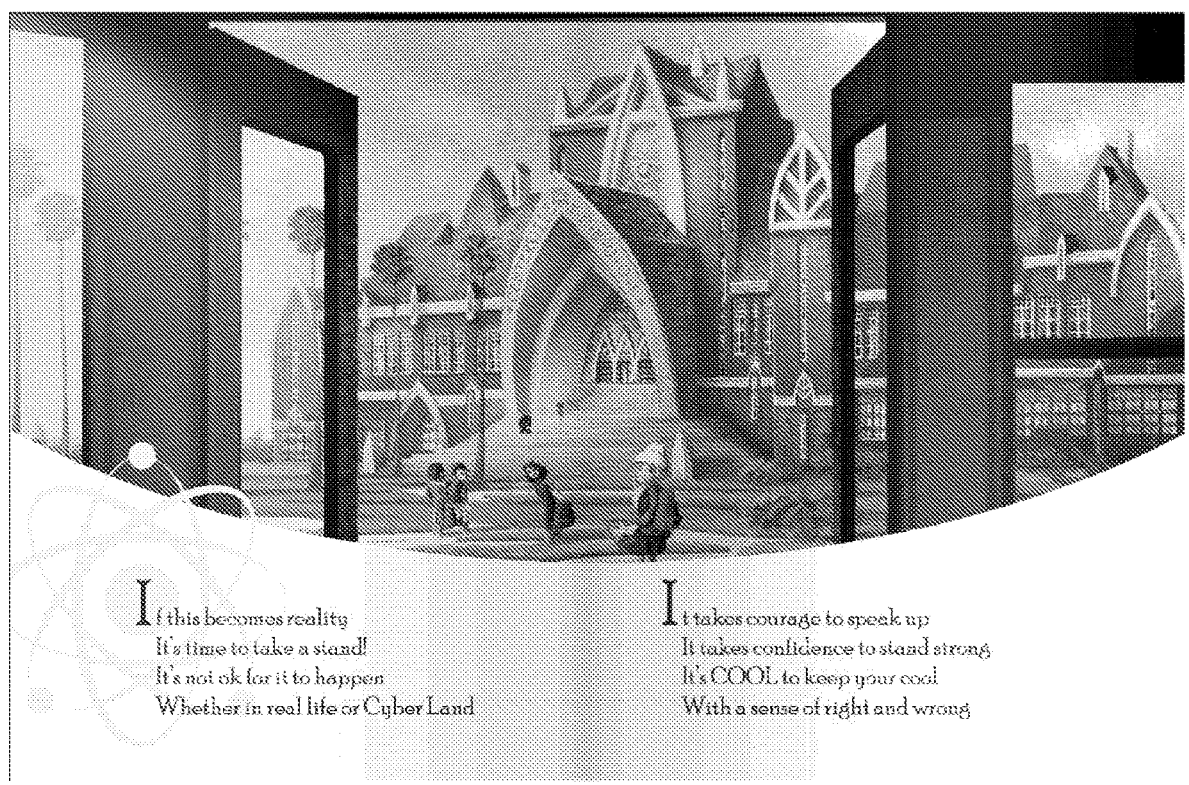
Figure 24:
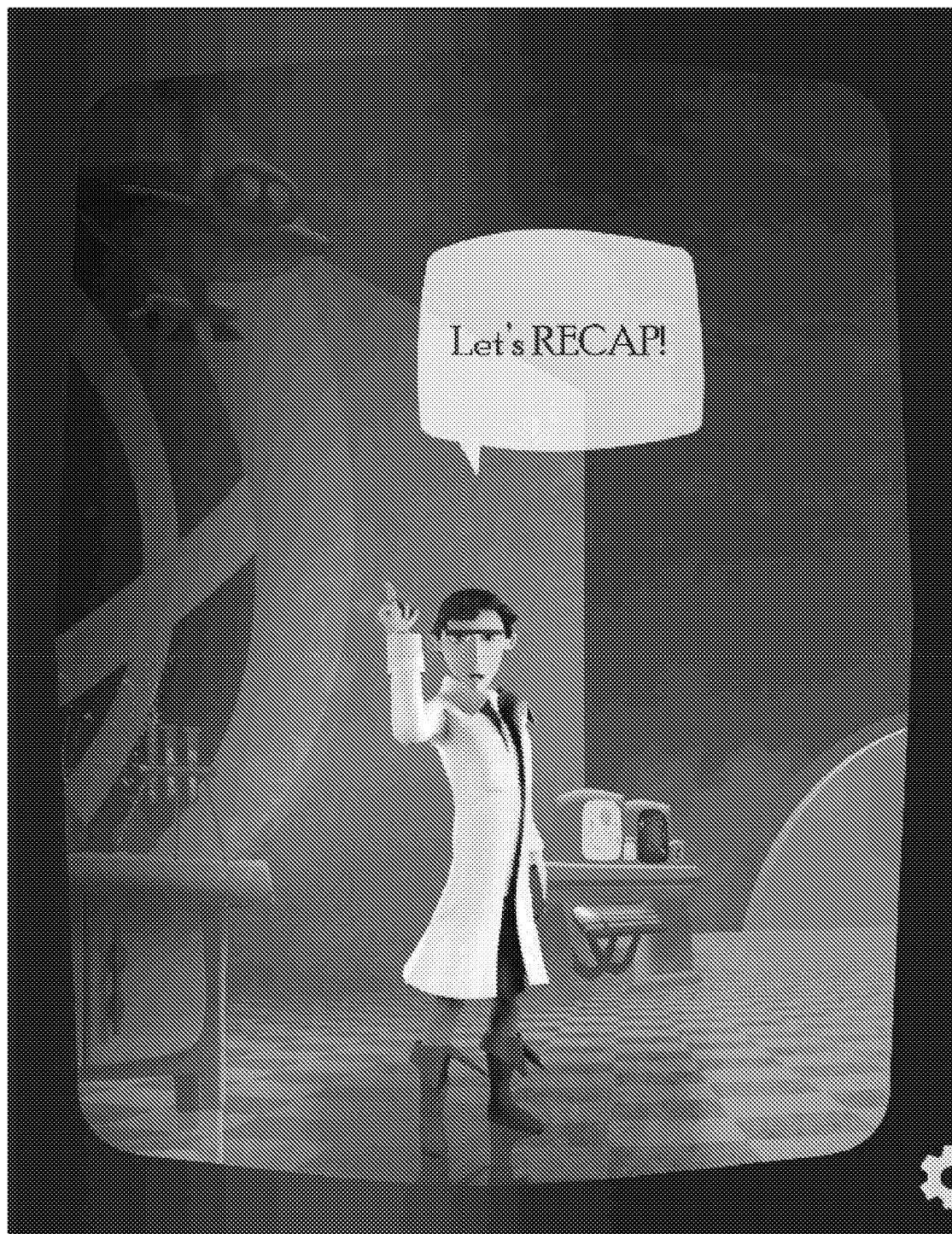
Figure 25:
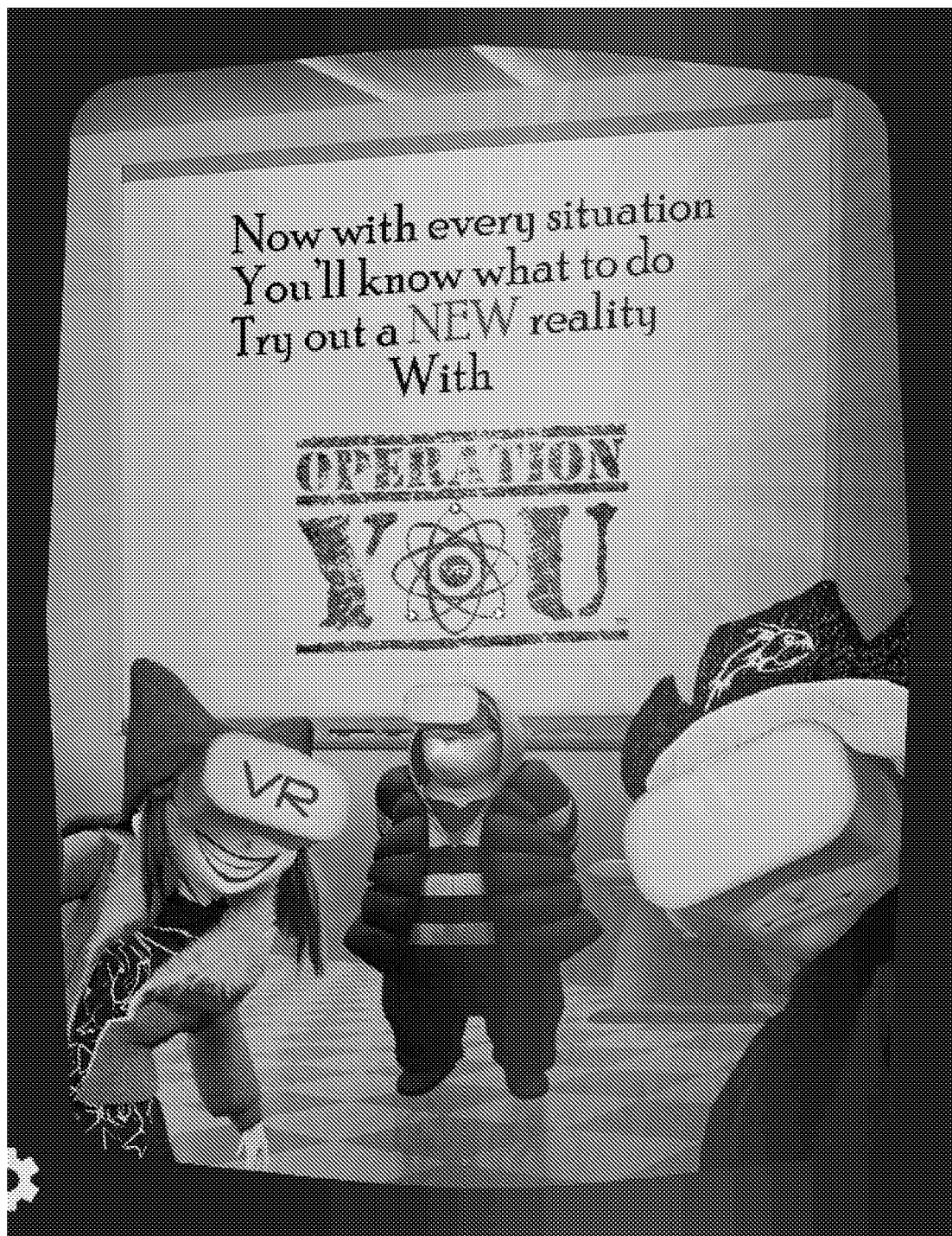

Referring to FIG. 19, the publication includes a QR code, which when scanned by a mobile computing device of the user, provides access to download and install an application as described herein. The application is also available via app stores known to the field. The application, once installed, allows the user to view their surroundings through a camera of the mobile computing device, the output of which is displayed on the screen of the device.

Figure 26:
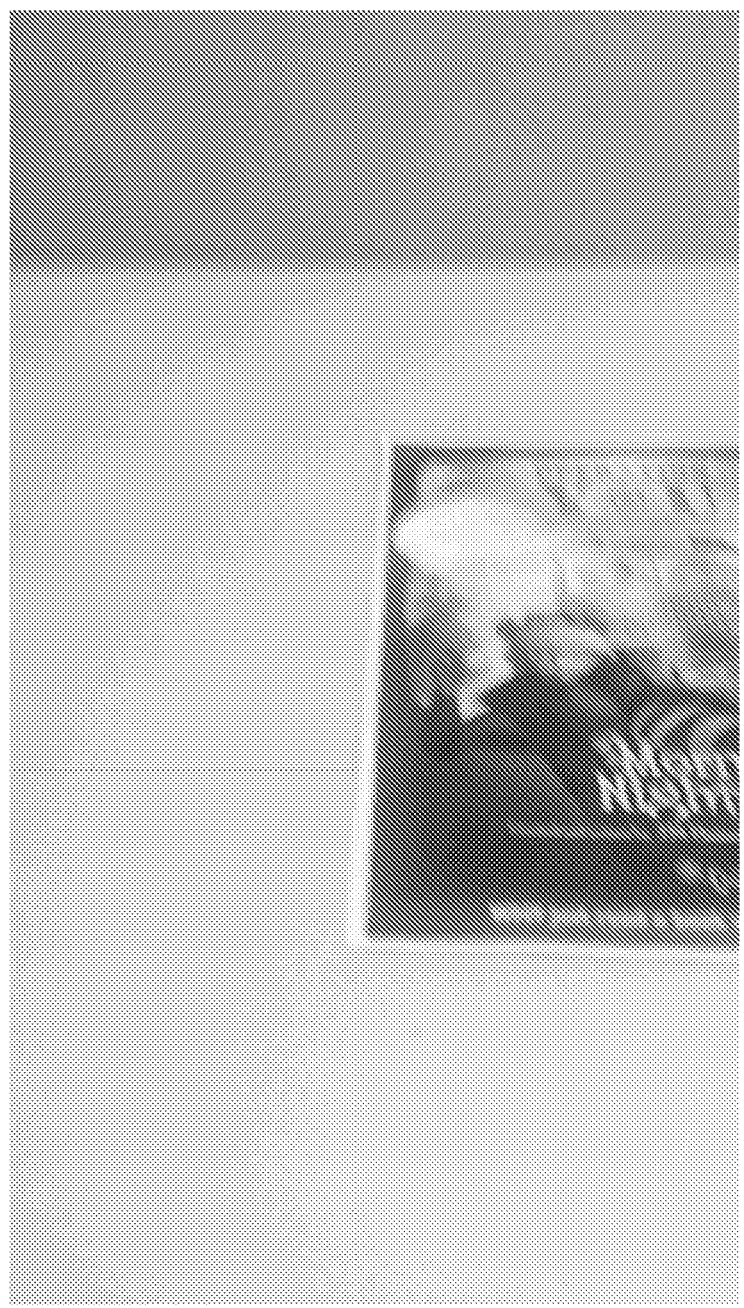
FIGS. 26-30 illustrate an exemplary AR experience.

Referring to FIG. 26, the user installs the application and activates the application icon to launch the application. The user then views their surroundings, with the application running on the device, via the output of the camera on the display screen of the mobile computing device. As such a live video feed of the user's surroundings is available to the application. Continuing to refer to FIG. 26, when a printout of the e-book (or the onscreen presentation of the e-book itself) is viewed via the device running the application, the cover art of the publication is identified as a trigger. In this case, an image of the cover art was uploaded to a database and associated with media content.

Figure 27:

Referring to FIG. 27, the application uses the identified trigger to query the database and identify media content associated with the trigger. The media content identified in this case is a 3D, animated, interactive media element. The media content is presented to the user on the screen of the device as AR content overlaid on the publication's cover. Continuing to refer to FIG. 26, the AR content includes a character from the publication's story engaging in an activity related to the plot and theme of the story. In this case, a child from the bus who is antagonizing the user by throwing snowballs.

In some cases, the user can interact with the media content via the mobile computing device's input elements such as a touchscreen, multitouch screen, buttons, stylus, trackball, or the like. In a particular embodiment, the user can throw snowballs back at the character in the media content by touching the character in the AR overlay.

Figure 28:
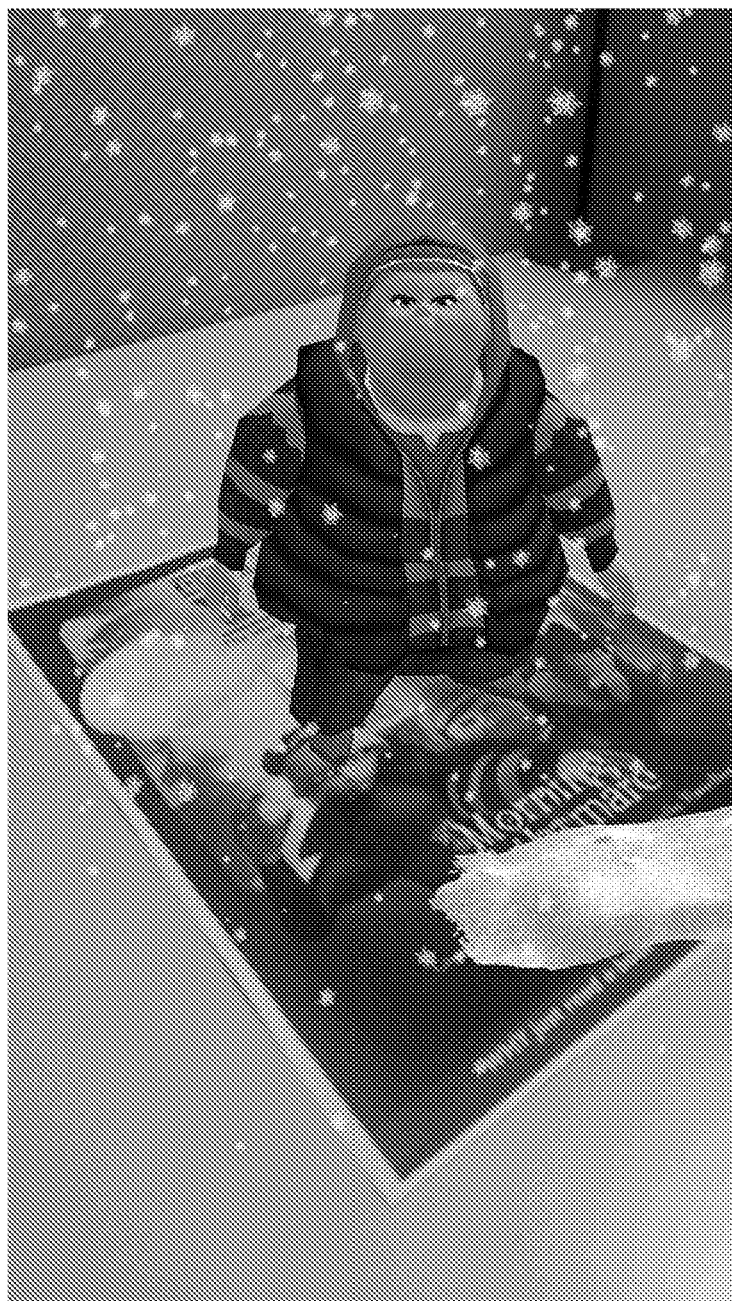
Figure 29:
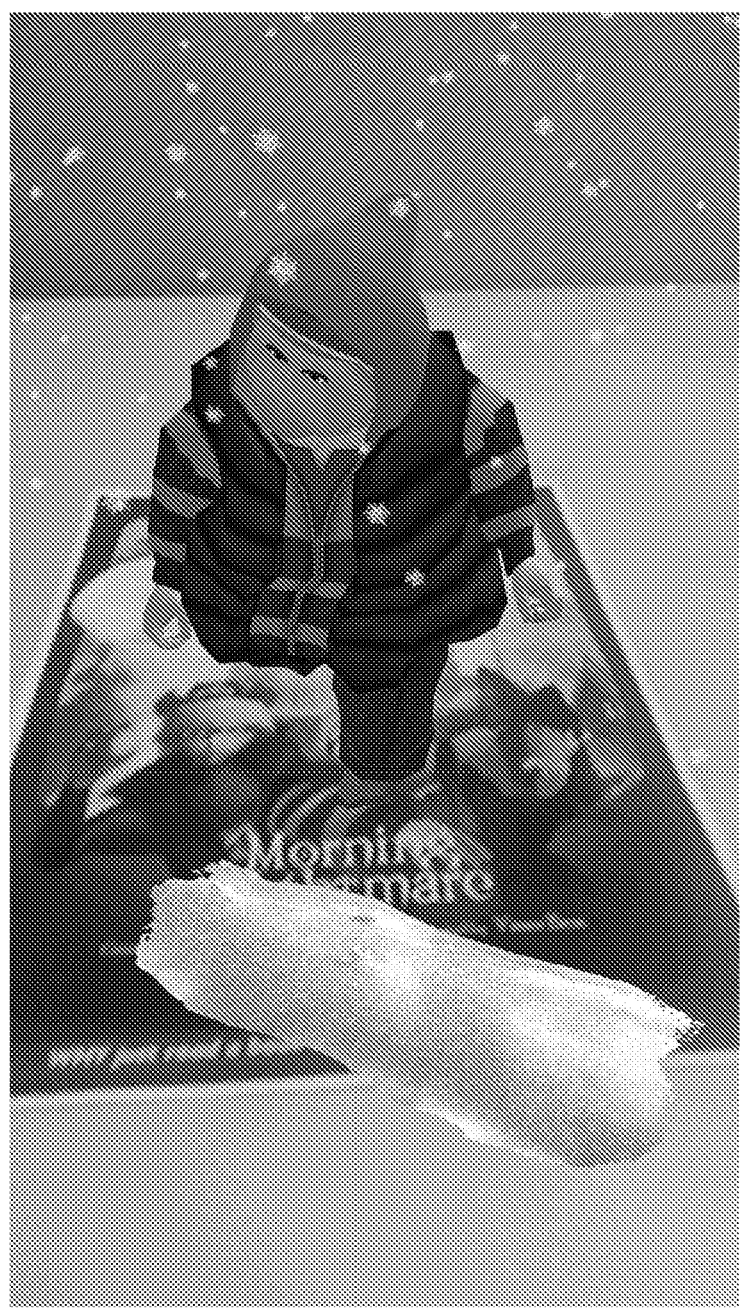
Figure 30:
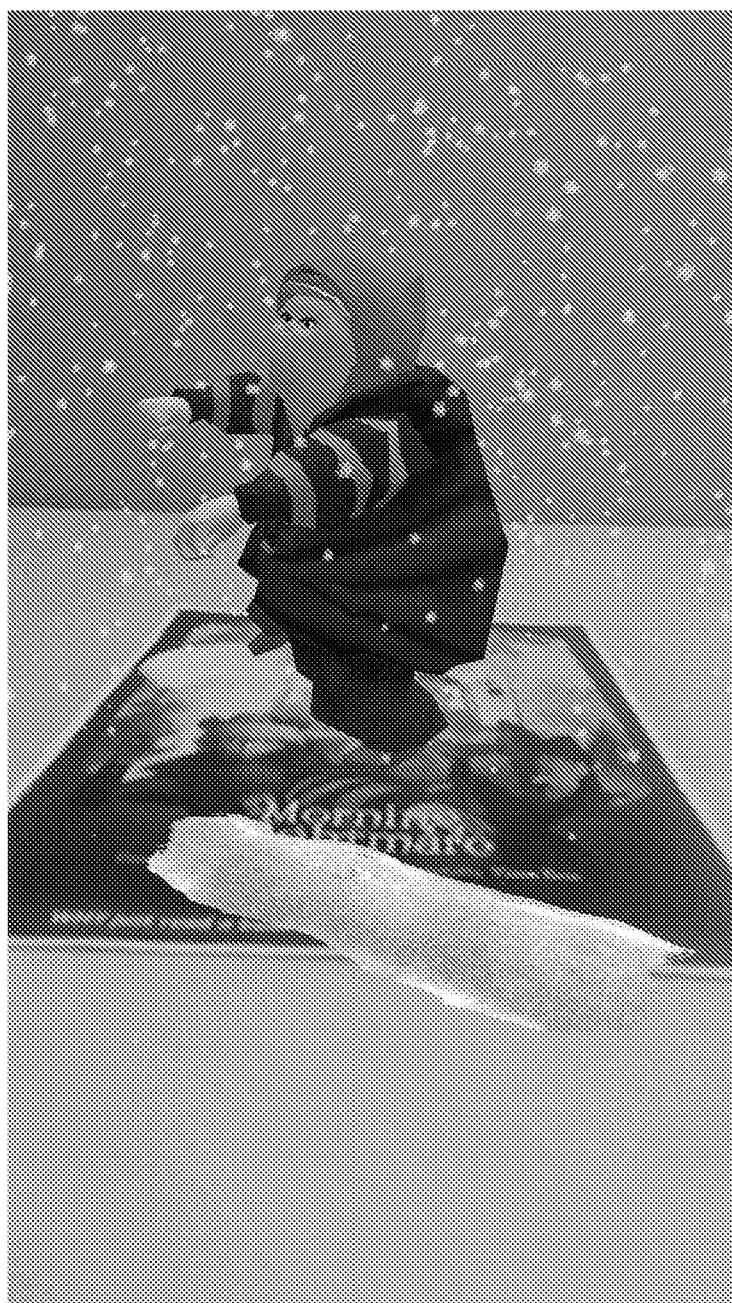

Referring to FIG. 28, the application continually monitors the field of view of a user to determine if the publication and any triggers therein are in the field of view and to determine the users viewing angle with respect to the publication and the identified trigger. Continuing to refer to FIG. 28, when the user's view rotates with respect to the publication and the identified trigger, the orientation of the media content is modified to align with the field of view of the user and the character in the AR media content turns to face the user.

Figure 31:
FIG. 31 illustrates a first exemplary VR experience.
Figure 32:
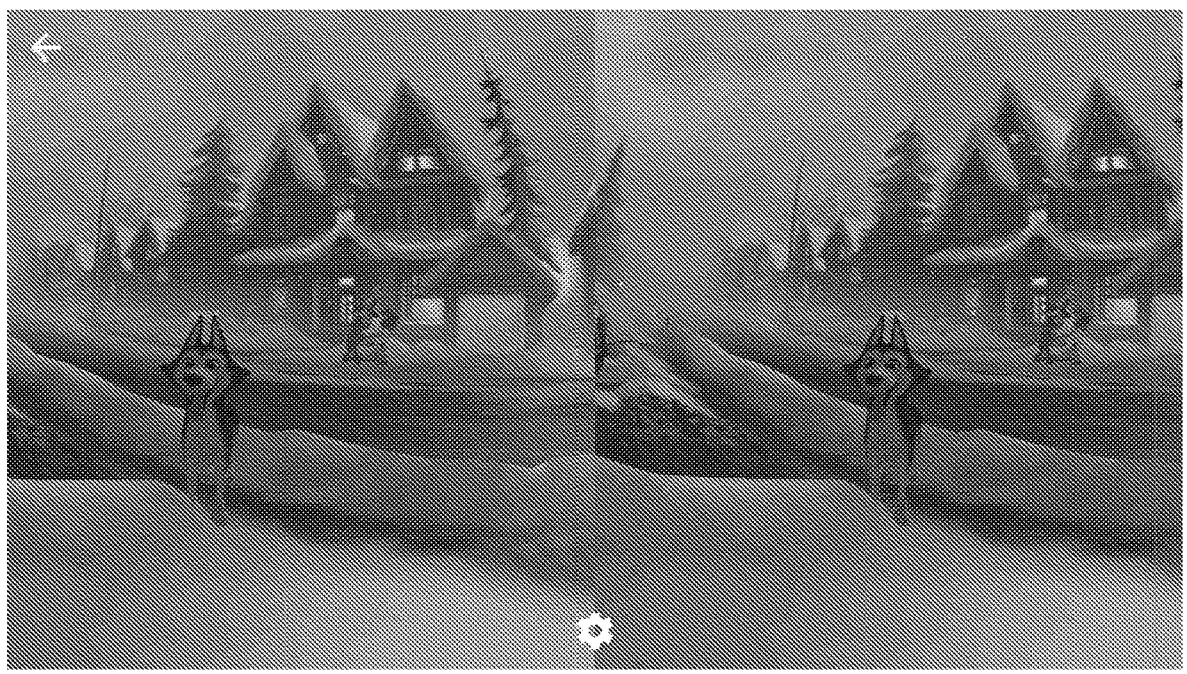
FIGS. 32-36 illustrate a second exemplary VR experience.
Figure 33:
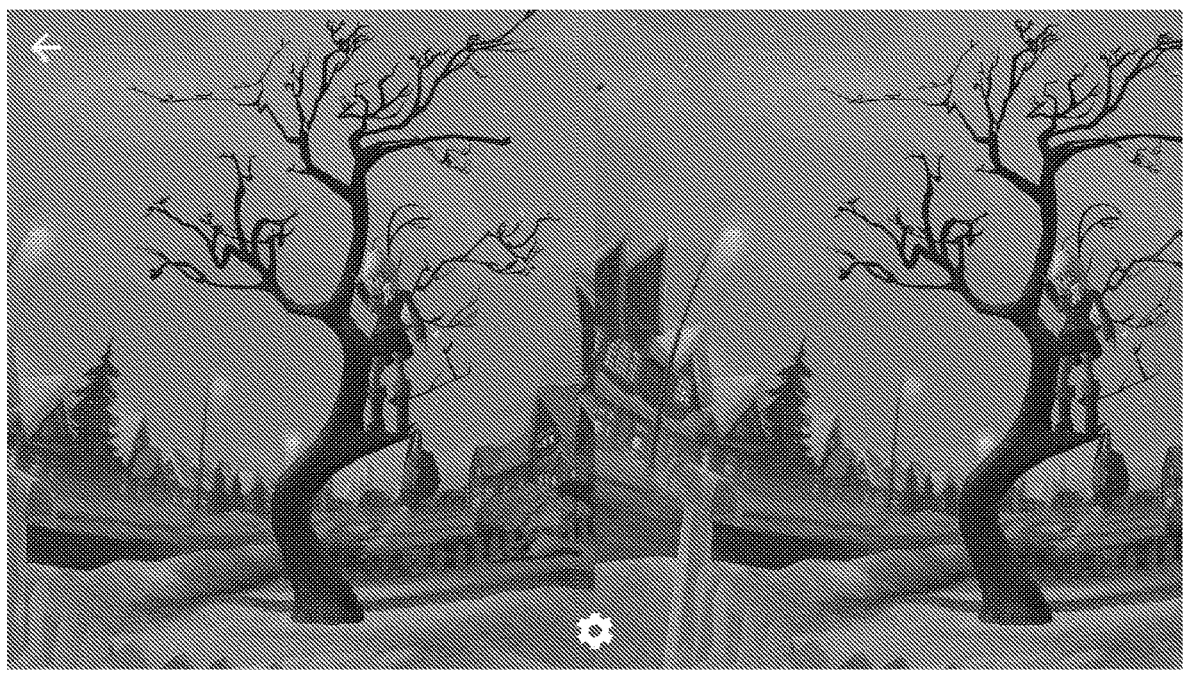

Referring to FIG. 31, completion of the first enhanced interactive experience triggers a second, which is a VR experience. The user is instructed to place their mobile device into an VR headset to view the second enhanced interactive experience. Continuing to refer to FIG. 31, a trigger is identified and used to further identify a second media content. In this case, a VR media content depicting a 3D interactive scene associated with the story and presented from the first person perspective of the story.

FIGS. 32-36 demonstrate an alternative second enhanced interactive experience, again, VR media content depicting a scene related to the story and presented from the first person perspective of the main character of the story. In this case, a snowy scene illustrating multiple characters from the story engaged in activities related to the story. When the user's view rotates in space, the orientation of the media content is modified to provide a 3D and 360 degree VR scene.

Figure 34:
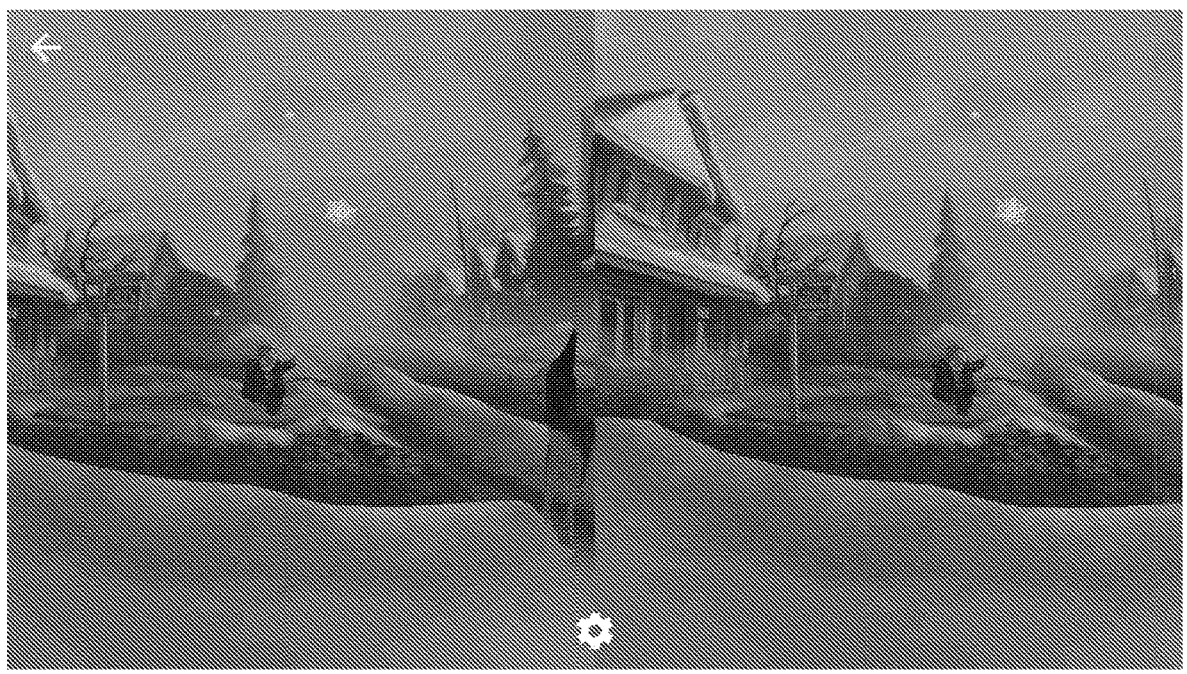
Figure 35:
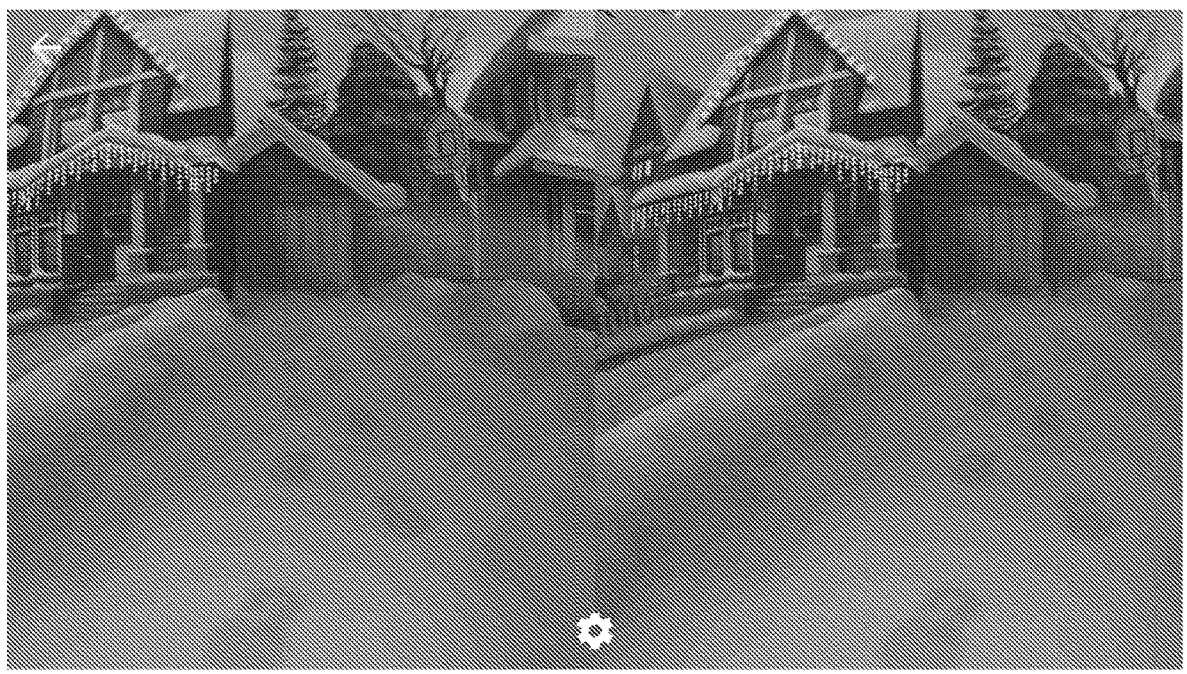
Figure 36:
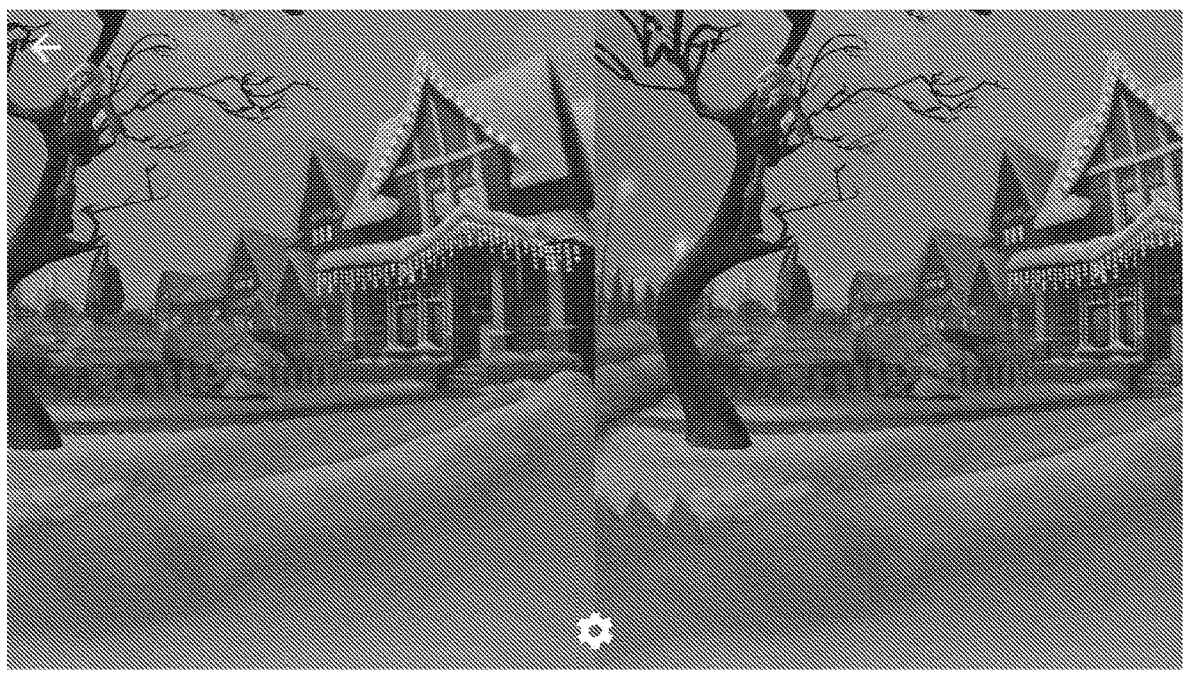

Referring to FIG. 34 in particular, the VR media content is interactive. By using a focal point marked at the center of the user's field of view in the VR environment, the user is able to interact with the environment and the characters using gaze placement and duration. In this case, again picking a snowball fight with a character from the story.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

The invention claimed is:

1. A computer-implemented method comprising:
receiving one or more live camera feeds including image data of a piece of content that includes plurality of triggers, the piece of content related to a source story;
identifying, automatically, at least one trigger in the one or more live camera feeds that provides one or more augmented reality display media related to the source story;
presenting, via a visual output device, the one or more augmented reality display media;
identifying one or more virtual reality environments pertaining to the source story caused by user engagement with at least one digital trigger in a portion of the one or more augmented reality display media, the one or more virtual reality environments including a scene from the source story presented from a point of view of a character included in the source story; and
terminating presentation of the one or more augmented reality display media and presenting, via the visual output device, the one or more virtual reality environments;
creating a set of expanded scenes related to the source story, the set of expanded scenes associated with at least one trigger in the one or more virtual reality environments;
identifying the at least one trigger in the one or more virtual reality environments;
adapting at least one scene included in the set of expanded scenes into a three dimensional (3D) immersive scene; and
presenting, via the visual output device, the 3D immersive scene within the one or more virtual reality environments.

2. A computer-implemented method comprising:
receiving one or more live camera feeds including image data of a piece of content that includes plurality of triggers, the piece of content related to a source story;
identifying, automatically, at least one trigger in the one or more live camera feeds that provides one or more augmented reality display media related to the source story;
presenting, via a visual output device, the one or more augmented reality display media;
identifying one or more virtual reality environments pertaining to the source story caused by user engagement with at least one digital trigger in a portion of the one or more augmented reality display media, the one or more virtual reality environments including a scene from the source story presented from a point of view of a character included in the source story; and
terminating presentation of the one or more augmented reality display media and presenting, via the visual output device, the one or more virtual reality environments,
wherein the one or more live camera feeds include image data of a portion of a mirror; and
the one or more augmented reality display media includes a morphed representation of a user that shows the user as a particular character in the source story; and
the method further comprising presenting the one or more augmented reality display media by displaying a simulated reflection of the morphed representation of the user in the portion of the mirror to provide the user with a first person point of view of the particular character in the source story.

3. The method of claim 2, further comprising transitioning from the one or more live camera feeds to the one or more augmented reality display media including the simulated reflection of the morphed representation of the user to immerse the user in the source story; and
simulating one or more scenes in the story within the one or more augmented reality display media with the user playing a role of the particular character in the source story.

4. A computer-implemented method comprising:
receiving one or more live camera feeds including image data of a piece of content that includes plurality of triggers, the piece of content related to a source story;
identifying, automatically, at least one trigger in the one or more live camera feeds that provides one or more augmented reality display media related to the source story;
presenting, via a visual output device, the one or more augmented reality display media;
identifying one or more virtual reality environments pertaining to the source story caused by user engagement with at least one digital trigger in a portion of the one or more augmented reality display media, the one or more virtual reality environments including a scene from the source story presented from a point of view of a character included in the source story; and
terminating presentation of the one or more augmented reality display media and presenting, via the visual output device, the one or more virtual reality environments,
wherein the one or more live camera feeds include image data of a portion of a mirror; and
the one or more virtual reality environments include the portion of the mirror reproduced as a simulated mirror, wherein the simulated mirror displays a morphed representation of a user that shows the user as a particular character in the source story; and
the method further comprising presenting the one or more virtual reality environments by displaying a simulated reflection of the simulated mirror including the morphed representation of the user to provide the user with a first person point of view of the particular character in the source story.

5. The method of claim 4, further comprising:
transitioning from the one or more live camera feeds to the one or more virtual reality environments including the simulated mirror that displays the morphed representation of the user to immerse the user in the source story; and
simulating one or more scenes in the story within the one or more virtual reality environments with the user playing a role of the particular character in the source story.

6. A computer-implemented method comprising:
receiving one or more live camera feeds including image data of a piece of content that includes plurality of triggers, the piece of content related to a source story;
identifying, automatically, at least one trigger in the one or more live camera feeds that provides one or more augmented reality display media related to the source story;
presenting, via a visual output device, the one or more augmented reality display media;
identifying one or more virtual reality environments pertaining to the source story caused by user engagement with at least one digital trigger in a portion of the one or more augmented reality display media, the one or more virtual reality environments including a scene from the source story presented from a point of view of a character included in the source story; and terminating presentation of the one or more augmented reality display media and presenting, via the visual output device, the one or more virtual reality environments;

aggregating user experience settings that track a user response to stimuli included in the one or more augmented reality display media and the one or more virtual reality environments; and modifying a presentation of the one or more augmented reality display media or the one or more virtual reality environments based on the user experience settings to fit a psychological condition of a user.

7. A computer-implemented method comprising:

receiving one or more live camera feeds comprising image data of a piece of content that includes plurality of triggers, the piece of content related to a source story;

identifying, automatically, at least one trigger in the one or more live camera feeds that provides one or more augmented reality display media related to the source story;

presenting, via a visual output device, the one or more augmented reality display media;

identifying a digital trigger in the one or more augmented reality display media, the digital trigger including a user interaction with a portion of the augmented reality display media;

identifying one or more virtual reality environments related to the source story and associated with the digital trigger, the one or more virtual reality environments created by adapting a scene from the source story into an immersive virtual reality environment;

the one or more virtual reality environments including one or more simulated reality segments embedded in the one or more virtual reality environments, the one or more simulated reality segments including a virtual simulation of at least one of an object or a location included in the scene from the source story; and terminating presentation of the one or more augmented reality display media and presenting, via the visual output device, the one or more virtual reality environments;

identifying at least one trigger in the one or more virtual reality environments;

creating a new scene caused by user interacting with the at least one trigger in the one or more virtual reality environments, the new scene based on the source story;

adapting the new scene into a 3D immersive scene; and presenting, via the visual output device, the 3D immersive within the one or more virtual reality environments.

8. A computer-implemented method comprising:

receiving one or more live camera feeds comprising image data of a piece of content that includes plurality of triggers, the piece of content related to a source story;

identifying, automatically, at least one trigger in the one or more live camera feeds that provides one or more augmented reality display media related to the source story;

presenting, via a visual output device, the one or more augmented reality display media;

identifying a digital trigger in the one or more augmented reality display media, the digital trigger including a user interaction with a portion of the augmented reality display media;

identifying one or more virtual reality environments related to the source story and associated with the digital trigger, the one or more virtual reality environments created by adapting a scene from the source story into an immersive virtual reality environment;

the one or more virtual reality environments including one or more simulated reality segments embedded in the one or more virtual reality environments, the one or more simulated reality segments including a virtual simulation of at least one of an object or a location included in the scene from the source story; and terminating presentation of the one or more augmented reality display media and presenting, via the visual output device, the one or more virtual reality environments;

creating a set of expanded scenes related to the source story, the set of expanded scenes associated with at least one trigger in the one or more virtual reality environments;

identifying the at least one trigger in the one or more virtual reality environments;

adapting at least one scene included in the set of expanded scenes into a 3D immersive scene; and presenting, via the visual output device, the 3D immersive scene within the one or more virtual reality environments.

9. The method of claim 8, further comprising:

dynamically shifting between the one or more virtual reality environments including the scene from the source story and the one or more virtual reality environments including the 3D immersive scene to immerse a user in a universe of characters included in the source story.

* * * * *